US007353396B2

(12) United States Patent
Micali et al.

(10) Patent No.: US 7,353,396 B2
(45) Date of Patent: Apr. 1, 2008

(54) PHYSICAL ACCESS CONTROL

(75) Inventors: Silvio Micali, Brookline, MA (US); David Engberg, Cambridge, MA (US); Phil Libin, Cambridge, MA (US); Leo Reyzin, Cambridge, MA (US); Alex Sinelnikov, Boston, MA (US)

(73) Assignee: CoreStreet, Ltd., Cambridge, MA (US)

( * ) Notice: Subject to any disclaimer, the term of this patent is extended or adjusted under 35 U.S.C. 154(b) by 491 days.

(21) Appl. No.: 10/409,638

(22) Filed: Apr. 8, 2003

(65) Prior Publication Data

US 2004/0049675 A1     Mar. 11, 2004

Related U.S. Application Data

(63) Continuation-in-part of application No. 10/103,541, filed on Mar. 20, 2002, which is a continuation-in-part (Continued)

(60) Provisional application No. 60/370,867, filed on Apr. 8, 2002, provisional application No. 60/372,951, filed on Apr. 16, 2002, provisional application No. 60/373,218, filed on Apr. 17, 2002, provisional application No. 60/374,861, filed on Apr. 23, 2002, provisional application No. 60/420,795, filed on Oct. 23, 2002, provisional application No. 60/421,197, filed on Oct. 25, 2002, provisional application No. 60/421,756, filed on Oct. 28, 2002, provisional application No. 60/422,416, filed on Oct. 30, 2002, provisional application No. 60/427,504, filed on Nov. 19, 2002, provisional application No. 60/443,407, filed on Jan. 29, 2003, provisional application No. 60/446,149, filed on Feb. 10, 2003, provisional application No. 60/006,038, filed on Oct. 24, 1995, provisional application No. 60/033,415, filed on Dec. 18, 1996, provisional application No. 60/004,796, filed on Oct. 2, 1995, provisional application No. 60/006,143, filed on Nov. 2, 1995, provisional application No. 60/025,128, filed on Aug. 29, 1996, provisional application No. 60/035,119, filed on Feb. 3, 1997, provisional application No. 60/024,786, filed on Sep. 10, 1996, provisional application No. 60/025,128, filed on Aug. 29, 1996.

(51) Int. Cl.
*H04L 9/00* (2006.01)
(52) U.S. Cl. .................................. 713/176; 713/185
(58) Field of Classification Search ................ 713/176, 713/185
See application file for complete search history.

(56) References Cited

U.S. PATENT DOCUMENTS 4,200,770 A    4/1980    Hellman et al.

(Continued)

FOREIGN PATENT DOCUMENTS

EP            0 618 550 A1     3/1994

(Continued)

OTHER PUBLICATIONS

Translation by Altavista of Google cached page of EP 0798671.*
U.S. Appl. No. 09/617,050, filed Jul. 14, 2000, Frank W. Sudia.

(Continued)

*Primary Examiner*—Kambiz Zand
*Assistant Examiner*—Jacob Lipman
(74) *Attorney, Agent, or Firm*—Muirhead and Saturnelli, LLC

(57) ABSTRACT

A system and method are disclosed for controlling physical access through a digital certificate validation process that works with standard certificate formats and that enables a certifying authority (CA) to prove the validity status of each certificate C at any time interval (e.g., every day, hour, or minute) starting with C's issue date, $D_1$. C's time granularity may be specified within the certificate itself, unless it is the same for all certificates. For example, all certificates may have a one-day granularity with each certificate expires 365 days after issuance. Given certain initial inputs provided by the CA, a one-way hash function is utilized to compute values of a specified byte size that are included on the digital certificate and to compute other values that are kept secret and used in the validation process.

14 Claims, 9 Drawing Sheets

Related U.S. Application Data of application No. 09/915,180, filed on Jul. 25, 2001, now Pat. No. 6,766,450, which is a continuation of application No. 09/483,125, filed on Jan. 14, 2000, now Pat. No. 6,292,893, which is a continuation of application No. 09/356,745, filed on Jul. 19, 1999, now abandoned, which is a continuation of application No. 08/823,354, filed on Mar. 24, 1997, now Pat. No. 5,960,083, which is a continuation of application No. 08/559,533, filed on Nov. 16, 1995, now Pat. No. 5,666,416, said application No. 10/103,541 is a continuation-in-part of application No. 08/992,897, filed on Dec. 18, 1997, now Pat. No. 6,487,658, which is a continuation-in-part of application No. 08/715,712, filed on Sep. 19, 1996, now abandoned, said application No. 08/992,897 is a continuation-in-part of application No. 08/729,619, filed on Oct. 11, 1996, now Pat. No. 6,097,811, said application No. 08/992,897 is a continuation-in-part of application No. 08/804,868, filed on Feb. 24, 1997, now abandoned, which is a continuation of application No. 08/741,601, filed on Nov. 1, 1996, now abandoned, said application No. 08/992,897 is a continuation-in-part of application No. 08/872,900, filed on Jun. 11, 1997, now abandoned, which is a continuation of application No. 08/746,007, filed on Nov. 5, 1996, now Pat. No. 5,793,868, said application No. 08/992,897 and a continuation-in-part of application No. 08/906,464, filed on Aug. 5, 1997, now abandoned, is a continuation-in-part of application No. 08/763,536, filed on Dec. 9, 1996, now Pat. No. 5,717,758, said application No. 08/992,897 is a continuation-in-part of application No. 08/756,720, filed on Nov. 26, 1996, now abandoned, and a continuation-in-part of application No. 08/559,533, filed on Nov. 16, 1995, now Pat. No. 5,666,416, said application No. 08/992,897 is a continuation-in-part of application No. 08/752,223, filed on Nov. 19, 1996, now Pat. No. 5,717,757, said application No. 08/992,897 is a continuation-in-part of application No. 08/804,869, filed on Feb. 24, 1997, now abandoned, which is a continuation of application No. 08/741,601, filed on Nov. 1, 1996, now abandoned, said application No. 08/992,897 is a continuation-in-part of application No. 08/823,354, filed on Mar. 24, 1997, now Pat. No. 5,960,083.

(56) References Cited

U.S. PATENT DOCUMENTS

| | | |
|---|---|---|
| 4,218,582 A | 8/1980 | Hellman et al. |
| 4,309,569 A | 1/1982 | Merkle |
| 4,326,098 A | 4/1982 | Bouricius et al. |
| 4,825,052 A | 4/1989 | Chemin et al. |
| 4,879,747 A | 11/1989 | Leighton et al. |
| 4,881,264 A | 11/1989 | Merkle |
| 4,888,801 A | 12/1989 | Foster et al. |
| 4,926,480 A | 5/1990 | Chaum |
| 4,943,707 A | 7/1990 | Boggan |
| 4,944,009 A | 7/1990 | Micali et al. |
| 4,995,081 A | 2/1991 | Leighton et al. |
| 5,003,597 A | 3/1991 | Merkle |
| 5,005,200 A | 4/1991 | Fischer |
| 5,016,274 A | 5/1991 | Micali et al. |
| 5,097,504 A | 3/1992 | Camion et al. |
| 5,136,646 A | 8/1992 | Haber et al. |
| 5,136,647 A | 8/1992 | Haber et al. |
| 5,157,726 A | 10/1992 | Merkle et al. |
| 5,214,702 A | 5/1993 | Fischer |
| 5,231,666 A | 7/1993 | Matyas |
| 5,261,002 A | 11/1993 | Perlman et al. |
| 5,276,737 A | 1/1994 | Micali |
| 5,299,263 A | 3/1994 | Beller et al. |
| 5,307,411 A | 4/1994 | Anvret et al. |
| 5,315,657 A | 5/1994 | Abadi et al. |
| 5,315,658 A | 5/1994 | Micali |
| 5,340,969 A | 8/1994 | Cox |
| 5,351,302 A | 9/1994 | Micali et al. |
| 5,371,794 A | 12/1994 | Diffie et al. |
| 5,396,624 A | 3/1995 | Campbell, Jr. |
| RE34,954 E | 5/1995 | Haber et al. |
| 5,420,927 A | 5/1995 | Micali |
| 5,432,852 A | 7/1995 | Leighton et al. |
| 5,434,919 A | 7/1995 | Chaum |
| 5,450,493 A | 9/1995 | Maher |
| 5,497,422 A | 3/1996 | Tysen et al. |
| 5,499,296 A | 3/1996 | Micali |
| 5,519,778 A | 5/1996 | Leighton et al. |
| 5,537,475 A | 7/1996 | Micali |
| 5,544,322 A | 8/1996 | Cheng et al. |
| 5,551,027 A | 8/1996 | Choy et al. |
| 5,553,145 A | 9/1996 | Micali |
| 5,604,804 A | 2/1997 | Micali |
| 5,606,617 A | 2/1997 | Brands et al. |
| 5,610,982 A | 3/1997 | Micali |
| 5,615,268 A | 3/1997 | Bisbee et al. |
| 5,615,269 A | 3/1997 | Micali |
| 5,629,982 A | 5/1997 | Micali |
| 5,638,447 A | 6/1997 | Micali |
| 5,659,616 A | 8/1997 | Sudia |
| 5,659,617 A | 8/1997 | Fischer |
| 5,666,414 A | 9/1997 | Micali |
| 5,666,415 A | 9/1997 | Kaufman |
| 5,666,416 A | 9/1997 | Micali |
| 5,666,420 A | 9/1997 | Micali |
| 5,677,955 A | 10/1997 | Doggett et al. |
| 5,687,235 A | 11/1997 | Perlman et al. |
| 5,699,431 A | 12/1997 | Van Oorschot et al. |
| 5,717,757 A | 2/1998 | Micali |
| 5,717,758 A | 2/1998 | Micall |
| 5,717,759 A | 2/1998 | Micali |
| 5,742,035 A * | 4/1998 | Kohut ........................ 235/380 |
| RE35,808 E | 5/1998 | Micali |
| 5,748,738 A | 5/1998 | Bisbee et al. |
| 5,768,379 A * | 6/1998 | Girault et al. .............. 713/185 |
| 5,774,552 A | 6/1998 | Grimmer |
| 5,790,665 A | 8/1998 | Micali |
| 5,790,790 A | 8/1998 | Smith et al. |
| 5,793,868 A | 8/1998 | Micali |
| 5,799,086 A | 8/1998 | Sudia |
| 5,812,670 A | 9/1998 | Micali |
| 5,825,880 A | 10/1998 | Sudia et al. |
| 5,826,262 A | 10/1998 | Bui et al. |
| 5,841,865 A | 11/1998 | Sudia |
| 5,850,451 A | 12/1998 | Sudia |
| 5,857,022 A | 1/1999 | Sudia |
| 5,867,578 A | 2/1999 | Brickell et al. |
| 5,875,894 A | 3/1999 | Stromme |
| 5,903,651 A | 5/1999 | Kocher |
| 5,903,882 A | 5/1999 | Asay et al. |
| 5,960,083 A | 9/1999 | Micali |
| 5,982,898 A | 11/1999 | Hsu et al. |
| 5,995,625 A | 11/1999 | Sudia et al. |
| 6,009,177 A | 12/1999 | Sudia |
| 6,026,163 A | 2/2000 | Micali |
| 6,044,462 A | 3/2000 | Zubeldia et al. |
| 6,061,448 A | 5/2000 | Smith et al. |
| 6,097,811 A | 8/2000 | Micali |
| 6,119,137 A | 9/2000 | Smith et al. |
| RE36,918 E | 10/2000 | Micali |
| 6,134,326 A | 10/2000 | Micali et al. |

| | | | |
|---|---|---|---|
| 6,137,884 A | 10/2000 | Micali | |
| 6,141,750 A | 10/2000 | Micali | |
| 6,151,675 A | 11/2000 | Smith | |
| 6,189,103 B1 | 2/2001 | Nevarez et al. | |
| 6,192,407 B1 | 2/2001 | Smith et al. | |
| 6,209,091 B1 | 3/2001 | Sudia et al. | |
| 6,216,231 B1 | 4/2001 | Stubblebine | |
| 6,292,893 B1 | 9/2001 | Micali | |
| 6,301,659 B1 | 10/2001 | Micali | |
| 6,385,655 B1 | 5/2002 | Smith et al. | |
| 6,397,329 B1 | 5/2002 | Aiello et al. | |
| 6,404,337 B1 | 6/2002 | Van Till et al. | |
| 6,442,689 B1 | 8/2002 | Kocher | |
| 6,470,086 B1 | 10/2002 | Smith | |
| 6,487,599 B1 | 11/2002 | Smith et al. | |
| 6,487,658 B1 | 11/2002 | Micali | |
| 6,502,191 B1 | 12/2002 | Smith et al. | |
| 6,516,411 B2 | 2/2003 | Smith | |
| 6,529,956 B1 | 3/2003 | Smith et al. | |
| 6,532,540 B1 | 3/2003 | Kocher | |
| 6,609,196 B1 | 8/2003 | Dickinson, III et al. | |
| 6,651,166 B1 | 11/2003 | Smith et al. | |
| 6,658,568 B1 | 12/2003 | Ginter et al. | |
| 6,671,805 B1 | 12/2003 | Brown et al. | |
| 6,725,381 B1 | 4/2004 | Smith et al. | |
| 6,748,529 B2 | 6/2004 | Smith et al. | |
| 6,766,450 B2 | 7/2004 | Micali | |
| 6,826,609 B1 | 11/2004 | Smith et al. | |
| 2001/0011255 A1 | 8/2001 | Asay et al. | |
| 2001/0050990 A1 | 12/2001 | Sudia | |
| 2002/0013898 A1 | 1/2002 | Sudia et al. | |
| 2002/0029200 A1 | 3/2002 | Dulin et al. | |
| 2002/0029337 A1 | 3/2002 | Sudia et al. | |
| 2002/0062438 A1 | 5/2002 | Asay et al. | |
| 2002/0107814 A1 | 8/2002 | Micali | |
| 2002/0165824 A1 | 11/2002 | Micali | |
| 2002/0184182 A1 | 12/2002 | Kwan | |
| 2003/0014365 A1 | 1/2003 | Inada et al. | |
| 2003/0065921 A1 | 4/2003 | Chang | |
| 2003/0212888 A1 | 11/2003 | Wildish et al. | |
| 2003/0221101 A1 | 11/2003 | Micali | |
| 2004/0049675 A1 | 3/2004 | Micali et al. | |
| 2004/0111607 A1 | 6/2004 | Yellepeddy | |
| 2004/0237031 A1 | 11/2004 | Micali et al. | |
| 2005/0010783 A1 | 1/2005 | Libin et al. | |
| 2005/0033962 A1 | 2/2005 | Libin et al. | |
| 2005/0044376 A1 | 2/2005 | Libin et al. | |
| 2005/0044386 A1 | 2/2005 | Libin et al. | |
| 2005/0044402 A1 | 2/2005 | Libin et al. | |
| 2005/0055548 A1 | 3/2005 | Micali | |
| 2005/0055567 A1 | 3/2005 | Libin et al. | |
| 2005/0114653 A1 | 5/2005 | Sudia | |
| 2005/0114666 A1 | 5/2005 | Sudia | |
| 2005/0154878 A1 | 7/2005 | Engberg et al. | |
| 2005/0154918 A1 | 7/2005 | Engberg | |
| 2005/0155879 A1 | 7/2005 | Engberg et al. | |
| 2005/0193204 A1 | 9/2005 | Engberg et al. | |
| 2006/0987843 | 5/2006 | Libin | |

FOREIGN PATENT DOCUMENTS

| | | |
|---|---|---|
| EP | 0 723 251 A2 | 1/1996 |
| EP | 0 798 671 A2 | 2/1997 |
| EP | 1 024 239 A1 | 1/1999 |
| FR | 2 774 833 | 2/1998 |
| FR | 2 774 833 A1 | 2/1998 |
| WO | WO98/26385 | 6/1998 |
| WO | WO 98/26385 | 6/1998 |
| WO | WO 98/43152 | 10/1998 |
| WO | WO 00/22787 | 4/2000 |
| WO | WO 01/06701 A1 | 1/2001 |
| WO | WO 01/11812 A2 | 2/2001 |
| WO | WO 01/11843 | 2/2001 |
| WO | WO 01/25874 A2 | 4/2001 |

OTHER PUBLICATIONS

U.S. Appl. No. 09/633,149, filed Aug. 4, 2000, Frank W. Sudia.
"Distributed Certificate Validation: The answer to validation scalability, availability and cost issues," *CoreStreet White Paper*, published at www.corestreet.com, Jun. 12, 2003, 14 pp.
"Distributed OCSP: Security, Scalability, and Availability for Certificate Validation," *CoreStreet White Paper*, published at www.corestreet.com, 2002, 4 pp.
"Real Time Credential Validation: Secure, Efficient Permissions Management," *CoreStreet White Paper*, published at www.corestreet.com, 2002, 5 pp.
"Real Time Credential Validation: Secure, Efficient Permissions Management," *CoreStreet White Paper*, published at www.corestreet.com, 2002-2004, 5 pp.
"Identity Services Infrastructure™: A practical approach to ensuring trust and privacy in government and industry," *CoreStreet White Paper*, published at www.corestreet.com, 2006, 13 pp.
"The Roles of Authentication, Authorization & Cryptography in Expanding Security Industry Technology," Security Industry Association, *Quarterly Technical Update*, Dec. 2005, 32 pp.
"Important FIPS 201 Deployment Considerations: Ensuring Your Implementation is Future-Ready," *White paper*, published at www.corestreet.com, 2005-2006, 11 pp.
"Vulnerability Analysis of Certificate Validation Systems," *CoreStreet White Paper*, published at www.corestreet.com, 2006, 15 pp.
"The Role of Practical Validation for Homeland Security," *CoreStreet White Paper*, published at www.corestreet.com, 2002-2004, 3 pp.
"Distributed Certificate Validation," *CoreStreet White Paper*, published at www.corestreet.com, 2006, 16 pp.
"Certificate Validation Choices: Evaluation criteria for selecting the appropriate validation mechanism for your needs," *CoreStreet white paper*, published at www.corestreet.com, 2002-2004, 8 pp.
"Nonce Sense: Freshness and Security in OCSP Responses," *CoreStreet White Paper*, published at www.corestreet.com, 2003-2004, 2 pp.
"Sistema Distruito Per Il Controllo Della Validita Dei Certificati Digitali: Prestazoini—Disponibilita'—Costi," *CoreStreet White Paper*, published at www.corestreet.com, visited Aug. 7, 2006, 17 pp.
"Analisi Della Vunlerabilita' Dei Sistemi Di Convalida Dei Certificati Digitali," *CoreStreet White Paper*, published at www.corestreet.com, visited Aug. 7, 2006, 17 pp.
Jon Shamah, "From eID to Identity Services Infrastructure—Practical implementations for sustainable success," Presentation , publised at www.corestreet.com, *e-ID Conference* (Brussels, Belgium), Feb. 22, 2006, 48 pp.
"U.S. Department of Homeland Security First Responders Card Initiative," Transcript, *All Hazards Forum Conference and Exhibition*, Moderator Craig A. Wilson, Baltimore, Maryland, Oct. 26, 2005, 42 pp.
"Card-Connected System," *Functional Specification*, published at www.corestreet.com, 2005, 6 pp.
"Card-Connected System," *Architects and Engineers Specification*, published at www.corestreet.com, 2005, 11 pp.
"CoreStreet Validation Authority," *CoreStreet Data Sheet*, published at www.corestreet.com, 2006, 2 pp.
"Responder Appliance 2400," *CoreStreet Data Sheet*, published at www.corestreet.com, 2006, 1 p.
"Desktop Validation Client," *CoreStreet Data Sheet*, published at www.corestreet.com, 2006, 1 p.
"Server Validation Extension," *CoreStreet Data Sheet*, published at www.corestreet.com, 2006, 1 p.
"Path Builder System™: For Federated PKI," *CoreStreet Data Sheet*, published at www.corestreet.com, 2006, 1 p.
"PKI Toolkit: Developer toolkit to enable certificate validation," *CoreStreet Data Sheet*, published at www.corestreet.com, 2006, 1 p.

"MiniCRL," *CoreStreet data sheet*, published at www.corestreet.com, 2006, 1 p.

"PIVMAN™ System: Secure ID Checking," *CoreStreet Data Sheet*, published at www.corestreet.com, 2006, 1 p.

"The PIVMAN™ System: Implementing secure ID checking for site control in emergencies," *CoreStreet Product Implementation Overview*, published at www.corestreet.com, 2006, 4 pp.

"The PIVMAN™ System: Deployment and use case overview," *CoreStreet Product Application Overview*, published at www.corestreet.com, 2006, 4 pp.

"Card-Connected™ Access Control," *Corestreet Data Sheet*, published at www.coresheet.com, 2006, 1 p.

"FIPS 201 Solutions," *Corestreet Solutions Overview*, published at www.corestreet.com, 2005, 1 p.

"Common Criteria Factsheet: Understanding the importance of certification," *Coresheet Fact Sheet*, published at www.corestreet.com, 2006, 1 p.

"Security Requirements for Cryptographic Modules," *Federal Information Processing Standards (FIPS) Publication 140-2*, Information Technology Laboratory, National Institute of Standards and Technology, Gaithersburg, MD 20899, May 25, 2001.

Facsimile message from Chini Krishnan of Integris Security, Inc. to Professor Silvio Micali, dated Feb. 17, 1997, 7 pages including cover sheet, submitted in attached sealed envelope as Proprietary Material Not Open to Public. To be Opened Only by Examiner or Other Authorized U.S. Patent and Trademark Office Employee.

Facsimile message from Chini Krishnan of Integris Security, Inc. to Professor Silvio Micali, dated Feb. 25, 1997, 13 pages including cover sheet, submitted in attached sealed envelope as Proprietary Material Not Open to Public. To be Opened Only by Examiner or Other Authorized U.S. Patent and Trademark Office Employee.

"Final Text of Draft Amendments DAM 4 to ISO/IEC 9594-2, DAM 2 to ISO/IEC 9594-6, DAM 1 to ISO/IEC 9594-7, and DAM 1 to ISO/IEC 9594-8 on Certificate Extensions," *ISO/IEC JTC 1/SC 21/WG 4 and ITU-T Q 15/7 Collaborative Editing Meeting on the Directory*, Dec. 1996, 54 pp.

Christoffersson et al., *Crypto User's Handbook, A Guide for Implementors of Cryptographic Protection in Computer Systems*, Elsevier Science Publishers B. V., 1988, pp. 8-85.

M. Ito, et al., "Secret Sharing Scheme Realizing General Access Structure", Dept. of Electrical Communications, Tohoku University, Sendai, Miyagi 9890, Japan, 1987, pp. 3.6.1-.3.6.4.

L. Gong, "Securely replicating authentication services," *Proceedings of the International Conference on Distributed Computing Systems*, IEEE Computer Society Press, 1989. pp. 85-91.

International Search Report from PCT/US 96/17374, dated Feb. 19, 1997, 3 pp.

C.J. Mitchell and F.C. Piper, "Key Storage in Secure Networks," *Discrete Applied Mathematics*, vol. 21, No. 3, 1988, pp. 215-228.

D. Otway and O. Rees, "Efficient and timely mutual authentication," *SIGOPS Oper. Syst. Rev.* vol. 21, No. 1, Jan. 1987, pp. 8-10.

"The Digital Signature Standard," National Institute of Standards and Technology (NIST), Proposal and Discussion, *Comm. of the ACM*, 35 (7), Jul. 1992, pp. 36-54.

F. T. Leighton, "Failsafe Key Escrow Systems," *Technical Memo 483, MIT Lab. for Computer Science*, 1994, 9 pp.

B. Fox and B. LaMacchia, "Certificate Revocation: Mechanics and Meaning," *Proceedings of Financial Cryptography '98*, Lecture Notes in Computer Science 1465, Springer-Verlag, Jan. 1998, pp. 158-164.

R. Blom, "An optional class of symmetric key generation schemes," Proceedings of Advances in Cryptology-EUROCRYPT'84, Lecture Notes in Computer Science 209, Spring-Verlag, 1985, pp. 335-338.

C. Blundo, et al., "Perfectly Secure Key Distribution for Dynamic Conferences" *Proceedings of Advances in Cryptology: CRYPTO '92*, Springer-Verlag, Berlin, 1993, pp. 471-486.

D. Beaver, "Multiparty Protocols Tolerating Half Faulty Processors," *Proceedings of Advances in Cryptology '89*, Lecture Notes In Computer Science 435, G. Brassard, Ed. Springer-Verlag, London, 1990, pp. 560-572.

B. Schneier, *Applied Cryptography* 2nd ed.; John Wiley & Sons, Inc., 1996, pp. 42-65, 574-576, 591, 593.

"Escrowed Encrpytion Standard (EES)," *Federal Information Processing Standards (FIPS) Publication 185*, Computer Systems Laboratory, National Institute of Standards and Technology, Gaithersburg, MD 20899, Feb. 1994.

S. Chokhani, "Toward a National Public Key Infrastructure," *IEEE Communications Magazine*, vol. 32, No. 9, Sep. 1994, pp. 70-74.

M. Gasser, et al., "The Digital Distributed System Security Architecture," *Proc. 12th National Computer Security Conference*, 1989, pp. 305-319.

R. L. Rivest, et al., "SDSI—A Simple Distributed Security Infrastructure," 1996, pp. 1-39.

D. L. Chaum, "Untraceable Electronic Mail, Return Addresses, and Digital Pseudonyms," Technical Note Programming Techniques and Data Structures, *Communications of the ACM*, vol. 24, No. 2, Feb. 1981, pp. 84-88.

R. Gennaro, et al., "Robust Threshold DSS Signatures," *Proc. of Advances in Cryptology: EUROCRYPT '96*, Lecture Notes in Computer Science 1070, 1996, 20 pp.

"Federal Public Key Infrastructure (PKI) Technical Specifications: Part D—Interoperability Profiles," (DRAFT) *Federal PKI Technical Working Group, Inc.*, Cygnacom Solutions, 1995, 91 pp.

N. Nazario, "Federal Public Key Infrastructure (PKI) Version 1 Technical Specifications: Part B—Technical Security Policy," *PKI Technical Working Group*, 1996, 21 pp.

S. Chokhani and W. Ford, "Certificate Policy and Certification Practice Statement Framework," (DRAFT) *CygnaCom Solutions, Inc.*, Nov. 1996, 80 pp.

William E. Burr, et al., "A Proposed Federal PKI Using X.509 V3 Certificates," *National Institute of Standards and Technology (NIST)*, Gaithersburg, MD 20899, 1996, 8 pp.

W.E. Burr, "Public Key Infrastructure (PKI) Technical Specifications (Version 1): Part C—Concept of Operations," (DRAFT) Feb. 1996, 30 pp.

Warwick Ford, "Public-Key Infrastructure Standards," *PP Presentation*, 1996, 15 pp.

William T. Polk, "Minimum Interoperability Specifications for PKI Components," *NIST presentation*, 1996, 13 pp.

Santosh Chokhani, Ph.D., "Security Considerations in Using X.509 Certificates," *PP Presentations*, 1996, 11 pp.

Donna F. Dodson, "PKI Implementation Projects," *NIST Presentation*, 1996, 17 pp.

William E. Burr, et al., "A Proposed Federal PKI Using X.509 V3 Certificates," *NIST Presentation*, 1996, 12 pp.

Noel A. Nazario, et al., "Management Model for the Federal Public Key Infrastructure," *NIST Presentation*, 1996, 9 pp.

Noel A. Nazario, "Security Policies for the Federal Public Key Infrastructure," *NIST Presentation*, 1996, 11 pp.

William Burr, et al., "Minimum Interoperability Specification for PKI Components," *Output of NIST's Cooperative Research and Development Agreements for Public Key Infrastructure development with AT&T, BBN, Certicom, Cylink, DynCorp, IRE, Motorola, Northern Telecom, Spyrus, and VeriSign*, DRAFT Version 1, 1996.

Farrell, et al., "Internet Public Key Infrastructure Part III: Certificate Management Protocols," *Internet Draft, PKIX Working Group*, Dec. 1996.

W. Polk, ed., "Requirements for the Federal Public Key Infrastructure (Version 1) Part A: Requirements," 1996, 19 pp.

Warwick Ford, "A Public Key Infrastructure for U.S. Government Unclassified but Sensitive Applications," *NORTEL/Bell-Northern Research, National Institute of Standards and Technology*, 1995, 94 pp.

B. Garner, ed., "A Dictionary of Modern Legal Usage," Oxford Univ. Press, 1987, p. 930.

L. Harn, "Group-Oriented (t, n) threshold digital signature scheme and digital multisignature," *IEE Proc-Comput. Digit. Tech.*, vol. 141, No. 5, Sep. 1994, pp. 307-313.

Oded Goldreich, "Two Remarks Concerning the Goldwasser-Micali-Rivest Signature Scheme," *Laboratory for Computer Science, Massachusetts Institute of Technology MIT/LCS/TM-315*, Sep. 1986, 10 pp.

S. Goldwasser, et al., "The Knowledge Complexity of Interactive Proof Systems," *Society for Industrial and Applied Mathematics (SIAM) J. Comput.*, vol. 18, No. 1, Feb. 1989, pp. 186-208.

"X9-Financial Services: American National Standard X9.55-1995," *American National Standards Institute, Accredited Standards Committee X9(Working Draft)*, Jul. 3, 1996, 41 pp.

S. Micali, et al., "An Efficient Zero-Knowledge Method for Answering Is He In Or Out? Questions," *Abstract of talk given at International Computer Science Institute*, Berkeley, CA, Dec. 1995.

"Information technology—Open Systems Interconnection—The Directory: Authentication framework," *International Standard ISO/IEC 9594-8*, 1995, 41 pp.

Z. Galil, et al., "Partitioned Encryption and Achieving Simultaneity by Partitioning," *Information Processing* Letters 26 (1987/88), Oct. 1987, pp. 81-88.

Paul Neil Feldman, "Optimal Algorithms for Byzantine Agreement," *Thesis submitted for Doctor of Philosophy in Mathematics at the Massachusetts Institute of Technology*, May 1988.

B. Chor, et al., "Verifiable Secret Sharing and Achieving Simultaneity in the Presence of Faults," *IEEE*, 1985, pp. 383-395.

D. Chaum, "Security Without Identification: Transaction Systems To Make Big Brother Obsolete," Communications of the ACM, vol. 28, No. 10, Oct. 1985, pp. 1030-1044.

V. Varadharajan, "Notification: A Pratical Security Problem in Distributed Systems," *Proc. of the 14th National Computer Security Conference*, National Institute of Standards and Technology / National Computer Security Center, Oct. 1-4, 1991, pp. 386-396.

Silvio Micali, "Computationally-Sound Proofs," *Laboratory for Computer Science, Massachusetts Institute of Technology*, Apr. 11, 1995, 56 pp.

Silvio Micali, *Proc. of Advances in Cryptology-CRYPTO '92*, Lecture Notes in Computer Science 740, Aug. 1992, pp. 113-138.

J. L. Abad-Peiro, et al., "Designing a Generic Payment Service," *IBM Research Division, Zurich Research Laboratory*, Nov. 1996, 26 pp.

R. Ankney, "A Certificate-Based Authorization Model," *Fisher International*, Sep. 25, 1995, 20 pp.

D. Chaum, et al., "Multiparty Unconditionally Secure Protocols," ACM-0-89791-264, 1988, pp. 11-19.

O. Goldreich, et al., "Proofs that Yield Nothing But Their Validity or All Languages in NP Have Zero-Knowledge Proof Systems," *Journal of the Association for Computing Machinery*, vol. 38, No. 1, Jul. 1999, pp. 691-729.

M. K. Franklin, et al., "Fair Exchange with a Semi-Trusted Third Party," *Proc. of the 4th ACM Conference on Computer and Communications Security*, Apr. 1997, 6 pp.

A. Fiat, et al., "How to Prove Yourself: Practical Solutions to Identification and Signature Problems," *Proc. of Advances in Cryptology: Proc. Crypto '86*, Lecture Notes in Computer Science 263, 1987, pp. 186-194.

D. Dolev, et al., "Non-Malleable Cryptography," ACM 089791-397-3, 1991, pp. 542-552.

Richard A. DeMillo, et al., "Cryptology in Revolution: Mathematics and Models," *Lecture Notes Prepared for the American Mathematical Society Short Course Held in San Francisco*, CA, Jan. 5-6, 1981, ISBN 0-8218-0041-8, 1983, pp. 152-155.

Ivan Bjerre Damgdrd, "Payment Systems and Credential Mechanisms with Provable Security Against Abuse by Individuals," *Proc. of Advances in Cryptology—CRYPTO '88*, 1988, pp. 328-335.

O. Goldreich, et al., "How To Play Any Mental Game or A Completeness Theorem for Protocols with Honest Majority," ACM 0-89791-221-7, 1987, pp. 218-229.

Y. Frankel, et al., "Indirect Discourse Proofs: Achieving Efficient Fair Off-Line E-Cash," *Proc. of Advances in Cryptology, ASIACRYPT '96*, Lecture Notes in Computer Science 1163, Springer Verlag, 1996, pp. 286-300.

S. Micali, "A Secure and Efficient Digital Signature Algorithm," *Technical Memo, Laboratory for Computer Science, Massachusetts Institute of Technology*, Cambridge, MA 02139, Mar. 1994, 12 pp.

"Initial EFF Analysis of Clinton Privacy and Security Proposal," *Society for Electronic Access, The Electronic Frontier Foundation*, Apr. 1993, 3 pp.

L. Lamport, "Password Authentication with Insecure Communication," *Communications of the ACM*, Technical Note Operating Systems, vol. 24, No. 11, Nov. 1981, pp. 770-772.

J. Linn, "Privacy Enhancement for Internet Electronic Mail: Part I—Message Encipherment and Authentication Procedures," *Network Working Group Request for Comments: 1040*, Jan. 1988, 28 pp.

S. Kent, "Privacy Enhancement for Internet Electronic Mail: Part II—Certificate-Based Key Managements," *Network Working Group Request for Comments: 1422*, Feb. 1993, 30 pp.

T. Elgamal, "A Public Key Cryptosystem and a Signature Scheme Based on Discrete Logarithms," *IEEE Transactions on Information Theory*, vol. IT-31, No. 4, Jul. 1985, pp. 469-472.

R. Hauser, et al., "Lowering Security Overhead in Link State Routing," *Computer Networks*, vol. 31, Elsevier, Apr. 1999, pp. 885-894.

S. Herda, "Non-repudiation: Constituting evidence and proof in digital cooperation," *Computer Standards & Interfaces*, vol. 17, Elsevier, 1995, pp. 69-79.

S.G. Stubblebine, "Recent-Secure Authentication: Enforcing Evocation in Distributed Systems, Security and Privacy," *Proc. of the 1995 IEEE Symposium on Security and Privacy*, Section 5, 1995, pp. 224-235.

Ronald L. Rivest and Adi Shamir, "PayWord and MicroMint: Two simple micropayment schemes," *MIT Laboratory for Computer Science 545 Technology Square*, Cambridge, Mass 02139; *Wezmann Institute of Science Applied Mathematics Department*, Rehovot, Israel, Apr. 27, 2001, 19 pp.

R. L. Rivest et al., "A Method for Obtaining Digital Signatures and Public-Key Cryptosystems," *Communications of the ACM*, Programming Techniques, vol. 21, No. 2, Feb. 1978, pp. 120-126.

M. Bellare, et al., "Incremental cryptography: the case of hashing and signing," *Proc. of Advances in Cryptology—CRYPTO '94*, Lecture Notes in Computer Science 839, Springer-Verlag, 1994, pp. 216-233.

M. Bellare and S. Micali, "How to Sign Given Any Trapdoor Permutation," *J. of the Assoc. for Computing Machinery*, vol. 39, No. 1, Jan. 1992, pp. 214-233.

J. C. Benaloh, "Secret Sharing Homomorphisms: Keeping Shares of a Secret Secret (Extended Abstract," *Proc. of Advances in Crpytology—CRYPTO '86*, Lecture Notes in Comptuer Science 263, Springer-Verlag, 1986, pp. 216-233.

W. Johnston, et al., "Authorization and Attribute Certificates for Widely Distributed Access Control," *IEEE 7th International Workshops on Enabling Technologies: Infrastructure for Collaborative Enterprises*, 1998, 6 pp.

P. Janson and M. Waidner, "Electronic Payment over Open Networks," *IBM Zurich Research Laboratory*, Apr. 18, 1995, 9 pp.

E. D. Karnin, et al., "On Secret Sharing Systems," *IEEE Transactions on Information Theory*, vol. IT-29, No. 1, Jan. 1983, pp. 35-41.

S. Micali, and R. L. Rivest, R. L., "Micropayments Revisited," *Proc. of the Cryptographer's Track At the RSA Conference on Topics in Cryptology* (Feb. 18, 22, 2002), Lecture Notes In Computer Science 2271. Springer-Verlag, London, 2002, 149-163.

Silvio Micali, "Enhanced Certificate Revocation," *Technical Memo MIT/LCS/TM-542b, Laboratory for Computer Science, Massachusetts Institute of Technology*, Mar. 22, 1996, 10 pp.

R. Housley, et al., "Internet Public Key Infrastructure Part I: x.509 Certificate and CRL Profile," *Internet Engineering Task Force, PKIX Working Group, Internet Draft*, Mar. 26, 1996, 76 pp.

T. Elgamal, et al., "Securing Communications on the Intranet and Over the Internet," White Paper, *Netscape Communications Corporation*, Jul. 1996, 19 pp.

S. Berkovits, et al., "Public Key Infrastructure Study," Final Report, *National Institute of Standards and Technology*, Gaithersburg,, MD, Apr. 1994, 193 pp.

M. Ben-Or, et al., "Completeness Theorems for Non-Cryptographic Fault-Tolerant Distributed Computation," ACM-0-89791-264, 1988, 10 pp.

M. Ben-Or, et al., "A Fair Protocol for Signing Contracts," *IEEE Transactions on Information Theory*, vol. 36, No. 1, Jan. 1990, pp. 40-46.

G. R. Blakley, "Safeguarding cryptographic keys," *AFIPS—Proc. of the National Computer Conference*, vol. 48, 1979, pp. 313-317.

J. Camenisch, et al., "An Efficient Fair Payment System," ACM-089791-892-0, 1996, 7 pp.

J. Camenisch, et al., "Digital Payment Systems with Passive Anonymity-Revoking Trustees," *Computer Security—ESORICS '96*, Lecture Notes in Computer Science 1146, Springer Verlag, 1996, pp. 33-43.

M. Blum, "How to Exchange (Secret) Keys," *ACM Transactions on Computer Systems*, vol. 1, No. 2, May 1983, pp. 175-193.

H. Bürk, et al., "Digital Payment Systems Enabling Security and Unobservability," *Computers & Security*, vol. 8, Elsevier Science, 1989, pp. 399-416.

G. Brassard, et al., "Minimum Disclosure Proofs of Knowledge," *J. of Computer and System Sciences*, vol. 37, 1988, pp. 156-189.

D. Chaum, et al., "Untraceable Electronic Cash," *Proc. of the 8th Annual international Cryptology Conference on Proc. of Advances in Cryptology* (Aug. 21-25, 1988), Lecture Notes In Computer Science 403, Springer-Verlag, 1990, pp. 319-327.

P. Cheng, et al., "Design and Implementation of Modular Key Management Protocol and IP Secure Tunnel on AIX," *IBM Thomas J. Watson Research Center*, Yorktown Heights, NY, 10598, Apr. 28, 1995, 14 pp.

R. DeMillo, et al., "Protocols for Data Security," *Computer, IEEE*, Feb. 1983, pp. 39-50.

E-mail from Martin Hellman, "Re: Clipper-Chip Escrow-System Flaws," Apr. 16, 1993, 1 p.

E-mail from Martin Hellman, "Clipper Chip," Apr. 17, 1993, 2 pp.

E-mail from Dorothy Denning, "Re: Clipper Chip," Apr. 18, 1993, 3 pp.

Y. Desmedt, et al., "Threshold cryptosystems," *Proc. of Advances in Cryptology—CRYPTO 89*, Lecture Notes in Computer Science 435, Springer-Verlag, 1990, pp. 307-315.

W. Diffie, et al., "New Directions in Cryptography," *IEEE Transactions on Information Theory*, vol. IT-22, Nov. 1976, pp. 644-654.

S. Dukach, "SNPP: A Simple Network Payment Protocol," *Proc. of the Eighth Annual Computer Security Applications Conference*, Dec. 1992, 6 pp.

S. Even, et al., "A Randomized Protocol for Signing Contracts," *Communications of the ACM, Programming Techniques and Data Structures*, vol. 28, No. 6, Jun. 1985, pp. 637-647.

S. Even, et al., "On-line/Off-line Digital Signatures," *Proc. of Advances in Cryptology*, Springer-Verlag New York, pp. 263-275.

S. Even, et al., "Secure Off-line Electronic Fund Transfer Between Nontrusting Parties," *Computer Science Department, Technion, Israel Institute of Technology*, Haifa, Israel 32000, Jan. 31, 1988, 10 pp.

O. Goldreich, et al., "Proofs that Yield Nothing But Their Validity and a Methodology of Cryptographic Protocol Design," *Proc. of 27th Symp. on Foundation of Computer Science*, 1986, pp. 174-187.

P. Feldman, "A Practical Scheme for Non-interactive Verifiable Secret Sharing," *IEEE Symposium on Foundations of Computer Science*, 1987, pp. 427-437.

A. Fiat, "Batch RSA," *Proc. of Advances in Cryptology—CRYPTO '89*, Lecture Notes on Computer Science 435, Springer-Verlag, 1989, pp. 175-185.

S. Goldwasser, et al., "A Digital Signature Scheme Secure Against Adaptive Chosen-Message Attacks," *Society for Industrial and Applied Mathematics (SIAM) J. Comput.*, vol. 17, No. 2, Apr. 1988, pp. 281-308.

L. C. Guillou, et al., "A 'Paradoxical' Identity-Based Signature Scheme Resulting from Zero-Knowledge," *Proc. of Advances in Cryptology—CRYPTO '88*, Lecture Notes in Computer Science 403, Springer Verlag, New York, 1990, pp. 216-231.

K. E. B. Hickman, "The SSL Protocol," Internet Draft, *Netscape Communications Corporation*, Jun. 1995, 32 pp.

M. Jakobsson, "Reducing costs in identification protocols," *Department of Computer Science and Engineering, University of California*, San Diego, La Jolla, CA 92093, 1992, 7 pp.

G. B. Koleta, "Cryptographers Gather to Discuss Research: Analyses of how to break codes and new ways to use codes were features at the meeting," *Science*, vol. 214, Nov. 6, 1981, pp. 646-647.

P. Janson, et al., "Electronic Payment Systems," *ACTS Project AC026, SEMPER*, May 1, 1996, pp. 24 pp.

J. Kilian, et al., "Identify Escrow," *Proc. of Advances in Cryptology—CRYPTO '98*, 1998, 18 pp.

A. G. Konheim, "Chapter IX: Digital Signatures and Authentications," *Cryptography, A Primer*, John Wiley & Sons, 1981, pp. 331-347, 365-370.

H. Königs, "Cryptographic Identification Methods for Smart Cards in the Process for Standardization," *IEEE Communications Magazine*, Jun. 1991, pp. 42-47.

S. Low, et al., "Anonymous Credit Cards," *Proc. of the 2nd ACM Conference on Computer and Communications*, Fairfax, Virginia, 1994, 10 pp.

M. Luby, et al., "How to Simultaneously Exchange a Secret Bit by Flipping a Symmetrically-Biased Coin," *Proc. of the 24th IEEE Symposium on Foundations of Computer Science*, Tucson, Arizona, 1983, pp. 11-21.

J. Markoff, "New Communication System Stirs Talk of Privacy vs. Eavesdropping," *The New York Times*, Apr. 16, 1993, 2 pp.

J. Markoff, "Communications Plan Draws Mixed Reaction," *The New York Times*, Apr. 17, 1983, 1 pp.

T. Leighton and S. Micali, "New Approaches to Secret-Key Exchange," *Proc. of Advances in Cryptology—CRYPTO '93*, 1993, 10 pp.

A. J. Menezes, Handbook of Applied Cryptography, CRC Press, 1997, pp. 566, 576-577, 588-589, 706, 716, 720, 728-729, 737.

P. D. Merillat, "Secure stand Alone Positive Personnel Identify Verification System (SSA-PPIV)," Sandia Laboratories, SAND79-0070, Mar. 1979, 21 pp.

R. C. Merkle, "A Certified Digital Signature," *Communications of the ACM*, 1979, pp. 218-238.

R. C. Merkle, "A Digital Signature Based on a Conventional Encrpytion Function," Presented at CRYPTO '87, 1987, 8 pp.

C. H. Meyer and S. M. Matyas, "Chapter 8: Authentication Techniques Using Cryptography," *Cryptography: A New Dimension in Computer Data Security*, John Wiley & Sons, 1982, pp. 350-428.

S. Micali and A. Shamir, "An Improvement of The Fiat-Shamir Identification And Signature Scheme," Presented at CRYPTO '88, 1988, 5 pp.

S. Micali, "Guaranteed partial key escrow," *Technical Memo, MIT/LCS TM-537*, Sep. 1995, 13 pp.

S. Micali and A. Shamir, "Partial Key-Escrow," *MIT Laboratory for Computer Science*, Cambridge, MA 02139 and *Weizmann Institute Computer Science Department*, Rehovot, Israel, Feb. 1996, 13 pp.

S. Micali, "Fair Cryptosystems," *Technical Memo, MIT/LCS TM-579.b*, Nov. 1993, 36 pp.

Website pages @ http://www.valicert.com, Sep. 23, 2002, 8 pp.

T. P. Pedersen, "Electronic payments of small amounts," *Technical report, Aarhus University, Computer Science Department*, Aug. 1995, 12 pp.

T. P. Pedersen, "Distributed Provers with Applications to Undeniable Signatures," *Proc. of Advances in Cryptology—EUROCRYP '91*, Lecture Notes in Computer Science 547, Springer-Verlag, 1991, pp. 221-242.

Donn B. Parker, "Chapter 43: Public Key Cryptosystems," *Fighting Computer Crime*, Charles Scribner's Sons, New York, 1983, pp. 327-334.

John Droge, "Mykotronx Develops New Chip to Protect Digital Data," Press Release, Mykotronx, Inc., Torrence, California, 1992, 3 pp.

Barbara Fox, "Certificate Revocation: Mechanics and Meaning," *Microsoft Corporation, Introductory Remarks for Panel Discussion with J. Feigenbaum, P. Kocher, M. Myers and R. Rivest*,, 1998, 8 pp.

David Mutch, "Electronics Industry Wants to Offer V-Chip of Its Own," *The Christian Science Monitor*, Sep. 25, 1995, 3 pp.

S. Micali and P. Rogaway, "Secure Computation," *Proc. of Advances in Cryptology: CRYPTO '91*, Lecture Notes in Computer Science 576, Springer, 1991, pp. 392-404.

C. Mueller-Scholor and N. R. Wagner, "The implementation of a cryptography-based secure office system," *AFIPS Proc. of the National Computer Conference*, 1982, pp. 487-492.

M. Noar and M. Yung, "Universal One-Way Hash Function and their Cryptographic Applications," ACM 0-89791-307-8, 1989, pp. 33-43.

R. N. Needham and M. D. Schroeder, "Using Encryption for Authentication in Large Networks of Computers," *Communications of the ACM, Operating Systems*, vol. 21, No. 12, Dec. 1978, pp. 993-999.

H. Ong and C.P. Schnorr, "Fast Signature Generation with a Fiat-Shamir-Like Scheme," *Proc. of Advances in Cryptology—EUROCRYPT '90*, Lecture Notes in Computer Science 473, Springer-Verlag, 1991, pp. 432-440.

M. O. Rabin, "Digitalized Signatures and Public-Key Functions as Intractable as Factorization," Technical Report, MIT/LCS/TR-212, Jan. 1979, 17 pp.

T. Rabin and M. Ben-Or, "Verifiable Secret Sharing and Multiparty Protocols with Honest Majority," ACM 0-89791-307-8, 1989, pp. 73-85.

M. O. Rabin, "Transaction Protection By Beacons," Harvard University Center for Research in Computing Technology, TR-29-81, Nov. 1981, 21 pp.

Michael O. Rabin, "How to Exchange Secrets," May 20, 1981, 21 pp.

E. Rescorla and A. Schiffman, "The Secure HyperText Transfer Protocol," Internet Draft, *Web Transaction Security Working Group, Enterprise Integration Technologies*, Jul. 1995, 36 pp.

K. Rihaczek, "Teletrust," *Computer Networks and ISDN Systems*, vol. 13, 1987, pp. 235-239.

"Statement by the Press Secretary," *The White House, Office of the Press Secretary*, Apr. 16, 1993. 6 pp.

C. P. Schnorr, "Efficient Identification and Signatures for Smart Cards," *Proc. of Advances in Cryptology—CRYPTO 89*, G. Brassard (ed.), Lecture Notes in Computer Science 435, Springer-Verlag, 1990, pp. 239-251.

J. M. Blachere and M. Waidner, "SEMPER," *Project AC026*, Document 431ZR031, 1995, 46 pp.

Bob Serenelli and Tim Leisher, "Securing Electronic Mail Systems," *Communications—Fusing Command, Control and Intelligence, MILCOM '92*, Conference Record, vol. 2, 1992, pp. 677-680.

A. Shamir, "How to Share a Secret," *Programming Techniques, Communications of the ACM*, vol. 22, No. 11, Nov. 1979, pp. 612-613.

A. Shamir, "Identity-based cryptosystems and signature schemes," *Proc. of Advances in Cryptology, CRYPTO 84*, G. R. Blakley and D. Chaum (Eds.), Springer-Verlag, 1985, pp. 47-53.

*Contemporary Cryptology*, G. J. Simmons (Ed.), IEEE Press, New York, 1991, pp. 348-350, 617-630.

G. J. Simmons, "How to (Really) Share a Secret," *Proc. of Advances in Cryptology—Crypto 88*, S. Goldwasser (ed.), Lecture Notes in Computer Science 403, Springer-Verlag, 1988, pp. 390-448.

G. J. Simmons, "An Impersonation-Proof Identify Verification Scheme," *Proc. of Advances in Cryptology—Crypto 87*, C. Pomerance (Ed.), Lecture Notes in Computer Science 293, Springer-Verlag, 1987, pp. 211-215.

G. J. Simmons, "A Protocol to Provide Verifiable Proof to Identity and Unforgeable Transaction Receipts," IEEE Journal on Selected Areas in Communications, vol. 7, No. 4, May 1989, pp. 435-447.

G. J. Simmons, "Scanning the Issue," and "How to Insure that Data Acquired to Verify Treaty Compliance are Trustworthy," *Proc. of the IEEE*, vol. 76, No. 5, May 1988, pp. 515-518 and 621-627.

G. J. Simmons, "A System for Verifying User Identity and Authorization at the Point-of Sale or Access," Cryptologia, vol. 8, No. 1, Jan. 1984, 21 pp.

G. J. Simmons and G. B. Purdy, "Zero-Knowledge Proofs of Identity and Veracity of Transaction Receipts," *Proc. of Advances in Cryptology—Eurocrypt'88*, Lecture Notes in Computer Science 330, C. G. Günther (Ed.), Springer-Verlag New York, 1988, pp. 35-49.

M. Sirbu and J. D. Tygar, "NetBill: An Internet Commerce System Optimized for Network Delivered Services," *IEEE Personal Communications*, Aug. 1995, 13 pp.

J. L. Snare, "Secure Electronic Data Interchange," *Computer Security in the Age of Information*, W. J. Caelli (Ed.), Elsevier Science Publishers B.V., 1989, pp. 331-342.

K. R. Sollins, "Cascaded Authentication," *Proc. of the 1988 IEEE Symposium on Security and Privacy*, 1988, pp. 156-163.

M. Stadler, et al., "Fair Blind Signatures," *Proc. of Advances in Cryptology—Eurocrypt '95*, Lecture Notes in Computer Science 921, Springer-Verlag, 1995, pp. 209-219.

L. H. Stein, et al., "The Green Commerce Model," Internet Draft, Oct. 1994, 18 pp.

G. Tsudik, "Zurich iKP Prototype (ZiP): Protocol Specification Document," *IBM Zurich Research Lab*, Mar. 5, 1996, 30 pp.

V. Varadharajan and S. Black, "Formal Specification of a Secure Distributed Messaging System" *Proc. of the 12th National Computer Security Conference*, Oct. 1989, pp. 147-171.

M. Waidner, "Development of a Secure Electronic Marketplace for Europe," *Proc. of ESCORICS 96*, Rome, Sep. 1996, 15 pp.

M. Wegman, "One-Time Pad Digitial Signature Technique," *IBM Technical Disclosure Bulletin*, vol. 21, No. 3, Aug. 1978, pp. 1316-1318.

H. C. Williams, "A Modification of the RSA Public-Key Encryption Procedure," *IEEE Transactions on Information Theory*, vol. IT-26, No. 6, Nov. 1980, pp. 726-729.

A. C. Yao, "Protocols for Secure Computations," *Proc. of the 23rd Symp. on Foundation of Computer Science*, IEEE, 1982, pp. 160-164.

J. Zhou and D. Gollman, "A Fair Non-repudiation Protocol," *Proc. of the 1996 IEEE Symposium on Security and Privacy*, 1996, pp. 55-61.

\* cited by examiner

PHYSICAL ACCESS CONTROL

CROSS-REFERENCE TO RELATED APPLICATIONS

The present application is based on: U.S. Provisional Application No. 60/370,867, filed Apr. 8, 2002, entitled SCALABLE CERTIFICATE VALIDATION AND SIMPLIFIED PKI MANAGEMENT; U.S. Provisional Application No. 60/372,951, filed Apr. 16, 2002, entitled CLOCK-LESS DEVICE VALIDATION; U.S. Provisional Application No. 60/373,218, filed Apr. 17, 2002, entitled TECHNIQUES FOR TRAVERSING HASH SEQUENCES; U.S. Provisional Application No. 60/374,861, filed Apr. 23, 2002, entitled PHYSICAL ACCESS CONTROL; U.S. Provisional Application No. 60/420,795, filed Oct. 23, 2002, entitled SECURE PHYSICAL ACCESS; U.S. Provisional Application No. 60/421,197, filed Oct. 25, 2002, entitled REAL TIME CREDENTIALS OVER OCSP; U.S. Provisional Application No. 60/421,756, filed Oct. 28, 2002, entitled REAL TIME CREDENTIALS; U.S. Provisional Application No. 60/422,416, filed Oct. 30, 2002, entitled PROTECTING MOBILE COMPUTING RESOURCES; U.S. Provisional Application No. 60/427,504, filed Nov. 19, 2002, entitled PRIVATE KEY SECURE PHYSICAL ACCESS OR REAL TIME CREDENTIALS (RTCs) IN KERBEROS-LIKE SETTINGS; U.S. Provisional Application No. 60/443,407, filed Jan. 29, 2003, entitled THREE-FACTOR AUTHENTICATION WITH REAL-TIME VALIDATION; and U.S. Provisional Application No. 60/446,149, filed Feb. 10, 2003, entitled RTC PHYSICAL ACCESS WITH LOWER-END CARDS; the teachings of all of which are incorporated herein by reference.

The present application is a continuation in part of U.S. patent application Ser. No. 10/103,541, filed Mar. 20, 2002, entitled SCALABLE CERTIFICATE VALIDATION AND SIMPLIFIED MANAGEMENT, (pending), the teachings of which are incorporated herein by reference, which itself is a continuation in part of U.S. patent application Ser. No. 09/915,180, filed Jul. 25, 2001, now U.S. Pat. No. 6,766,450 entitled CERTIFICATE REVOCATION SYSTEM, (pending), and which is a continuation of U.S. patent application Ser. No. 09/483,125, filed Jan. 14, 2000, now U.S. Pat. No. 6,292,893, which is a continuation of U.S. patent application Ser. No. 09/356,745, filed Jul. 19, 1999, now abandoned, which is a continuation of U.S. patent application Ser. No. 08/823,354, filed Mar. 24, 1997, (now U.S. Pat. No. 5,960,083), which is a continuation of U.S. patent application Ser. No. 08/559,533, filed Nov. 16, 1995, (now U.S. Pat. No. 5,666,416), which is based on U.S. Provisional Patent Application No. 60/006,038, filed Oct. 24, 1995. U.S. patent application Ser. No. 10/103,541 is also a continuation in part of U.S. patent application Ser. No. 08/992,897, filed Dec. 18, 1997, now U.S. Pat. No. 6,487,658 which is based on U.S. Provisional Application No. 60/033,415, filed Dec. 18, 1996, and which is a continuation in part of U.S. patent application Ser. No. 08/715,712, filed Sep. 19, 1996, entitled CERTIFICATE REVOCATION SYSTEM, (abandoned), which is based on U.S. Provisional Application No. 60/004,796, filed Oct. 2, 1995, entitled CERTIFICATE REVOCATION SYSTEM. U.S. patent application Ser. No. 08/992,897 is also a continuation in part of U.S. patent application Ser. No. 08/729,619, filed Oct. 11, 1996, entitled TREE-BASED CERTIFICATE REVOCATION SYSTEM, (now U.S. Pat. No. 6,097,811), which is based on U.S. Provisional Application No. 60/006,143, filed Nov. 2, 1995, entitled TREE BASED CERTIFICATE REVOCATION SYSTEM. U.S. patent application Ser. No. 08/992,897 is also a continuation in part of U.S. patent application Ser. No. 08/804,868, filed Feb. 24, 1997, entitled TREE-BASED CERTIFICATE REVOCATION SYSTEM, (abandoned), which is a continuation of U.S. patent application Ser. No. 08/741,601, filed Nov. 1, 1996, entitled TREE-BASED CERTIFICATE REVOCATION SYSTEM, (abandoned), which is based on U.S. Provisional Application No. 60/006,143, filed Nov. 2, 1995, entitled TREE-BASED CERTIFICATE REVOCATION SYSTEM. U.S. patent application Ser. No. 08/992,897, is also a continuation in part of U.S. patent application Ser. No. 08/872,900, filed Jun. 11, 1997, entitled WITNESS BASED CERTIFICATE REVOCATION SYSTEM, (abandoned), which is a continuation of U.S. patent application Ser. No. 08/746,007, filed Nov. 5, 1996, entitled CERTIFICATE REVOCATION SYSTEM, (now U.S. Pat. No. 5,793,868), which is based on U.S. Provisional Application No. 60/025,128, filed Aug. 29, 1996, entitled CERTIFICATE REVOCATION SYSTEM. U.S. patent application Ser. No. 08/992,897 is also based on U.S. Provisional Application No. 60/035,119, filed Feb. 3, 1997, entitled CERTIFICATE REVOCATION SYSTEM, and is also a continuation in part of U.S. patent application Ser. No. 08/906,464, filed Aug. 5, 1997, entitled WITNESS BASED CERTIFICATE REVOCATION SYSTEM, (abandoned), which is a continuation in part of U.S. patent application Ser. No. 08/763,536, filed Dec. 9, 1996, entitled WITNESS BASED CERTIFICATE REVOCATION SYSTEM, (now U.S. Pat. No. 5,717,758), which is based on U.S. Provisional Application No. 60/024,786, filed Sep. 10, 1996, entitled WITNESS BASED CERTIFICATE REVOCATION SYSTEM, and is based on U.S. patent application Ser. No. 08/636,854, filed Apr. 23, 1996, (now U.S. Pat. No. 5,604,804), and is also based on U.S. Provisional Application No. 60/025,128, filed, Aug. 29, 1996, entitled CERTIFICATE REVOCATION SYSTEM. U.S. patent application Ser. No. 08/992,897 is also a continuation in part of U.S. patent application Ser. No. 08/756,720, filed Nov. 26, 1996, entitled SEGMENTED CERTIFICATE REVOCATION LISTS, (abandoned), which is based on U.S. Provisional Application No. 60/025,128, filed Aug. 29, 1996, entitled CERTIFICATE REVOCATION SYSTEM, and is also based on U.S. Pat. No. 08/715,712, filed Sep. 19, 1996, entitled CERTIFICATE REVOCATION SYSTEM, (abandoned), and is also based on U.S. patent application Ser. No. 08/559,533, filed Nov. 16, 1995, (now U.S. Pat. No. 5,666,416). U.S. patent application Ser. No. 08/992,897 is also a continuation in part of U.S. patent application Ser. No. 08/752,223, filed Nov. 19, 1996, entitled CERTIFICATE ISSUE LISTS, (now U.S. Pat. No. 5,717,757), which is based on U.S. Provisional Application No. 60/025,128, filed Aug. 29, 1996, entitled CERTIFICATE REVOCATION SYSTEM, and is also a continuation in part of U.S. patent application Ser. No. 08/804,869, filed Feb. 24, 1997, entitled TREE-BASED CERTIFICATE REVOCATION SYSTEM, (abandoned), which is a continuation of U.S. patent application Ser. No. 08/741,601, filed Nov. 1, 1996, entitled TREE-BASED CERTIFICATE REVOCATION SYSTEM, (abandoned), which is based on U.S. Provisional Application No. 60/006,143, filed Nov. 2, 1995, entitled TREE-BASED CERTIFICATE REVOCATION SYSTEM. U.S. patent application Ser. No. 08/992,897, is also a continuation in part of U.S. patent application Ser. No. 08/823,354, filed Mar. 24, 1997, entitled CERTIFICATE REVOCATION SYSTEM, (now U.S. Pat. No. 5,960,083), which is a continuation of U.S. patent application Ser. No. 08/559,533, filed Nov. 16, 1995, entitled CERTIFICATE REVOCATION SYSTEM, (now U.S. Pat. No. 5,666,416), which is based on U.S. Provisional Application No. 60/006, 038, filed Oct. 24, 1995, entitled ENHANCED CERTIFICATE REVOCATION SYSTEM. U.S. patent application Ser. No. 10/103,541 is also based on U.S. Provisional Application No. 60/277,244, filed Mar. 20, 2001, and U.S. Provisional Application No. 60/300,621, filed Jun. 25, 2001, and U.S. Provisional Application No. 60/344,245, filed Dec. 27, 2001. All of the above are incorporated herein by reference.

The present application is also a continuation in part of U.S. patent application Ser. No. 09/915,180, filed Jun. 25, 2001, entitled CERTIFICATE REVOCATION SYSTEM, (pending), the teachings of which are incorporated herein by reference, which itself is a continuation of U.S. patent application Ser. No. 09/483,125, filed Jan. 14, 2000, (pending), which is a continuation of U.S. patent application Ser. No. 09/356,745, filed Jul. 19, 1999, (abandoned), which is a continuation of U.S. patent application Ser. No. 08/823,354, filed Mar. 24, 1997, (now U.S. Pat. No. 5,960,083), which is a continuation of U.S. patent application Ser. No. 08/559,533, filed Nov. 16, 1995, (now U.S. Pat. No. 5,666,416), which is based on U.S. Provisional Application No. 60/006, 038, filed Oct. 24, 1995, abandoned. The teachings of all of the above are incorporated herein by reference.

The present application is also a continuation in part of U.S. patent application Ser. No. 10/395,017, filed Mar. 21, 2003, entitled EFFICIENT CERTIFICATE REVOCATION, (pending), the teachings of which are incorporated herein by reference, which itself is a continuation of U.S. patent application Ser. No. 10/244,695 filed Sep. 16, 2002 (pending), which is a continuation of U.S. patent application Ser. No. 08/992,897 filed Dec. 18, 1997, (now U.S. Pat. No. 6,487,658), which is based on U.S. provisional patent application No. 60/033,415, filed Dec. 18, 1996, and which is a continuation in part of U.S. patent application Ser. No. 08/715,712, filed Sep. 19, 1996, entitled CERTIFICATION REVOCATION SYSTEM, Abandoned, which is based on U.S. Patent Application No. 60/004,796, Oct. 2, 1995, entitled CERTIFICATE REVOCATION SYSTEM, and which is also a continuation in part of U.S. patent application Ser. No. 08/729,619, filed Oct. 10, 1996, entitled TREE-BASED CERTIFICATE REVOCATION SYSTEM, (now U.S. Pat. No. 6,097,811), which is based on U.S. Patent Application No. 60/006,143, filed Nov. 2, 1995, entitled Tree Based CERTIFICATE REVOCATION SYSTEM, and which is also a continuation in part of U.S. patent application Ser. No. 08/804,868, filed Feb. 24, 1997, entitled Tree-Based CERTIFICATE REVOCATION SYSTEM, Abandoned, which is a continuation of U.S. patent application Ser. No. 08/741,601, filed Nov. 1, 1996, entitled TREE-BASED CERTIFICATE REVOCATION SYSTEM, Abandoned, which is based on U.S. Patent Application No. 60/006,143, filed Nov. 2, 1995, entitled TREE-BASED CERTIFICATE REVOCATION SYSTEM, and which is also a continuation in part of U.S. patent application Ser. No. 08/872,900, filed Jun. 11, 1997, entitled WITNESS BASED CERTIFICATE REVOCATION SYSTEM, Abandoned, which is a continuation of U.S. patent application Ser. No. 08/746,007 filed Nov. 5, 1996, entitled CERTIFICATE REVOCATION SYSTEM, (Now U.S. Pat. No. 5,793,868), which is based on U.S. Patent Application No. 60/025,128, filed Aug. 29, 1996, entitled CERTIFICATE REVOCATION SYSTEM, and which is also based on U.S. Patent Application No. 60/035, 119, filed Feb. 3, 1997, entitled CERTIFICATE REVOCATION SYSTEM, and which is also a continuation in part of U.S. patent application Ser. No. 08/906,464, filed Aug. 5, 1997, entitled WITNESS BASED CERTIFICATE REVOCATION SYSTEM, Abandoned, which is a continuation of U.S. patent application Ser. No. 08/763,536 filed Dec. 9, 1996, entitled WITNESS BASED CERTIFICATE REVOCATION SYSTEM, (now U.S. Pat. No. 5,717,758), which is based on U.S. Patent Application No. 60/024,786, filed Sep. 10, 1996, entitled WITNESS BASED CERTIFICATE REVOCATION SYSTEM, and is also based on U.S. patent application Ser. No. 08/636,854, filed Apr. 23, 1997, (now U.S. Pat. No. 5,604,804), and U.S. Patent Application No. 60/025,128, filed Aug. 29, 1996, entitled CERTIFICATE REVOCATION SYSTEM, and which is also a continuation in part of U.S. patent application Ser. No. 08/756,720, filed Nov. 26, 1996, entitled SEGMENTED CERTIFICATE REVOCATION LISTS, Abandoned, which is based on U.S. Patent Application No. 60/025,128, filed Aug. 29, 1996, entitled CERTIFICATE REVOCATION SYSTEM, and also based on U.S. patent application Ser. No. 08/715,712, filed Sep. 19, 1996, entitled CERTIFICATE REVOCATION SYSTEM, Abandoned, and is also based on U.S. patent application Ser. No. 08/559,533, filed Nov. 16, 1995, (now U.S. Pat. No. 5,666,416), and which is also a continuation in part of U.S. patent application Ser. No. 08/752,223, filed Nov. 19, 1996, entitled CERTIFICATE ISSUE LISTS, (now U.S. Pat. No. 5,717,757), which is based on U.S. Patent Application No. 60/025,128, filed Aug. 29, 1996, entitled, CERTIFICATE REVOCATION SYSTEM, and is also a continuation in part of U.S. patent application Ser. No. 08/804,869, filed Feb. 24, 1997, entitled TREE-BASED CERTIFICATE REVOCATION SYSTEM, Abandoned, which is a continuation of U.S. patent application Ser. No. 08/741,601, filed Nov. 1, 1996, entitled TREE-BASED CERTIFICATE REVOCATION SYSTEM, Abandoned, which is based on U.S. Patent Application No. 60/006,143, filed Nov. 2, 1995, entitled TREE-BASED CERTIFICATE REVOCATION SYSTEM, and which is also a continuation in part of U.S. patent application Ser. No. 08/823,354 filed Mar. 24, 1997, entitled CERTIFICATE REVOCATION SYSTEM, (now U.S. Pat. No. 5,960,083) which is a continuation of U.S. patent application Ser. No. 08/559,533, filed Nov. 16, 1995, entitled CERTIFICATE REVOCATION SYSTEM, (Now U.S. Pat. No. 5,666,416), which is based on U.S. Patent Application No. 60/006,038, filed Oct. 24, 1995, entitled CERTIFICATE REVOCATION SYSTEM. The teachings of all of the above are incorporated herein by reference.

FIELD OF THE INVENTION

The present invention relates to the field of digital certificates and more particularly to the field of digital certificate validation for controlling physical access.

BACKGROUND OF THE INVENTION

In essence, a digital certificate (C) consists of a certifying authority's (CA's) digital signature securely binding together several quantities: SN, a serial number unique to the certificate, PK, the public key of the user, U, the user's identifier, $D_1$, the issue date, $D_2$, the expiration date, and additional fields. In symbols, $C=SIG_{CA}(SN, PK, U, D_1, D_2, \ldots )$.

It is widely recognized that digital certificates provide the best form of Internet and other access authentication. However, they are also difficult to manage. Certificates may expire after one year (i.e., $D_2-D_2=1$ year), but they may be revoked prior to their expiration; for instance, because their holders leave their companies or assume different duties within them. Thus, each transaction enabled by a given digital certificate needs a suitable proof of the current validity of that certificate, and that proof often needs to be archived as protection against future claims.

Unfortunately, traditional technologies for proving the validity of issued certificates do not scale well. At tomorrow's volume of digital certificates, today's validity proofs will be either too hard to obtain in a secure way, or too long and thus too costly to transmit (especially in a wireless setting). Certificate validation is universally recognized as a crucial problem. Unless efficiently solved, it will severely limit the growth and the usefulness of PKIs.

Today, there are two main approaches to proving certificates' validity: Certificate Revocation Lists (CRLs) and the Online Certificate Status Protocol (OCSP).

CRLs

CRLs are issued periodically. A CRL essentially consists of a CA-signed list containing all the serial numbers of the revoked certificates. The digital certificate presented with an electronic transaction is then compared to the most recent CRL. If the given certificate is not expired but is on the list, then everyone knows from the CRL that the certificate is not valid and the certificate holder is no longer authorized to conduct the transaction. Else, if the certificate does not appear in the CRL, then the certificate is deduced to be valid (a double negative).

CRLs have not found much favor; for fear that they may become unmanageably long. (A fear that has been only marginally lessened by more recent CRL-partition techniques.) A few years ago, the National Institute of Standards and Technology tasked the MITRE Corporation to study the organization and cost of a Public Key Infrastructure (PKI) for the federal government. (See Public Key Infrastructure, Final Report; MITRE Corporation; National Institute of Standard and Technology, 1994). This study concluded that CRLs constitute by far the largest entry in the Federal PKI's cost list.

OCSP

In the OCSP, a CA answers a query about a certificate C by returning its own digital signature of C's validity status at the current time. The OCSP is problematic in the following areas.

Bandwidth. Each validity proof generated by the OCSP has a non-trivial length. If RSA or other factoring based signature schemes are used, such a proof in fact requires at a minimum 2,048 bits for the CA's signature.

Computation. A digital signature is a computationally complex operation. In certain large applications, at peak traffic, the OCSP may require computing millions of signatures in a short time, which is computationally very expensive to do.

Communication (if centralized). Assume a single validation server implements the OCSP in a centralized manner. Then, all certificate-validity queries would have, eventually, to be routed to it, and the server will be a major "network bottleneck" causing considerable congestion and delays. If huge numbers of honest users suddenly query the server, a disrupting "denial of service" will probably ensue.

Security (if distributed). In general, distributing the load of a single server across several (e.g., 100) servers, strategically located around the world, alleviates network congestion. In the OCSP case, however, load distribution introduces worse problems than those it solves. In order to sign its responses to the certificate queries it receives, each of the 100 servers should have its own secret signing key. Thus, compromising any of the 100 servers is compromising the entire system. Secure vaults could protect such distributed servers, but at great cost.

SUMMARY OF THE INVENTION

A system and method are disclosed for controlling physical access through a digital certificate validation process that works with standard certificate formats and that enables a certifying authority (CA) to prove the validity status of each certificate C at any time interval (e.g., every day, hour, or minute) starting with C's issue date, $D_1$. C's time granularity may be specified within the certificate itself, unless it is the same for all certificates. For example, all certificates may have a one-day granularity with each certificate expires 365 days after issuance. Given certain initial inputs provided by the CA, a one-way hash function is utilized to compute values of a specified byte size that are included on the digital certificate and to compute other values that are kept secret and used in the validation process.

Controlling physical access includes reviewing real time credentials, where the real time credentials include a first part that is fixed and a second part that is modified on a periodic basis, where the second part provides a proof that the real time credentials are current, verifying validity of the real time credentials by performing an operation on the second part and comparing the result to the first part, and allowing physical access only if the real time credentials are verified as valid. The first part may be digitally signed by an authority. The authority may provide the second part or the second part may be provided by an entity other than the authority. The real time credentials may be provided on a smart card. A user may obtain the second part of the real time credentials at a first location. The user may be allowed access to a second location different and separate from the first location. At least a portion of the first part of the real time credentials may represent a one-way hash applied plurality of times to a portion of the second portion of the real time credentials. The plurality of times may correspond to an amount of time elapsed since the first part of the real time credentials were issued. Controlling physical access may include controlling access through a door.

BRIEF DESCRIPTION OF THE DRAWINGS

The invention is described with reference to the several figures of the drawing, in which.

DETAILED DESCRIPTION OF THE PREFERRED EMBODIMENTS

Secure Physical Access

Figure 1:
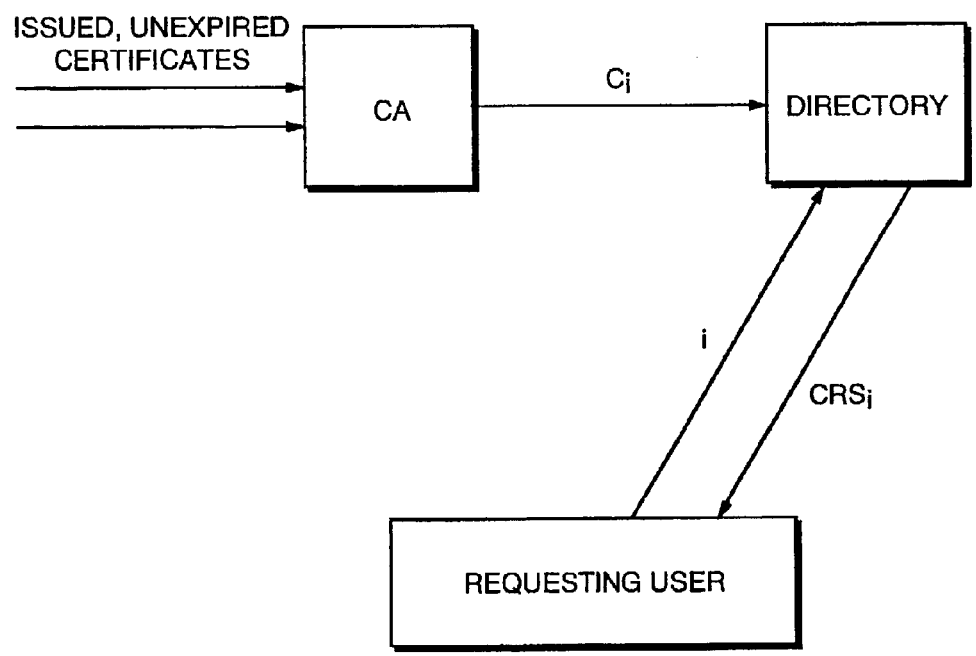
FIG. 1 is a schematic illustration of how the CA sends to a Directory individual certificate revocation status information $CRS_i$ about each of its issued, but not-yet expired certificates $C_1 \ldots C_k$, according to one embodiment of the invention.

Ensuring that only authorized individuals access protected areas is crucially important (e.g., at an airport, a military installation, office building etc.). Protected areas may be defined by physical doors (in particular doors through which a human may enter, or doors of a container, or safe, or vehicle, etc.) and walls, or may be virtually defined in other ways. For instance, a protected area may consist of an area entering which causes a detector to signal intrusion (and possibly send a signal or sound an alarm if authorization is not provided). In an airport, often entering the gate area through an exit lane will trigger such a signal, even though no doors or walls have been violated. Notice also that throughout this application, doors should be construed to include all other types of access access-control devices implementable with a traditional or more modern type of a key. In particular, key mechanisms used to start engines (so that our invention becomes a novel way to ensure that only currently authorized users may start a plane, a truck, or otherwise access other valuables).

Having established the generality of our context, in the sequel for concreteness, but without loss of generality intended, we shall refer to a "door" as the means of controlling access or establishing the perimeter and to "entering" as the means of accessing an area which one wishes to protect.

Smart doors provide such access control. At the simplest level, a smart door may be equipped with a key pad, through which a user enters his/her PIN or password. The key pad has an attached memory or elementary processor in which a list of valid PINs/passwords are stored, so that it can be checked whether the currently entered one belongs to the list. If so, the door opens, else it remains lock. Such elementary access control mechanism offers minimum security. In particular a terminated employee may no longer be authorized to go trough that door; yet, if he still remembers his own PIN, he would have no trouble to open such an elementary smart door. Therefore, it would be necessary to "deprogram" the PIN of terminated employees. Such a procedure, however, may be very cumbersome and costly: an airport facility may have hundreds of doors, and dispatching a special team of workers to go out and deprogram all of such doors whenever an employee leaves or is terminated may be too impractical. More security is certainly needed, without incurring excessive costs and sacrificing convenience.

Of course, rather than (solely) relying on traditional keys or simple key pads, a more modern smart door may work (in alternative or in conjunction) with cards—such as smart cards and mag-strip cards—or contactless devices. But this enhanced set of tools does notper se guarantee the security, convenience and low-cost of the access-control system. These crucially depend on how such tools are used in the overall security architecture.

Ideally, a smart door should identify the person entering and verify that he is currently authorized to do so. Of the two tasks, the first is perhaps easier. Identification may be performed in a variety of ways: in particular:
1. using PINs and passwords, that can be entered at a key pad associated to the door;
2. using biometrics, that can be entered by users via special readers associated with the door;
3. using traditional signatures, provided by the user via a special pad associated to the door;
4. using a smart cards or contactless cards (e.g., sending a PIN to the door via a special reader/receiver)
5. using a digital certificate—e.g., one stored in a smart card, contactless card or a wireless device, that can "communicate to the door" via a card reader or other receiver.

We believe that digital certificates are particularly attractive for use within the inventive system, and thus we wish to elaborate a little further on some ways to use them with smart doors which we envision incorporating within the inventive system. For concreteness, but without loss of generality intended, we will refer to the device in possession of a person wishing access as a "card." The card may store a digital certificate and the corresponding secret key(s). Upon proper command from the cardholder (performed, for example, by punching a secret code on a key pad on the card), the card would transmit the digital certificate to the door mechanism and perform an identification protocol (e.g., decrypt a random challenge) by using the corresponding secret key. Preferably, the digital certificate, and particularly its corresponding secret key(s), should be protected within a secure-hardware portion of the card/device.

In some cases, one wishes to have anonymous yet secure access control. In this case, identification needs not be performed, but authorization still needs to be performed. In most cases, however, identification in some form is mandated: thus we can assume that identification can or has already been performed (e.g, by any one of the 5 methods described above). Either way: how can authorization be performed? Even if the door knows for certain that it is dealing with John Doe, how can the door make sure that John Doe is currently authorized to enter now? Traditionally, a smart door consults a database of currently (e.g., on a given day/date) authorized users to verify that so indeed is the individual requesting access. But this requires that the smart door to be connected to the distant database. Moreover, this is not ordinary network connection: it must be a secure network connection. In fact, not only one must use cryptographically protected communication to prevent an impostor from impersonating the database to the door, but must also prevent an enemy to cut the wire connecting the door to the database, else once disconnected a door must choose from equally bad options: (a) always open or (b) always remain closed. But a secure network connection easily dwarfs the cost of the electromechanical component of the door lock: a top of the line component may cost $1,000 while the secure network connection may cost $4,000 (more if a wire must securely connect large distance, such at an airport. Moreover, even after spending such $4,000, is there such a thing as a secure network connection in a public place such as an airport? Notice that providing a smart door with a wireless connection to a distant database is not a viable alternative either. First of all, long range wireless transmitters and receivers are expensive. Second, in certain facilities, wireless bandwidth can be severely restricted (to avoid possible interference with other instrumentation) or banned altogether for such uses. Third, wireless communication can be easily jammed, so as to effectively disconnect the door from the database (thus forcing it to opt for two equally bad decisions). Fourth, if the door belongs to a container in the middle of the Atlantic, most probably it cannot wireless talk to any database on the shore.

It is thus one aspect of the invention to provide low-cost, convenient and secure disconnected smart doors, that is low-cost, convenient and secure smart doors having no connection (whether wired or wireless) to any database or authority.

Digital Signatures and Certificates

In a preferred embodiment, the present invention relies on digital signatures, and preferably on 20-byte technology. Digital signatures (such as RSA) are used to prove that a given message M originates from a given user U. To this end U produces a pair of matching keys: a verification key PK and a signature key SK. Digital signatures are produced via SK, and verified via the matching key PK. A user U should keep his own SK secret (so that only U can sign on U's behalf). Digital signatures work because PK does not "betray" the matching key SK, that is, knowledge of PK does not give an enemy any practical advantage in computing SK. Therefore, a user U should make his own PK as public as possible (so that every one can verify U's signatures). For this reason PK is preferably called the public key. We shall denote by $SIG_U(M)$ U's digital signature of the message M. Digital signature is intended to include private-key signatures, in which case signed and verifier may share a common secret key.

Alphanumeric strings called certificates enable digital signatures by guaranteeing that a given key PK is indeed the public key of a user U. A Certifying Authority (CA) generates and issues a certificate to a user, once assured of the user's identity. Thus the certificate proves to everyone that the CA has verified the holder's identity, and possibly other attributes. (E.g., if a company acts as its own CA and issues certificates for its own employees, a certificate may prove the extent to which its holder is authorized to bind his/her employer.) Certificates expire after a specified amount of time, typically one year in the case of public CAs. In essence, a digital certificate C consists of a CA's digital signature securely binding together several quantities: SN, a serial number unique to the certificate, PK, the public key of the user, U, the user's name, $D_1$, the issue date, $D_2$, the expiration date, and additional data. In symbols, $C=SIG_{CA}(SN,PK,U,D_1,D_2 \ldots )$.

A certificate may also encompass the case where PK is an encryption key. In this case U may prove his identity to a verifier V by sending V the certificate C, by having V encrypt a random challenge (String) R with key PK, and then ask U to send back the decryption. If the user responds with R, then V is ensured that he is dealing with U, because only U should know the decryption key matching PK.

The preferred embodiment of the present invention provides a much better solution for access control. Specifically, if the card contains a digital certificate according to the present invention, then authorization can be performed much cheaper. Instead of consulting the central database about the validity of every digital certificate, the door would simply need to obtain the 20-byte validity proof according to the present invention that verifies the current validity of the card.

EXAMPLE 1

Let now A be an authority (i.e., entity) controlling a set of smart doors and U a user to whom access to a given door should be granted for a given period of time.

Each user possesses a card (in the general sense discussed before).

Each smart door has an associated card reader (in the general sense capable of communicating or at least receiving information from a user card), coupled with an electromechanical lock in the case of a really physical (rather than virtual) door. Preferably each door also has a unique identifier (and knows its own identifier). The door has a card reader and a non-easily tamperable clock and a computing device possessing A's public key PKA and capable of verifying A's signatures.

The authority decides which users can go through which doors in a given time interval. (For instance, without loss of generality intended, we may assume that each interval of time of interest consists of a day.) To this end, A may use her own private database DB 1, storing all permissions, that is who is authorized to go through which door at a given (or any foreseeable future day). Presumably, A protects this database, else an enemy could alter the permissions stored there to his advantage. However, A computes from DB a public database PDB as follows. For each user U having permission to go through door D at day d, A computes a digital signature SUDd indicating that indeed this is the case. For instance A computes $SUDd=SIG_A(U,D,d)$. Notice that only A can compute these digital signatures, while all having A's public key PKA can verify them. These signatures are unforgeable by someone not knowing A's secret key SKA, nor can they modified in any manner (e.g., by transforming U' permission into permission for an unauthorized user U') without making them invalid. Thus A can timely compute and send (eg, at the beginning od a day) these signatures to a repository PR without much worry. A repository is a place that can be accessed by users. For instance a server located at the employee entrance of a large facility (such as an employee entrance at an airport). Because A's signatures are unforgeable, the connection between A and PR needs not be secure. It suffices that A succeeds to transfers its signatures to PR within a reasonable time.

When employee U arrives at work on day d at the facility (eg, through a point of entrance in which PR is located) he can connect his card with PR (eg, he inserts his card in a card reader/writer connected with or remotely communicating with PR). By doing this he picks up on his card SIGUDd, the dital signature indicating that that day he is authorized to go through door D. This requires that the point of entrance, rather than hundreds of doors, be connected with A, and this connection needs not be secure either. In reality, D needs not to indicate a single door. For instance, it can indicate a set of doors (eg, baggage handling doors) and the signature of A indicates that U can go through each door indicated by D. Alternatively, a plurality of doors, D1, . . . , Dn, can be indicated one by one, and the fact that U can go that day through each one of hem can be indicated by more than one signature of A. For example SIGUD1d . . . SIGUDnd. In which case, all such signatures are transferred to U's card.

Assume now that during day d U walks around the facility and reaches a door D for which he has granted permission. Therefore, his card now stores SIGUDd. Then U may insert his card C into a card reader at door D. The processor associated with the door then verifies that the SIGUDd indeed is valid using A's public key. Then verifies that the current day is indeed d using its own clock. If both items are true, then door D opens. Notice that the door can check that the cardholder is indeed by performing identification in a variety of ways. In particular, U may also required to enter his PIN on a key pad associated with the door. (Notice that, differently than before, a dismissed employee cannot enter door D even if he remembered his own PIN. In fact the door in this example would need both the PIN and the correct signature for the current day. However, after U has been fired, A no longer produces signatures SIGUDd for any subsequent day d, therefore U cannot provide the door with such a signature. Nor can he forge such a signature of A. Therefore he cannot "convince" door D to open on any day after being fired.) Alternatively, the card can transfer SIGUDd to D's card reader only if U inputs the right PIN on a key pad on the back of C, and the repository PR may download SIGUDd onto card C, only after the card proves that indeed it is U's card. Alternatively, U may represent an identifier for card, C, belonging to U, and when inserted in the card reader, the card indeed proves—eg, by means of a cryptographic protocol, that indeed it is card C. Alternatively, end preferably, U's card carries a certificate for U, and after the proper PIN is entered, the card proves the identity of U by decrypting a random challenge of the door. In this case, it is preferable that SIGUDd indicates that U has permission to go through door D by indicating that U's certificate carries that permission for his owner. For instance, SIGUDd=SIGuDd, where u is an identifier for U's certificate, such as the serial number (and issuer) of U's certificate.

In all these ways, it should be appreciated that the door is "disconnected" from A. The door only (possibly identifies U and) checks that the U has permission of entering via an internal computation and utilizing A's public key and its own internal clock. The system therefore, not only is very secure, but also very economical.

This validity or authorization proof can be provided in a number of different ways. The following are just examples of how this can be done.

EXAMPLE 2

The card owner may "pick up" the validity proof at the appropriate time. For example, in a work environment, each person may pick up the current validity proof when reporting to work. In many work places (particularly those sensitive to security, such as airports), employees sign in when reporting to work. This "sign in" may include obtaining the 20-byte validity, SIGUDd, and storing it on the card.value and storing it on the card. The card may obtain the value via a wired or a wireless connection.

EXAMPLE 3

The card may obtain the validity proof via a wireless network, such the pager network, for example. At the appropriate time, if the card is authorized for access, a 20-byte value is sent to it. Note that the bandwidth requirements are minimal: the authorization value is shorter than a typical message transmitted by the pager network. At the appropriate time, if the card is authorized for access, SIGUDd is sent to it.

EXAMPLE 4

The door may obtain the validity proof similarly via a wired or a wireless network, for every card that it expects to encounter, in advance.

EXAMPLE 5

The door may obtain the validity proof for a card on demand, when the card starts interacting with it.

Note that none of the above methods require any sort of secure connection between the door and a central server. This is so because the validity proof is self-authenticating, so that even if the door receives it from an untrusted source and/or via an insecure connection, it can still ascertain its correctness. The fact that these methods require no connection at all for the door provides a much better means for access control in large and/or remote areas, areas with multiple doors and mobile areas, such as airplanes' or trucks' doors.

Note also that throughout this application, door and protected areas should be construed to include all other types of access points that could be protected with a traditional or more modern type of key. In particular, key mechanism that used to start engines (so that only currently authorized employees may start a plane, a truck, or other engine).

Those skilled in the art can realize that the 20-byte validity proof is a special, restricted type of a digital signature scheme, and while it offers unique benefits, such as compactness and efficiency, many other benefits can be derived by practicing the invention with more general digital signature schemes, possibly without validation technology. The components of the preferred embodiment of the present invention are: (1) A door mechanism capable of verifying digital signatures, coupled with means of opening the door upon successful verification; (2) An authority component, providing a digital signature signifying that authorization for entering through the door has been granted for a given time period; (3) A card or other wired/wireless device component capable of receiving a digital signature and presenting it. The authorization of access may be accomplished by any of the following sequences of steps:

Sequence 1:
(1) The authority component causes the card to receive the authorizing signature;
(2) The card receives and stores the authorizing signature;
(3) The card presents the authorizing signature to the door, which verifies it and opens if and only if the authorizing signature is valid Sequence 2:
(1) The card presents itself to the door requesting authorization for access;
(2) The door requests the authorizing signature;
(3) The authority component causes the door to receive the authorizing signature;
(4) The door verifies the authorizing signature and opens if and only if it is valid.

Sequence 3:
(1) The card requests the authorizing signature from the authority component
(2) The authority component transmits the authorizing signature to the card;
(3) The card receives and stores the authorizing signature;
(4) The card presents the authorizing signature to the door, which verifies it and opens if and only if the authorizing signature is valid.

Sequence 4:
(1) The door receives in advance (either at its own request or not) authorizing signatures for a plurality of cards it is expected to encounter from the authority component;
(2) The card presents itself to the door requesting authorization for access;

(3) The door verifies the card's authorizing signature and opens if an only if it is valid.

These sequences are only some of the multitude of examples. In addition, these sequences may be combined. For example, the door may receive part of the information/authorization (e.g., the 20-byte value), while the card may receive another part (e.g., the digital certificate). They may also be separated in time: the card may receive part of the information/authorization (e.g., the digital certificate) at first, and then receive other parts (e.g., the 20-byte value for each hour) later.

Moreover, the authorizing digital signatures may be tied to the long-term certificate of the cardholder. For example, the card may contain a long-term certificate valid for each year, and the authority component may issue daily signatures verifying that the certificate is still valid on the current day.

The authority component may generate authorizations automatically, without any requests. For example, every night the authority component may generate authorizing signatures for the employees that will be authorized for the next day. This approach enables the authorization component to be non-interactive and thus easier to build securely.

In addition, the authority component may use separate, possibly insecure devices, for dissemination of authorizing signatures to cards and/or doors. This will enable the authorization component to focus on only one task: generation of authorizations. It will remove the need for the cumbersome direct connections between the secure authorization component and the (possibly less secure) doors and cards. Specifically, dissemination of authorizations may occur as follows: (1) The authority component generates authorizations; (2) The authority component transmits authorization, over possibly insecure connections, to dissemination databases. These databases may be at multiple locations, and need not be secured. For example, in a company with five employee entrances, there may be one dissemination database at each entrance; (3) The dissemination databases transmit authorizations to cards and/or doors, either upon request ("pull") or automatically ("push").

The property enabling the above methods is that the authorization itself is unforgeable—it can be produced only by the authority component. Therefore, once produced, it can be disseminated over possibly untrusted lines and devices without any risks to security. This removes the need for any other party or device to interact with the authority component, thus resulting in a much cheaper solution than any requiring secure connections.

In fact, no connections among any of the components in this system need to be secured. (Only the authority component itself has to be secured, so that inappropriate authorizations are not produced.) Thus, a fault-tolerant, distributed access authorization infrastructure can be much more easily built. Moreover, as stated above, it is possible to build such an infrastructure without any connections needed for the doors.

It should be appreciated that the inventive access control system can be combined with the tenant CAs of Section 3. For instance, several authorities (e.g., in an office building, the parking authority, the cleaning authority, or the multiple companies sharing occupancy in the building) may utilize the same certificate while retaining individual control over the ability of its holder to access the various protected areas.

EXAMPLE 6

The system could operate as follows. A user U (or his card) has a certificate CERT that contains a validation field—say D365—for each door D of interest. Permission that U can go through door D at day j can be proved by releasing the unforgeable 20-byte value X365-j. Door D can check that permission by hashing it j times and checking whether the result coincides with the validity field D365 of CERT. In case A must deal with a plurality of doors (eg, 1000 doors, then CERT may contain 1000 different validity fields, each corresponding to different doors, and each door Dj checks its computations relative to the jth validity field. In this case, even if permission for a user to go through each door is proved separately, each user has at most 1000 proofs on a given day. Thus at most 20 K bytes need to be loaded on his card on a given day.

Notice that because cards are general cards here, the card can be a contactless card, the card reader may be a receiver, and the card need not be inserted into the reader but transmit to it. Notice that such a "wireless" card-reader interaction is still quite local, and very different from a card-authority/database interaction when A or the database is far away.

Moreover, the authorizing digital signatures may be tied to the long-term certificate of the cardholder. For example, the card may contain a long-term certificate valid for each year, and the authority component may issue daily signatures verifying that the certificate is still valid on the current day.

The authority component may generate authorizations automatically, without any requests. For example, every night the authority component may generate authorizing signatures for the employees that will be authorized for the next day. This approach enables the authorization component to be non-interactive and thus easier to build securely.

In fact, no connections among any of the components in this system need to be secured. (Only the authority component itself has to be secured, so that inappropriate authorizations are not produced.) Thus, a fault-tolerant, distributed access authorization infrastructure can be much more easily built. Moreover, as stated above, it is possible to build such an infrastructure without any connections needed for the doors.

It should be appreciated that the inventive access control system can be combined with the tenant CAs as described. For instance, several authorities (e.g., in an office building, the parking authority, the cleaning authority, or the multiple companies sharing occupancy in the building) may utilize the same certificate while retaining individual control over the ability of its holder to access the various protected areas.

Logging Proofs of Access With Disconnected Doors

While disconnected (from authorities and databases) and yet very secure, low-cost and convenient smart doors are preferable to connected smart doors, the latter provide for the ability of logging access through a given door. For instance, it can be important to know who went through a given door on a given day. Connected doors may easily do this by sending proper "access information to a distant database or authority. But disconnected doors cannot quite do that. Access information can be gather by sending proper personal to collect such information from door to door. This may not be always convenient to do. However, the following system provides a very viable alternative.

When a user U passes (or attempts to pass) through a door D at a time t, the door may produce a proper string LOGUDt, and locally store it (at least temporarily). To ensure that this info reaches a proper database, the door may use the cards used to enter through it. For instance, D may write LOGUDt (or cause LOGUDt to be written) on the card(s) of other user(s) U' (possibly including U himself). Whenever U' makes a connection with PR (eg the next day of work) or with any other wired or well connected device, then PR or said device transmits LOGUDt to the proper database. This way a proper database will eventually receive and then store more permanently and in an easily auditable way LOGUDt. Possibly the database will receive redundant copies of LOGUDt, but it is easy for it to clear any unwanted redundancy and keep clean copies only.

A preferable LOGUDt, is one that consists or includes a digital signature of U himself. This way, U cannot easily deny that he went through a given door at a given time and claim that the access information of the door is a fabrication. Indeed, only he has the secret signing key for producing LOGUDt. For instance LOGUDt e consist of $SIG_U(D,t)$, indicating that U went through door D at time t. This is very easy to accomplish if user U's card carries the secret signing key SKU matching a public key PKU. Preferably the card also carries a digital certificate for PKU, and thus LOGUD may include not only SIGu(D,t), but also U's certificate. Preferably too, the user card may produce $SIG_U(D,t)$ according to the time t shown on its own clock, and the door may let U in only after he provides such a good access proof $SIG_U(D,t)$ (possibly in addition to other authorization proofs such as those discussed above), and provided that the time certified by U is sufficiently close to the current time t' as measured by the door clock. Still the user may claim that he entered at time t door D, but that this door was somewhere else altogether, and thus that $SIG_U(D,t)$ does not at all prove that he went through—say—the second door of the third floor of a given building: someone went through the trouble to transfer to said location the door reader etc. To prevent this claim too, or to protect the user against such fraud, the user card (device) may incorporate a GPS mechanism, and $SIG_U(D,t)$ may actually include the local position lp as measured by the card. In which case, the user may tend to the door the proof of access $SIG_U(D,t, ps)$, and the door may accept it and let the user in only if not only the time looks correct but also the local position. Rather than computing ps inside the card/device, the user may use some one or more components, which he trusts, and which can compute his position from information they receive from him (and possibly their own positions).

Implementation

The Basic System

As seen in the FIG. 1, the CA sends to a Directory individual certificate revocation status information CRSI about each of its issued, but not-yet expired certificates $C_1 \ldots C_k$. The Directory sends $CRS_i$ to a requesting user who has inquired about certificate serial number "i" of that certifying authority.

A system and method are disclosed for controlling physical access through a digital certificate validation process that works with standard certificate formats (e.g., X.509v3) and that enables a certifying authority (CA) to prove the validity status of each certificate C at any time interval (e.g., every day, hour, or minute) starting with C's issue date, $D_1$. C's time granularity may be specified within the certificate itself, unless it is the same for all certificates. To be concrete, but without limitation intended, below we assume a one-day granularity for all certificates, and that each certificate expires 365 days after issuance.

Making a certificate C. In addition to traditional quantities such as a serial number SN, a public key PK, a user name U, an issue date $D_1$, an expiration date $D_2$ (=$D_1$+365), a certificate C also includes two 20-byte values unique to it. Specifically, before issuing a certificate C, a CA randomly selects two different 20-byte values, $Y_0$ and $X_0$, and from them computes two corresponding 20-byte values, $Y_1$ and $X_{365}$, using a one-way hash function H enjoying the following properties: H is at least 10,000 times faster to compute than a digital signature; H produces 20-byte outputs, no matter how long its inputs; and H is hard to invert: given Y, finding X such that H(X)=Y is practically impossible. (See, for example, Secure Hash Standard; FIPS PUB 180, Revised Jul. 11, 1994 (Federal Register, Vol. 59, No. 131, pp. 35211-34460); revised Aug. 5, 1994 (Federal Register Vol. 59, No. 150, pp. 39937-40204). Value $Y_1$ is computed by hashing $Y_0$ once: $Y_1=H(Y_0)$; and $X_{365}$ by hashing $X_0$ 365 times: $X_1=H(X_0)$, $X_2=H(X_1)$, $\ldots$, $X_{365}=H(X_{364})$. Because H always produces 20-byte outputs, $Y_1$, $X_{365}$, and all intermediate values $X_j$ are 20-byte long. The values $Y_0, X_0, X_1, \ldots, X_{364}$ are kept secret, while $Y_1$ and $X_{365}$ are included in the certificate: $C=SIG_{CA}(SN,PK,U,D_1, D_2,\ldots,Y_1,X_{365})$. We shall call $Y_1$ the revocation target and $X_{365}$ the validity target.

Revoking and validating a not-yet-expired certificate C. On the i-th day after C's issuance (i.e., on day $D_1$+i), the CA computes and releases a 20-byte proof of status for C as follows. If C is revoked, then, as a proof of C's revocation, the CA releases $Y_0$, that is, the H-inverse of the revocation target $Y_1$. Else, as a proof of C's validity on that day, the CA releases $X_{365-i}$, that is, the i-th H-inverse of the validity target $X_{365}$. (E.g., the proof that C is valid 100 days after issuance consists of $X_{265}$.) The CA may release $Y_0$ or $X_{365-i}$ by providing the value in response to a query or by posting it on the World Wide Web.

Verifying the status of a not-yet-expired certificate C. On any day, C's revocation proof, $Y_0$, is verified by hashing $Y_0$ once and checking that the result equals C's revocation target, $Y_1$. (I.e., the verifier tests for himself that $Y_0$ really is the H-inverse of $Y_1$.) Note that $Y_1$ is guaranteed to be C's revocation target, because $Y_1$ is certified within C. On the i-th day after C's issuance, C's validity proof on that day, $X_{365-i}$, is verified by hashing i times the value $X_{365-i}$ and checking that the result equals C's validity target, $X_{365}$. (I.e., the verifier tests for himself that $X_{365-i}$ really is the i-th H-inverse of $X_{365}$.) Note that a verifier knows the current day D as well as C's issuance date $D_1$ (because $D_1$ is certified within C), and thus immediately computes i=D−$D_1$.

Security

A proof of revocation cannot be forged. The proof of revocation of a certificate C consists of the H-inverse of C's revocation target $Y_1$. Because H is essentially impossible to invert, once a verifier checks that a given 20-byte value $Y_0$ is indeed C's proof of revocation, it knows that $Y_0$ must have been released by the CA. In fact, only the CA can compute the H-inverse of $Y_1$: not because the CA can invert H better than anyone else, but because it computed $Y_1$ by starting with $Y_0$ and hashing it! Because the CA never releases C's revocation proof as long as C remains valid, an enemy cannot fake a revocation proof.

A proof of validity cannot be forged. On day i, the proof of validity of a certificate C consists of the i-th H-inverse of C's validity target $X_{365}$. Because H is essentially impossible to invert, once a verifier checks that a given 20-byte value $X_{365-i}$ is indeed C's proof of validity on day i, it knows that the CA must have released X365-i. In fact, only the CA can compute the i-th H-inverse of $X_{365}$: not because the CA can invert H better than anyone else, but because it computed $X_{365}$ by starting with $X_0$ and hashing it 365 times, thus computing along the way all the first 365 inverses of $X_{365}$! If certificate C become revoked on day i+1, the CA has already released the values $X365-1, \ldots, X_{365-i}$ in the preceding i days (when C was still valid) but has not released and will never release the value $X_{365-i-1}$ (or any other value $X_j$ for j<365-i) in the future. Consequently, to forge C's validity proof on day i+1, an enemy should compute on his own the i+1st H-inverse of $X_{365}$ (i.e., the H-inverse of $X_{365-i}$), which is very hard to do! Similarly, an enemy cannot compute a validity proof for C on any day after i+1. To do so, it should again be able to invert H on input $X_{365-i}$. For instance, if it could compute C's validity proof on day i+2, $X_{362-i-2}$, then by hashing it once it would easily obtain $X_{365-i-1}$, the H-inverse of $X_{365-i}$.

Efficiency

A certificate C includes only two additional 20-byte values, $Y_1$ and $X_{365}$. This is a negligible cost. Recall that C already consists of a CA signature (at least 2048-bit long) of data that includes a public key PK (at least 1024-bit long), and that C may include comments and plenty of other data in addition to SN, PK, U, $D_1$ and $D_2$.

Generating $Y_1$ and $X_{365}$ requires only 366 hashings total. This too is a negligible cost. Recall that issuing a certificate already requires computing a signature.

Proofs of revocation and proofs of validity are only 20-bytes long. Our 20-byte proofs are trivial to transmit and trivial to store, making the 20-byte technology ideal for wireless applications (because here bandwidth is still limited, and so is the storage capacity of many cellular phones and other wireless devices).

Proofs according to embodiments of the present invention can be so short because they derive their security from elementary cryptographic components, such as one-way functions, which should exhibit an exponential amount of security. (Quite differently, digital signature schemes have complex security requirements. Their typical number-theoretic implementations offer at best a sub-exponential amount of security, and thus necessitate much longer keys.)

The proofs remain 20-bytes long whether the total number of certificates is a few hundred or a few billion. In fact there are $2^{160}$ possible 20-byte strings, and the probability that two certificates may happen to have a common proof of revocation or validity is negligible.

Note too that the length of our 20-byte proofs does not increase due to encryption or authentication. Our 20-byte proofs are intended to be public and thus need not be encrypted. Similarly, our 20-byte proofs are self-authenticating: by hashing them the proper number of times they yield either the validity target or the revocation target specified within the certificate. They will not work if faked or altered, and thus need not be signed or authenticated in any manner.

Finally, a 20-byte proof of validity on day i, $X_{365-i}$, need not additionally include the value i: in a sense, it already includes its own time stamp! Indeed, as discussed before, i is the difference between the current day and the certificate's issue day, and if hashing $X_{365-i}$ i times yields the validity target of certificate C, then this proves that $X_{365-i}$ is C's proof of validity on day i.

The 20-byte proofs are computed instantly. A proof of revocation $Y_0$ or a proof of validity $X_{365-i}$ is just retrieved from memory. (Alternatively, each $X_{365-i}$ could be recomputed on the fly on day i; for instance by at most 364 hashings, if just $X_0$ is stored during certificate issuance. Surprisingly more efficient strategies are discussed in the next section.)

Wireless Environment

Embodiments of the present invention are ideal for wireless implementations. Its scalability is enormous: it could accommodate billions of certs with great ease. The bandwidth it requires is negligible, essentially a 30-bit serial number for the query and 20-byte for the response. The computation it requires is negligible, because a certificate-status query is answered by a single table look-up and is immediately verified. Of course, great scalability, minimum bandwidth and trivial computation make the present invention a technology of choice in a wireless environment.

But there is another use of the present invention that provides an additional advantage in wireless applications. Namely, every morning—e.g., at midnight—a wireless user may receive a 20-byte proof of the validity of his certificate for the remainder of the day. (This 20-byte value can be obtained upon request of the user, or pushed to the user's cellular device automatically—e.g., by means of a SMS message or other control message.) Due to its trivial length, this proof can be easily stored in most cellular telephones and PDAs. Then, whenever the user wants to transact on that day, the user simply sends its own certificate together with the cert's 20-byte proof of validity for that day. Because the proof of validity is universally verifiable, the verifier of the cert and proof need not call any CA or any responder. The verifier can work totally off-line. In the cellular environment, in which any call translates into money and time costs, this off-line capability is of great value.

Comparing to OCSP

The present invention and OCSP are both on-demand systems: namely, a user sends a query about the current validity of a certificate and gets back an unforgeable and universally verifiable proof as a response. But there are differences in: Time accuracy; Bandwidth; CA efficiency; Security; and Operating costs.

Time Accuracy: In principle, an OCSP response may specify time with unbounded accuracy, while a response according the preferred embodiment of the present invention specifies time with a predetermined accuracy: one day, one hour, one minute, etc. In low-value applications, one-day validity is plenty acceptable. For most financial applications, Digital Signature Trust considers a 4-hour accuracy sufficient. (Perhaps this is less surprising than it seems: for most financial transactions, orders received in the morning are executed in the afternoon and orders received in the afternoon are executed the next business day.) In any event, time is not specified by a real number with infinitely many digits. In an on-demand validation system, a time accuracy of less than one minute is seldom meaningful, because the clocks of the querying and answering parties may not be that synchronized. Indeed, in such a system, a time accuracy of 15 seconds is defacto real time.

To handle such an extreme accuracy, the preferred embodiment of the present invention computes hash chains that are roughly IM long (i.e., needs to compute validity fields of the type XIM), because there are at most 527,040 minutes in a year. If chains so long could be handled efficiently, preferred embodiments of the present invention would de facto be real time. Computing IM hashings is not problematic at certificate issuance: IM hashings can be performed in less than 1 second even using very reasonable platforms, and a certificate is typically issued only once a year, and not under tremendous time pressure. Similarly, 1 second of computation is not problematic for the verifier of a cert validity proof (e.g., a merchant relying on the certificate) considering that he generally focuses just on an individual transaction, and has more time at hand. Computing IM hashings per certificate-status request would, however, affect the performance of the server producing validity proofs, because it typically handles many transactions at a time. Fortunately, this server needs not to compute all these hashings on-line starting with $X_0$, but by table look up—capitalizing on having in storage the full hash-chain of every certificate. Nonetheless, storing IM-long hash-chains may be a problem in applications with huge numbers of certificates. But, fortunately, as we shall mention later on, even ordinary servers can, using better algorithms, re-compute IM-long hash chains with surprising efficiency.

Bandwidth: The preferred embodiment of the present invention has an obvious bandwidth advantage over OCSP. The former uses 20-byte answers, while the latter typically uses 256 bytes.

CA Efficiency: A validity query is answered by a (complex) digital signature in the OCSP case, and by a (trivial) table look-up in the case of the present invention, as long as the CA stores the entire X-chain for each certificate.

Note that, with a population of 1 million certificates, the CA can afford to store the entire X-chain for each certificate when the time accuracy is one day or one hour. (In the first case, the CA would have to store 365 20-bytes values; that is, 7.3 K bytes per cert, and thus 7.3B bytes overall. In the second case, 175.2B bytes overall.) If the time accuracy were 15 seconds, then each hash chain would consist of IM 20-byte values, and for the entire system the overall storage requirement would be around 10.5 tera-bytes: a sizable storage.

To dramatically decrease this storage requirement, the CA may store just a single 20 byte value (i.e., $X_0$) for each cert, and re-compute from it each $X_i$ value by at most IM hashings. Alternatively, Jacobsson [5] has found a surprising time/storage tradeoff. Namely, the CA may re-compute all n $X_i$ values, in the right order, by storing log (n) hash values and performing log(n) hashings each time. If n were IM, this implies just storing 20 hash values per cert and performing only 20 hashings each time the cert needs validation. Other nontrivial tradeoffs are possible. In particular, for our IM-chain case, Reyzin [R] has shown that a CA can compute all $X_i$ values (i=1M down to 1) by storing only 3 hash values and performing at most 100 hashings each time.

In sum, even in a de facto real-time application (i.e., using a 15-second time accuracy) the preferred embodiment of the present invention can, by just storing 60 bytes per certificate, replace a complex digital signature operation with a trivial 100-hash operation.

Security and Operating Costs: The last two differences are better discussed after specifying the type of implementation of the preferred embodiment of the present invention and OCSP under consideration.

Centralized Implementation: Security Analysis

Whenever proving certificate validity relies on the secrecy of a given key, a secure vault ought to protect that key, so as to guarantee the integrity of the entire system. By a centralized implementation of the present invention or OCSP, we mean one in which a single vault answers all validity queries. Centralized implementations are preferable if the number of deployed certificates is small (e.g., no more than 100K), so that the vault could handle the query volumes generated even if almost all certificates are used in a small time interval, triggering almost simultaneous validity queries. In such implementations, the preferred embodiment is preferable to OCSP in the following respects.

Doomsday Protection: In the traditional OCSP, if (despite vaults and armored guards) an enemy succeeds in penetrating the vault and compromises the secret signing key, then he can both "resurrect" a previously revoked certificate and "revoke" a still valid one. (Similarly, if the CRL signing key is compromised in a CRL system.) By contrast, in the preferred embodiment of the present invention, penetrating the secure vault does not help an adversary to forge the validity of any previously revoked certificate. In fact, when a certificate becomes revoked at day i, not only is its revocation proof $Y_0$ made public, but, simultaneously, all its $X_i$ values (or at least the values $X_0$ through $X_{365-i}$) are deleted. Therefore, after a successful compromise, an enemy finds nothing that enables him to "extend the validity" of a revoked certificate. To do so, he should succeed in inverting the one-way hash H on $X_{365-i}$ without any help, which he is welcome to try (and can indeed try without entering any secure vault). The worst an enemy can do in a system according to the present invention after a successful compromise is to fake the revocation of valid certificates, thus preventing honest users from authenticating legitimate transactions. Of course, this would be bad, but not as bad as enabling dishonest users to authenticate illegitimate transactions.

Distributed Implementation: Security and Operating-Cost Analysis

Centralized implementations require all queries about certificate validity to be routed to the same vault. This easily results in long delays and denial of service in applications with millions of active certificates. To protect against such congestion, delays, and denial of service, one might spread the load of answering validity queries across several, geographically dispersed, responder servers. However, in the case of the OCSP each additional responder needs to have a secret signing key, and thus needs to be hosted in a vault, making the cost of ownership of an OCSP system very onerous. A high-grade vault meeting the requirements of financial institutions costs at least $1M to build and $1M to run. (A good vault would involve armored concrete, steel doors, back-up power generators, protected fuel depot to run the generator for potentially a long time, etc. Operating it would involve a minimum of 4 different teams for 24×7X365 operations, plus managerial supervision, etc.) In an application requiring 10 such vaults to guarantee reasonably fast response at peak traffic, the cost of ownership of the OCSP system would be $10M of initial investment and an ongoing budget of $10M/year. Even if less secure vaults and operations were used, millions of dollars in initial and ongoing costs would still be necessary.

In the case of the preferred embodiment of the present invention, however, a distributed implementation can be achieved with a single vault (which a CA would have anyway) and an arbitrary number of "un-trusted responders" (i.e., ordinary servers). Let us see the exact details of a distributed system according to the present invention assuming, to be concrete, that (a) there are 10M certs; (b) there are 1,000 servers, strategically located around the globe so as to minimize response time; and (3) the time granularity is one-day.

CA Operations (Initialization Cost): Every morning, starting with the smallest serial number, compile a 10M-entry array F as follows: For each certificate C having serial number j, store C's 20-byte validity/revocation proof in location j. Then, date and sign F and send it to each of the 1,000 servers.

User Operations (Query Cost): To learn the status of a certificate C, send C's serial number, j, (and CA ID if necessary) to a server S.

Server Operations (Answer Cost): Every morning, if a properly dated and signed array F is received, replace the old array with the new one.

At any time: answer a query about serial number j by returning the 20-byte value in location j of the current F.

Operations of the Preferred Embodiment

1. Preparing Array F is instantaneous.

If the whole hash chain is stored for each cert, then each entry is computed by a mere table look-up operation. In an alternative embodiment, it can also be computed on the spot.

2. F Contains No Secrets.

It consists of the accurate and full account of which certificates are still valid and which revoked. (The CA's goal is indeed making this non-secret information as public as possible in the most efficient manner)

3. Transferring F to the Servers is Straightforward.

This is so because F contains no secrets, requires no encryption, and poses no security risks. Though 10M certs are a lot, sending a 200M-byte file to 1000 servers at regular intervals is very doable.

4. Each Server Answer is 20-Byte Long.

Again, each answer requires no encryption, signature or time stamp.

5. No Honest Denial of Service.

Because each value sent is just 20-byte long, because each such a value is immediately computed (by a table look up), and because the traffic can be spread across 1000 servers, no denial of service should occur, at least during legitimate use of the system.

6. Servers Need Not be Trusted.

They only forward 20-byte proofs received by the CA. Being self-authenticating, these proofs cannot be altered and still hash to the relevant targets.

Distributed implementations of the present invention continue to enjoy the same doomsday protection of its centralized counterpart: namely, an enemy successfully entering the vault cannot revive a revoked certificate. Sophisticated adversaries, however, refrain from drilling holes in a vault, and prefer software attacks whenever possible. Fortunately, software attacks, though possible against the distributed/centralized OCSP, cannot be mounted against distributed implementations of the present invention.

In the OCSP, in fact, the CA is required to receive outside queries from untrusted parties, and to answer them by a digital signature, and thus by means of its precious secret key. Therefore, the possibility exists that OCSP's required "window on the outside world" may be maliciously exploited for exposing the secret signing key.

By contrast, in distributed implementations of the present invention there are no such "windows:" the CA is in the vault and never receives or answers any queries from the outside; it only outputs non-secret data at periodic intervals. Indeed, every day (or hour) it outputs a file F consisting of public information. (The CA may receive revocations requests from its RAs, but these come from fewer trusted entities via authenticated channels—e.g., using secure smart cards.) The untrusted responders do receive queries from untrusted parties, but they answer those queries by means of their file F, and thus by public data. Therefore, in a software attack against the preferred embodiment of the present invention ordinary responders may only "expose" public information.

Simplified PKI Management

PKI management is not trivial. (See, for example, *Internet Public Key Infrastructure, Part III: Certificate Management Protocols*; by S. Farrell, A. Adams, and W. Ford; Internet Draft, 1996; *Privacy Enhancement for Internet Electronic Mail—Part II: Certificate-Based Key Management*; by S. Kent and J. Linn; 1989). The preferred embodiment of the present invention may improve PKI management in many applications by: (1) reducing the number of issued certs; (2) enabling privilege management on the cert; and (3) sharing the registration function with multiple independent CAs.

Let us informally explain these improvements in PKI management in a series of specific examples. (Note that features and techniques used in one example can be easily embedded in another. We do not explicitly do this to avoid discussing an endless number of possible variations.)

Turning a Certificate ON/OFF (and Suspending It)

EXAMPLE 7

Music Downloading

Assume an Internet music vendor wishes to let users download any songs they want, from any of its 1000 servers, for a $1/day fee. This can be effectively accomplished with digital certificates. However, in this example, U may be quite sure that he will download music a few days of the year, yet he cannot predict which or how many these days will be. Thus the Music Center will need to issue for U a different one-day certificate whenever U so requests: U requests such a certificate and, after payment or promise of payment, he receives it and then uses with any of the 1000 music servers on that day. Issuing a one-day cert, however, has non-trivial management costs both for the vendor and the user. And these costs must be duplicated each time the user wishes to enjoy another "music day." In a preferred embodiment, the present invention can alleviate these costs as follows. The first time that U contacts the vendor, he may be issued a certificate C with issue date $D_1=0$, expiration date $D_2=365$, and a validity field $X_{365}$, a revocation target $Y_1$, and a suspension field $Z_{365}$—(The vendor's CA builds the suspension field very much as a validity field: by starting with a random 20-byte value $Z_0$ and then hashing it 365 times, in case of one-day granularity. It then stores the entire hash chain, or just $Z_0$, or uses a proper time/storage method to be able to generate any desired $Z_i$.) At day $i=1, \ldots, 365$, if U requests "a day of music" for that day, then the vendor simply releases the 20-byte value $X_{365-i}$ to indicate that the certificate is valid. Else, it releases $Z_{365-i}$ to indicate that the certificate is "suspended." Else, it releases $Y_0$ to indicate that the certificate is revoked. Optionally, if U and the music vendor agree to—say—a "week of music starting at day i," then either the 20-byte values for those 7 days are released at the proper time, or the single 20-byte value $X_{365-i-7}$ is released at day i.

That is, rather than giving U a new single-day certificate whenever U wishes to download music, the vendor gives U a single, yearly certificate. At any time, this single certificate can be turned ON for a day, by just releasing the proper 20-byte value. Thus, for instance, the preferred embodiment of the present invention replaces issuing (and embedding in the user's browser) 10 single-day certificates by issuing a single yearly cert that, as it may happen, will be turned ON for 10 out of the 365 days of the year. The vendor could also use the method above to issue a cert that specifies a priori the number of days for which it can be turned ON (e.g., a 10-day-out-of 365 cert). Because it has a more predictable cost, such certs are more suitable for a gift.

Turning ON/OFF Many Certificates for the Same User

EXAMPLE 8

Security-Clearance Management

Digital certificates work really well in guaranteeing that only proper users access certain resources. In principle, privileges could be specified on the cert itself. For instance, the State Department may have 10 different security-clearance levels, L1, . . . L10, and signify that it has granted security level 5 to a user U by issuing a certificate C like:

$C = SIG_{SD}(SN, PK, U, L5, D_1, D_2, \ldots)$ where again $D_1$ and $D_2$, represent the issue and expiration dates.

However, specifying privileges on the cert itself may cause a certificate-management nightmare: whenever its privileges change, the cert needs to be revoked. Indeed, the security level of an employee may vary with his/her assignment, which often changes within the same year. For instance, should U's security-clearance level be temporarily upgraded to 3, then the State Department should revoke the original C and issue a new cert C'. This task could be simplified somewhat by having U and thus C' retain the same public key (and expiration date) as before; for instance, by having:

$C' = SIG_{SD}(SN', PK, U, L3, D_1', D_2, \ldots)$.

However, U still faces the task of "inserting" the new C' into his browser in a variety of places: his desk-top PC, his lat-top, his cell phone, his PDA, etc. Now, having the CA take an action to re-issue a certificate in a slightly different form is one thing, but counting on users to take action is a totally different thing!

This management problem is only exacerbated if short-lived certificates (e.g. certificates expiring one day after issuance) are used. In the context of the present example, single-day certs may enable a State Department employee or user U to attend a meeting where a higher security level is needed. (If U had such a cert in a proper cellular device, smart card or even mag stripe card, he could, for instance, use it to open the door leading to the meeting that day.) The use of short-lived certificates is much broader, and has been advocated because it dispenses with the difficulty of revocation to a large extent (no point revoking a cert that will expire in 24 hours, at least in most applications). However, issuing short-lived certs so that they reside in all pertinent users' browsers still is a management cost.

These management costs can be alleviated with use of the preferred embodiment of the present invention as follows. Assuming that one-day time accuracy is enough, the State Department issues to a user U a certificate containing 10 validity fields and I revocation field: e.g., $C = SIG_{SD}(SN, PK, U, D_1, D_2, A_{365}, B_{365}, C_{365}, D_{365}, E_{365}, F_{365}, G_{365}, H_{365}, I_{365}, J_{365}, Y_1,)$ where the first validity field, $A_{365}$, corresponds to security-clearance level 1 . . . and the 10th validity field, $J_{365}$, corresponds to security-clearance level 10, while, as usual, $Y_1$ is C's revocation field. Cert C is used as follows. If, on day n, U is in good standing (i.e., cert C is still valid), and U's security-clearance level is 5, then the State Department publicizes (e.g., sends to all its responders in a distributed NOVOMODO implementation) the 20-byte validity proof $E_{365-n}$. If, on day m, U's security-clearance level becomes 2, then the State Department publicizes $B_{365-m}$. And so on. As soon as C becomes invalid (e.g., because U is terminated as an employee or because U's secret key is compromised), then the State Department publicizes $Y_0$ (and erases "future" A, B, C, D, E, F, G, H, I, and J values from its storage).

This way, cert C, though internally specifying its own privileges, needs not be revoked when these privileges change in a normal way, and users need not load new certs in their browsers. In essence, the preferred embodiment of the present invention has such minimal footprint, that a CA (rather than issuing, revoking, and re-issuing many related certs) can issue with great simplicity a single cert, having a much higher probability of not being revoked (because changes of security-clearance level do not translate into revocation). As a result, fewer certs will end up been issued or revoked in this application, resulting in simpler PKI management.

In sum, the preferred embodiment of the present invention replaces the complex certificate management relative to a set of dynamically changing properties or attributes by a single certificate (with minimum extra length) and a single 20-byte value for attribute.

Telecom companies may use a method similar to that of Example 2 to switch a given wireless device from one rate plan to another, or for roaming purposes.

Landlord CAs and Tenant CAs

A main PKI cost is associated to the RA function. Indeed, identifying a user U may require an expensive personal interview and verifying that indeed U knows the right secret key (corresponding to the to-be-certified public key PK). It would be nice if this RA function could be shared across many CAs, while enabling them to retain total independent control over their own certs.

EXAMPLE 9

Organization Certificates

The Government and big organizations consist of both parallel and hierarchical sub-organizations: departments, business units, etc. An employee may be affiliated with two or more sub-organizations. For instance, in the U.S. Government, he may work for NIST and the Department of Commerce. Issuing a digital certificate for each such affiliation results in a high total number of certificates and a complex PKI management: every time an employee drops/adds one of his/her affiliations, it is best to revoke the corresponding cert/issue a new one. Ideally, two opposites should be reconciled: (1) The Organization issues only one cert per employee, and (2) Each Sub-Organization issues and controls a separate cert for each of its affiliates.

These two opposites can be reconciled by the preferred embodiment of the present invention as follows. To begin with, notice that the preferred embodiment of the present invention is compatible with de-coupling the process of certification from that of validation, the first process being controlled by a CA and the second by a validation authority (VA). For instance, assuming a one-day time accuracy, once a CA is ready to issue a certificate C with serial number SN, it sends SN to a VA, who selects $Y_0$ and $X_0$, secretly stores the triplet (SN, Y0, X0), computes as usual $Y_1$ and $X_{365}$, and then returns $Y_1$ and $X_{365}$ to the CA, who includes them within C. This way, the CA need not bother validating C: the CA is solely responsible for identifying the user and properly issuing C, while the VA is the only one who can prove C valid or revoked. This de-coupling may be exploited in a variety of ways in order to have organization certificates that flexibly reflect internal sub-organization dynamics. The following is just one of these ways, and uses Government and Departments as running examples. The Government as a whole will have its own CA, and so will each Department.

Envisaging k different Departments with corresponding CAs, $CA^1 \ldots CA^k$, and one-day time accuracy, a Government certificate C has the following form:

$$C = SIG_{GOV}(SN, PK, U, D_1, D_2, X_{365}, Y_1, [X_{365}^1, Z_{365}^1], \ldots, [X_{365}^k, Z_{365}^k])$$

where, as usual, SN is the cert's serial number, PK the public key of the user, U the user's identity, $D_1$ the issue date, $D_2$ the expiration date, $X_{365}$ the validity field, $Y_1$ the revocation field, and where $X_{365}^j$ is the validation field of $CA^j$; and $Z_{365}^j$ is the suspension field of $CA^j$.

Such a certificate is generated by the Government CA with input from the Department CAs. After identifying the user U and choosing a unique serial number SN, the issue date $D_1$, and the expiration date $D_2$, the Government CA sends SN, PK, U, $D_1$, $D_2$ (preferably in authenticated form) to each of the Department CAs. The jth such CA then: chooses two secret 20-byte values $X_0^j$ and $Z_0^j$; locally stores (SN,PK,U, $D_1$, $D_2$, $X_0^j$, $Z_0^j$) or, more simply, (SN, $X_0^j$, $Z_0^j$); and returns $[X_{365}^j, Z_{365}^j]$ for incorporation in the Government certificate in position j (or with "label" j).

This certificate C is managed with Distributed implementations of the present invention as follows, so as to work as a 1-cert, a 2-cert, ..., a k-cert; that is, as k independent certs, one per Department. On day n, envisaging 100 responders: the Government CA sends all 100 responders the 20-byte value $X_{365-n}$ if C is still valid, and $Y_0$ otherwise. Then, the jth Department CA sends all 100 responders the 20-byte value $X_{365-n}^j$ to signify that C can be relied upon as a j-cert and $Z_{365-n}^j$ otherwise.

Therefore, the Government CA is solely responsible for identifying the user and issuing the certificate, but each of the Department CAs can independently manage what de facto is its own certificate. (This is absolutely crucial. If $CA^1$ were the Justice Department and $CA^2$ the DOD, then, despite some overlapping interests, it is best that each acts independently of the other). The resulting certificate system is very economical to run. First, the number of certs is greatly reduced (in principle, there may be just one cert for employee). Second, a given employee can leave and join different Departments without the need of revoking old certs or issuing new ones. Third, different Department CAs may share the same responders. (In fact, whenever the mere fact that a given user is affiliated with a given Department is not a secret -something that will be true for most departments— the servers essentially contain only "publishable information".) Thus a query about the status of C as a j-certificate is answered with two 20-byte values: one as a Government cert and one as a j-cert. This enables one to more nimbly revoke C at a "central level" (e.g., should U lose the secret key corresponding to PK).

EXAMPLE 10

In the above example, certificate C was only revocable in a central way, but it could easily be arranged that the responsibility of revocation is push down to individual Departments. For instance, to enable the jth Department CA, in full autonomy, to revoke as well as suspend C as a j-certificate, C may take the following form:

$$C = SIG_{GOV}(SN, PK, U, D_1, D_2, [X_{N1}^1, Y_1^1, Z_{N1}^1], \ldots, [X_{Nk}^k, Y_1^1, Z_{Nk}^k]).$$

Also, different departments may have different time accuracies for their own certs. This too can be easily accomplished by having C of the following format, $$C = SIG_{GOV}(SN, PK, U, D_1, D_2, [TA^1, X_{N1}^1, Y_1^1, Z_{N1}^1], \ldots, [TA^k, X_{Nk}^k, Y_1^1, Z_{Nk}^k])$$

where $TA^j$ is the time accuracy of the jth CA; and Nj is the number of time units between $D_1$ and $D_2$. (E.g., if $TA^j$ is one day and $D_1 - D_2 = 1$ year, then $X_{Nj}^j = X_{365}^j$.)

Within a single organization, one major advantage of issuing certs structured and managed as above consists in enabling the cert to stay alive though the user moves from one sub-organization to another. It should be realized, however, that the above techniques are also applicable outside a single-organization domain. Indeed, the Government CA can be viewed as a landlord CA, the k Department CAs as tenant CAs servicing unrelated organizations (rather than sub-organizations), and the certificate can be viewed as a leased cert. This terminology is borrowed from a more familiar example where the advantages of "joint construction and independent control" apply. Leased certs are in fact analogous to spec buildings having the identical floor footprints.

Rather than building just his own apartment, a builder is better off constructing a 20-floor building, setting himself up in the penthouse apartment and renting or selling out right the other floors. Each of the 20 tenants then acts as a single owner. He decides in full autonomy and with no liability to the builder whom to let into his flat, and whom to give the keys. A 20-story building is of course less expensive than 20 times a single-story one: it may very well cost 10 times that. This economy of scale is even more pronounced in a leased cert. Indeed, the cost of issuing a regular cert and that of issuing a leased one is pretty much the same. Thus issuing leased certs could be very profitable to a landlord CA, or at least repay it completely of the costs incurred for its own certs. On the other hand, tenant CAs have their advantage too, in fact: they save on issuance costs: they share the cost of issuing a cert k ways; and they save on infrastructure costs: they share the same responders (since they contain only public data).

Natural candidates to act as landlord CAs for external tenant CAs are: credit card companies; large financial institutions, and again the Government (e.g., via the USPS or the IRS). In many cases, in fact, they have long and close relationships with millions of "users" and may more easily issue them a digital cert without investing too many resources for user identification (e.g., a credit card company has been sending bills for years to its customers, and can leverage this knowledge). A credit card company may like the idea of issuing certificates as a landlord CA in order to run more effectively its own affinity program (having hotel chains, airlines etc. as their tenants). The IRS may have already decided to use digital certificates, and leased certs may later on provide them with a revenue stream that will repay of the costs incurred for setting up a faster and better service.

EXAMPLE 11

So far, the way we have described landlord and tenant CAs requires that the landlord CA cooperates with its own tenant CAs during the issuance process, and thus that it has already identified its tenant CAs beforehand. It is actually possible, however, for a landlord CA to issue rental certs envisioning—say—20 tenant CAs, without having identified all or any of these tenants. Rather, future tenant CAs will be able to rent space in already issued certs. This capability is ideal for new cert-enabled applications. Rather than undergoing the expenses necessary to issue certs to millions of customers, a company offering a new certificate-enabled product may approach a landlord CA having issued millions of certs, rent space in them after the facs, and then sign on as customers a large portion of the landlord-CA users by turning ON all their corresponding certs overnight (without any customer identification and other issuing costs) and then starting managing them according to its own criteria. We shall describe various techniques for enabling this functionality in a forthcoming paper.

Additional Systems

Device Validation System

Let us now see how we can adapt the technology of the present invention to devices (e.g, cell phones, PDA, Radio Frequency Identification tokens, PCs, Laptops, VCRs, network devices, routers, firewalls, set-top boxes, CD players, game players, DVD devices, etc.).

Consider, for example, the very capacity of turning such devices ON, or letting them continue to operate. If a device is stolen, for instance, it is desired that it no longer operate. On the other hand, if it is not stolen, then it should continue to operate normally. Similarly, if a user "rents" the device, or pays a subscription fee, or uses the device on behalf of a company (e.g., the device is a company laptop), if he no longer pays the rent, or the subscription fee, or no longer works for the company, then the device needs to be turned OFF/disabled. Else, the devices should function properly. Also these devices could be turned ON, OFF, and ON again in a dynamic fashion.

Of course, these functionalities may be accomplished by means of a system according to a preferred embodiment of the present invention. In essence, assuming again, for concreteness but without any limitation intended, a daily granularity, the device may carry a digital certificate C, specifying a validity field X, and the device may work on a given day only if it has the daily proof of validity relative to X. The device may have a trusted/protected clock to avoid being fooled. The device (especially if a cellular device) may be "pushed" its own daily validity proof. Alternatively, the device may request to a second entity its own validity proof for the day. For instance, the device may provide its serial number and receive in response the proof of validity of that day.

This works because the integrity of the validity field is guaranteed by a certificate and thus by a CA's digital signature of X (together with other information, such as date information). However, we may protect the integrity of X in the following alternative way: namely, by "burning it in" the device in an unalterable way: for instance, by writing it in a read-only memory in, say chips (smart-card/PDAs/telephone/laptop etc. chip sets). In this manner, the user of the device cannot alter X in any way. The proof verification algorithm can also be burned in. So that, once an alleged proof of validity P for the given day is presented, then P is hashed the proper number of times and then compared with the burned in X. More generally, here one can use a one-way function F, rather than a one-way hash function. So that the whole process, including manufacturing, looks like this:

A first entity generates an initial value IV, and iterates a one-way function F on V a given number of times so as to obtain a final value FV. A second entity (possibly equal to the first) burns X into a device D. Device D has means to iterate the function F. Device D later receives an alleged n-th proof value PV, where n is a positive integer, and verifies PV by iterating the function F on PV n times and checking that the resulting value equals the burnt-in value X.

Device D may consult its own clock to ensure that the n-th proof value corresponds to the current date. The current date may in fact be the n-th date in a sequence of dates starting from a fixed date. The fixed date may be burnt-in the device as well to protect its integrity as well.

At each iteration, function F may receive as input (not only the previously computed value but also) additional input. For instance, D's identifier may be an input at each iteration. Such additional inputs may be different at each different iteration as well. For instance, integer k may be an input at iteration k.

Also there may not be a single one-way function F. Indeed there may be a sequence of one-way functions, and Fk may be the function applied at iteration k.

The validity field X (being essentially unique to D) could also be used as D's identifier (or part of it), so as to spare dealing with D's serial number and validity field separately.

The described system can be used so far to turn a given device D ON or OFF altogether. But it can also be used to turn ON or OFF a given just a single functionality, or a single functionality of out several possible functionalities. For instance X may be a validity field for functionality FX, Z a validity field for functionality FZ and so on. In this case receiving a validity proof relative to X (Z) means that functionality FX (FZ) is turned ON for that day on device D. Such additional validity fields Z . . . can also be burned-in the device D. Also a description/identifier of which functionality is associated to X/Z/ . . . can also be burnt-in.

If the number of possible functionalities (and thus the number of validity fields) is large, then the validity fields can be Merkle hashed and then the root value of the Merkle tree may be burnt-in. In this case, to turn ON functionality FX (on a given day), one may provide the device with a proper proof of validity relative to X (for that day), together with the authentication path from X to the root in the Merkle tree. The Merkle authenticating path algorithm may also be burnt-in.

Clock-Less Device Validation

As we have seen, the technology of the preferred embodiment can be used to validate devices and by turning them ON or OFF so as to prevent their misuse. Often the security of this application lies in the fact that the device has a clock not controllable by an enemy, possibly the very owner of the device (e.g., a fired employee who, after being fired, wishes to access company data from his company laptop that still lies at home). In fact, even if the company no longer issues a proof of validity for day j, and even if in absence of such a proof of validity the device will not work on day j, an enemy can re-wind the clock of the device, so as to induce the device to believe that the current day is d<j, and then play back to the device a proof of validity correctly issued for day d, thereby fooling the device into functioning at day j.

The preferred embodiment provides technology that performs device validation even for devices which clock-less, that is, having no clocks, or no secure clocks.

The technology envisages a validator, an entity deciding whether a given device should be validated—i.e., turned ON or OFF—at a given date in a sequence of dates. For concreteness, but without limitation intended, let us assume that a given date is a given day in a sequence of days. The device preferably has a secure memory portion and a clock. Though not secure, the device can tell whether the given clock has been reset at least while turned on. For instance, the device can tell, as long as it remains running, that 24 hours have passed. The validation software preferably is protected in the device (e.g., running in a protected memory portion, or is burnt in, or resides in firmware), so as to avoid being altered in any way. Notice that some smart cards work in similar way. For instance they have a protected memory portion, they may have a minimum power for keeping in (e.g., secure) storage a given value, and have a clock, but not a battery capable of having the clock running for any significant length of time. Thus, once inserted in a card reader, the smart card's clock becomes active, and the card may monitor the passage of time accurately (e.g., because the clock also is in secure memory), but once the card is taken out of the reader the clock no longer works, though a small value may still be preserved in secure memory.

EXAMPLE 12

In this method, the Validator and the device share a secret key K. Key K preferably resides in a secure memory portion of the device. From this key K, both the device and the validator are capable of producing a sequence of values unpredictable (to third parties not possessing K) corresponding to the sequences of dates. For instance, for each day 1, 2, . . . the sequence of values consists of $V1=H(K,1)$, $V2=H(K,2)$, . . . where H is a one-way hash function, or an encryption function that encrypts 1, 2, . . . with key K each time. If, on day j, the validator wishes the device to be active for one more day, it publishes (e.g., it sends to a responder) the value $Vj=H(K,j)$. Assume now the device is turned on day j after been active on day d and then switched off until day j. Then the device has retained in memory the value $Vd=H(K,d)$ or an indicator (e.g., d) of the latest day in which it was active. The device will not be functioning again until it gets a proof of validity after day d. Alternatively, the device keeps on storing—e.g., in a single variable—the amount of time it has worked, in its own mind, during day d. When the device is switched off, therefore, it may remember not only d but also—say—6 hours and 10 minutes. Thus, when it is switched on again, it will continue to work for 17 hours and 50 more minutes. After that, it will require a proof of validity for a day subsequent to d. Assume now that the device really gets switched on again on day $j>d$. Then the device gets a (alleged) proof of validity Vj for day j (e.g., it is pushed one such proof or it receives such proof after a request to a responder). The device then tries to see whether Vj is a proof of validity subsequent to the proof Vd currently in memory (or relative to a day subsequent to the day d in memory). For instance, the device keeps on producing $Vd+1, Vd+2, \ldots$ using its secret key K until the value Vj is produced (or until a given total number of day is exceeded—e.g., one may envisage that we no longer care about the device working at all after 10,000 days). If this is so, then it turns itself ON for another 24 hours (i.e., keeps in memory the new Vj or j, and properly operates and monitors the clock so that, after 24 hours of being continually on are reached, a new value $Vj+1$ or Vk for $k>j$ is needed.

The device can be turned OFF by not publishing or feeding it with future proof of validity, or can be turned OFF for good by publishing or causing it to receive a special value such as H(K,NO MORE), or a special value Vnomore stored in memory, etc. The device can be suspended on a given day by publishing or causing it to receiving a special value, e.g., H(K,suspend,j). The keys for the validity, revocation and suspension proofs can be the same or different.

This offers a good deal of protection already. Assume that a device is properly used on day j–1 and then it is stolen, and no proof of validity for day j is ever published or otherwise made available to the device. Then, whether or not the device was switched off prior to being stolen, it will stop working starting on day j. In fact, if it was switched off, when revived it will need a proof of validity for a day after j–1 to turn itself ON properly, and no such proof is forthcoming. If it stolen while being switched on, after 24 hours at most it will stop working anyway.

At worse it may happen that the device was switched on (for instance at day j–3), and thus entered in possession of a validity proof Vj–3, and then switched off. Assuming that the device is stolen at this point but that its loss is not noticed until day j–1, or that the device is stolen at day j–1 and that an enemy records the values Vj–2 and Vj–1 that the device could have seen. Then such an enemy could at most feed the device these two values and make it work for two more days at most.

EXAMPLE 13

This method works essentially as the method disclosed in Example 11, using a sequence of unpredictable values, published or otherwise made available to the device at each of a sequence of dates (e.g., without limitation, days), a clock not secure, etc. but does not use a secret key in the device. For instance, the device stores Xk, the result of iterating one (or more) one-way function F k times on an initial value X0 as discussed above and with the same variants. Then Xk is written in firmware (e.g., in a non-alterable way) or stored in a protected portion of memory. The proof of validity for day j simply is Xk-j as in the basic scheme of the present invention. Again suspension and revocation can occur in similar ways.

RTC Physical Access Configurations

Multiple Privilege Management in Mixed Environments

A robust access control system must answer two questions for every user. The first question addresses authentication or identification: "Are you who you say you are?" This question is typically addressed directly or indirectly through identification badges, keys biometrics, or passcodes. These provide reasonable answers for long-lasting user identification, but don't address the more time critical question of validation: "Are you currently allowed to do what you are trying to do?"

For example, an identification badge can tell you that Alice was hired as an employee some time in the last decade, but cannot independently determine whether she is still an employee with access permissions for the computer server room.

For physical access control, a secure lock must determine identity through authentication, and then perform validation to determine whether a user's current privileges allow entry. Some locks perform this validation through wired network connections to a central trusted permissions authority. A physical access solution based entirely on network wired locks has two significant limitations. The cost of each wired lock includes the costs of secure wiring, field control panels, and labor, totaling several thousand dollars per door. The reach of a wired configuration is limited to locks that can be easily accessed by permanent networking. This prevents the use of robust access control for mobile or hard to reach locks such as those on vehicles, storage containers, utility cabinets, etc.

The Real Time Credentials technology according to a preferred embodiment of the present invention provides a secure way to perform efficient validation for physical access on both wired and disconnected locks. This allows intelligent door locks to validate current user privileges and permissions without requiring expensive network connections to each lock.

The present disclosure describes several configurations that can be used to provide disconnected validation based on large numbers of independent user privileges. Each configuration offers interoperability with existing access control hardware and software for use in heterogeneous installations. For each configuration, this paper will describe how Real Time Credentials offer increased flexibility while dramatically lowering the total cost of high security.

All four configurations described, below, feature an identical RTC validation process. The primary difference between these schemes is the process of authenticating the user, which impacts price and compatibility with existing access solutions.

Contactless ID/Memory

The first RTC validation configuration is an access control environment based on contactless ID cards with read/write memory access. This is described using the common MIFARE™ Standard contactless card as an example, but the validation solution would be identical with any memory ID card.

When a MIFARE ID card is used in current networked physical access environments, the lock reads the ID from a card and transmits it to a nearby panel or server that checks privileges and performs validation. The authentication process is the determination of the card ID, and the validation process is handled remotely based on this ID.

The physical access solution of the present invention can maintain compatibility with this model for wired doors, but adds support for disconnected doors by using the card's read/write memory to store a digitally signed "validation proof" for that card. This proof is periodically written to the card at any networked reader, and then it can be read at any disconnected lock to establish the current validity and permissions of the user.

The following table shows the logical contents of the RTC validation proof that is stored onto the card, along with the approximate storage requirements for each component:

| | | |
|---|---|---|
| Card ID: | #123456 | 4 bytes |
| Status: | card valid | 1 byte |
| Start time: | 8/4/03 09:00 | 4 bytes |
| End time: | 8/5/04 08:59 | 4 bytes |
| Authority: | ACME Inc. | 20 bytes |
| Privileges: | R&D labs | 1 bit to 10 bytes |
| | Parking | 1 bit to 10 bytes |
| | Locker 53 | 1 bit to 10 bytes |
| | Terminal B | 1 bit to 10 bytes |
| Digital Signature | | 42 bytes |
| | | Total Size: ~100 bytes |

When a user enters a facility through a wired door, the door retrieves the user's complete validation proof in the above format and places it into the memory area on the card. Once the proof is loaded on the card, a disconnected lock can validate the user's permissions through the following steps:

(1) Perform standard authentication by retrieving the user's card ID;
(2) Retrieve the RTC validation proof from memory;
(3) Verify the digital signature matches the known public key of the trusted authority;
(4) Verify that the proof is current (using the start and end times);
(5) Verify that the card is valid;
(6) Check arbitrary access control requirements based on privileges from the proof.

The disconnected lock is configured with a set of access control rules based on privileges, rather than individual user ID. For example, a lock may be configured to only admit users with the "Parking" privilege, and only during business hours. Since the individual user privileges can be changed through the RTC validation proofs, the locks themselves do not need to be changed as new users are added and removed to change access permissions. In addition, the locks do not need to store any secret keys or data, which means that an individual lock can be disassembled without any reduction in overall system security.

The RTC validation proofs according to a preferred embodiment of the present invention have certain characteristics that make them uniquely powerful for physical access control environments. Since the proofs are digitally signed, they are unforgeable and tamperproof. Since the proofs do not contain any secret keys, they can be public, and transmitted without security risk. The proofs are small enough to be stored on a low-end memory card.

These characteristics allow the RTC validation proofs to be used in cards like MIFARE Standard, while still offering high security cryptographic validation with thousands of independent user privileges per card.

Cost. MIFARE 1k Standard cards are available for between $1 and $5, depending on manufacturer and volume. A disconnected lock based on MIFARE cards and RTC validation technology could be manufactured for under $500 per door. With installation, a single door or container could be secured for under $1000.

Security. Simple ID authentication offers weak protection against duplication and forgery. Second and third factor authentication combined with PKI protections can be used to increase authentication security. Credential validation is protected by strong PKI encryption, preventing permission forgery or modification.

Contactless Shared Secrets

RTC Credential validation can also be used with identification cards such as HID's iClass that perform validation using secret information that is directly or indirectly shared with all readers. A lock will perform authentication to a card using a randomized challenge/response protocol which proves that the card knows the secret correspondence to its ID.

The RCT validation for a shared secret card is identical to the validation for a simple ID card. When a user enters a wired door, the lock will write the current RTC validation proof onto the user's card. This proof is later retrieved by disconnected readers for offline validation.

Cost. Contactless shared secret cards with memory are available for between $5 and $10, depending on manufacturer and volume. A disconnected lock based on shared secret cards and RTC validation technology could be manufactured for under $500 per door. With installation, a single door or container could be secured for under $1000.

Security. Shared secret authentication reduces the chance for duplication of individual cards, but compromise of a single offline reader may allow duplication of many cards. Credential validation is protected by strong PKI encryption, preventing permission forgery or modification.

Contactless PKI

Cards capable of performing public key digital signatures offer the highest level of authentication security. This includes cards based on MIFARE PRO X chips as well as many high end JavaCards. Locks may authenticate a card based on a challenge/response protocol without requiring any sensitive information in the locks. This significantly reduces the risk of key duplication.

The RTC validation for a public key card is identical to validation for a simple ID card. When a user enters a wired door, the lock will write the current RTC validation proof onto the user's card, and this proof will be retrieved by disconnected readers for offline validation.

The card's public key will typically be represented by a digital certificate, which can be used for alternate applications such as computer access and email security. High-end public key cards may support additional applications such as information security or stored value, which helps reduce the total cost for each application.

Cost. Contactless PKI cards are available for between $10 and $20, depending on manufacturer and volume. A disconnected lock based on MIFARE cards and RTC validation technology could be manufactured for under $500 per door. With installation, a single door or container could be secured for under $1000.

Security. PKI cards are able to provide strong cryptographic authentication to locks with low risk of key compromise or card duplication. Credential validation is protected by strong PKI encryption, preventing permission forgery or modification.

Techniques for Traversing Hash Sequences

Let H be a one-way hash function. A hash chain of length n is a collection of values $x_0, x_1, \ldots, x_n$ such that $H(x_i) = x_{i-1}$. While $x_{i-1}$ is easy to compute from $x_i$, computation in the opposite direction is infeasible, due to one-wayness of H.

The following is a representation of a hash chain:

$x_0 \leftarrow (H) x_1 \leftarrow (H) \ldots \leftarrow (H) x_{n-1} \leftarrow (H) x_n$ In many applications (such as, for example, document validation and privilege management services) it is necessary to be able to traverse the hash chain, i.e., to generate the values $x_0, x_1, \ldots x_n$ in order (from left to right in the above chain), over a certain period of time (for example, to output one value a day for a year). Note that the left-to-right order makes this problem difficult, because of one-wayness of H. While it is easy to generate and output, in order, $x_0$, $x_1, \ldots x_n$, by simply repeatedly applying H, the opposite order requires more time and/or memory.

The two obvious approaches are:

Store just one value, $x_n$, and, in order to output $x_i$, compute $H^{n-i}(x_n)$;

Store all the values, $x_0, x_1, \ldots x_n$, erasing them as they are being output.

The first approach requires storage of two hash values (one for $x_n$ and the other for the computation of $x_i$) and $n(n+1)/2$ evaluations of H total, or, on average, $n/2$ evaluations per value output. The second approach requires storage of n+1 hash values and n evaluations of H total, or, on average, 1 evaluation per value output.

We are interested in intermediate solutions: ones that offer other tradeoffs of memory (the number of hash values stored) versus time (the number of evaluations of H needed).

An algorithm has been proposed in the prior art that resulted in the following tradeoff: $\lceil \log_2 n \rceil$ hash values stored and at most $\lfloor \log_2 n \rfloor$ computations of H per hash value output. (See Don Coppersmith and Maruks Jakobsson, Almost Optimal Hash Sequence Traversal, in Matt Blaze, editor, *Financial Cryptography. Sixth International Conference (FC '02)*, Southhampton, Bermuda, 11-14, March 2002).

Novel Algorithms with Constant Storage

Jakobsson's method requires storage of about $\log_2 n$ hash values, and cannot be used when less storage is available. Note that for a hash chain of length 365, this means that 9 values need to be stored, and for a hash chain of length 1,000,000, this means that 20 values need to be stored. We would like to have an algorithm with lower storage requirements. Moreover, we would like to be able to specify storage requirements that are independent of the hash chain length. This way, the same amount of memory would be needed to manage short chains and long chains; thus, one would not need to acquire new memory if hash chain lengths change.

For convenience of reasoning about the algorithms, let's call a value $x_j$ that the algorithm stores a pebble at position j. Then a pebble is "allowed" the following: (i) to move to a position where another pebble is located (this corresponds to copying a value), or (ii) to move one step left of its current position (this corresponds to evaluating H). Initially, pebbles may start out in arbitrary positions on the hash chain.

Note that the number of pebbles corresponds to the number of hash values stored, and the number of times a pebble takes a step to the left corresponds to the number of evaluations of H. Our goal, then, is to come up with algorithms that reduce the number of pebbles steps (what we will call "cost") given a particular number of pebbles.

Two Pebbles

It is clear that one always needs a pebble at n—if $x_n$ is not stored, there is no way to recover it and thus no way to output it when it is needed at the end of the traversal. It is also clear that one always needs a pebble at the current position i, in order to be able to output $x_i$. Thus, at least two pebbles are necessary.

If only two pebbles are used, then one of them must always stay at $x_n$, and the other has no choice but to start at $x_n$ and move to $x_i$ each time. Thus, the best algorithm for two pebbles takes $n(n+1)/2$ total steps, or $n/2$ steps per output on average. For example, for a hash chain of length 1,000,000, the average number of steps is 500,000 per value output.

Three Pebbles

If we add just one pebble to the two that are absolutely necessary, it turns out that we can dramatically improve on the number of steps.

We will proceed as follows: divide the hash chain up into intervals of length s, where $s = \lceil \sqrt{n} \rceil$ (note that there will be $n/s \leq \sqrt{n}$ intervals). Place pebble number 3 at $x_n$, and pebble number 2 at $x_s$. Then, using the algorithm for two pebbles described above, use pebble number 1 to traverse points $x_0 \ldots x_s$ (starting each time at $x_s$). Then place pebble number 2 at $x_{2s}$ (by starting at $x_n$ and moving left), and again use algorithm for two pebbles to traverse $x_{s+1} \ldots x_{2s}$. Continue in this manner, each time using the two-pebble algorithm for an interval of length s.

The total number of steps of this algorithm can computed as follows: to traverse each interval using two pebbles, we need $s(s+1)/2$ steps. In addition, to move pebble number 2 to the beginning of each interval before traversing it, we need $(n-s)+(n-2s)+ \ldots +s+0 \leq (n/s)(n/2)$ steps. Recall that $s=\lceil sqrt\{n\} \rceil$, so the average number of steps per output value is $s/2+(n/s)/2 \leq \lceil sqrt\{n\} \rceil$.

Thus, adding a third pebble to the bare minimum of two allows us to decrease time per output value from $n/2$ to $sqrt\{n\}$. This decrease is indeed dramatic: for example, for a hash chain of length 1,000,000, the average number of steps is 1,000 per value output (as opposed to 500,000 needed with two pebbles).

Four Pebbles

If we have yet another pebble available, we can again divide the hash chain into intervals. This time, we will set $s=\lceil sqrt\{n^{(2/3)}\} \rceil$, and divide the entire chain into $n/s \leq n^{(1/3)}$ intervals of length s.

We will then place pebble number 4 at n, and use it as a starting point for pebble number 3, which will move to the beginning point of each interval of size s, in order from left to right. On each interval, we will use the three-pebble traversal algorithm described above. That is, we will further subdivide each interval into subintervals of size $\lceil sqrt\{s\}$538, and place pebble number 2 at the beginning of each subinterval, in order from left to right (pebble number 2 will start, each time, and pebble number 3). Then pebble number 1 will traverse the subinterval, each time starting at pebble number 2.

Thus, the cost of traversing each interval will be $sqrt\{s\}$, or $\lceil n^{(1/3)} \rceil$ per value output. To that, we have to add the cost of moving pebble number 3 to the beginning of each interval. Pebble number 3 will be moved $n/s$ times: $n-s$ steps at first, $n-2s$ steps next, and so on, giving the average cost of $(n/s)/2 \leq n^{(1/3)}/2$ per value output.

Thus, the average number of steps per value output is $\lceil 1.5n^{(1/3)} \rceil$. Using, once again, the example of a chain of length 1,000,000, the average number of steps is 150 per value output.

Generalizing to More Pebbles

The general technique that emerges from the above examples is as follows. Given c pebbles, divide the hash chain into $n^{(1/(c-1))}$ intervals of length $n^{((c-2)/(c-1))}$ each. Use the technique for c−1 pebbles on each of these intervals. The average cost per output value will be $((c-1)/2)n^{(1/(c-1))}$.

This generalization can be considered not only for a constant number of pebbles, but also, for example, for $c=1+\log_2 n$. In that case, using the equation $n^{1/\log_2 n}=2$, we compute that the average cost per output value will be $\log_2 n$ using our algorithms.

Improving Worst-Case Cost

Even though the above techniques achieve good average-case cost per output value, some output values will take longer to compute than others.

Take, for example, the case of three pebbles. Every time we traverse s pebbles, we have to relocate pebble number 2. Thus, the output value at the leftmost end of an interval will take much longer to compute; for example to compute $x_{s+1}$, we will need to make $n-(s+1)$ steps. On the other hand, all other pebbles within an interval will take at most s steps.

This, of course, may present serious problems in some applications: the computing equipment involved would have to be fast enough to handle these "bad" cases. But if it is already that fast, then there seems to be no point in having good "average" case: we would still need powerful computing equipment, which would simply sit idle on average.

In order to prevent this problem, we need to make the cost of the worst-case output value close to the cost of the average-case output value. In the case of three pebbles, this can be accomplished by adding only one extra pebble. Call that pebble "2a." Its job will be to move in advance to where pebble 2 should be next. For example, when pebble 2 is positioned at point s, pebble 2a will start at point n moving toward point 2s. It will reach point 2s exactly when pebble 2 needs to be there—by the time the value s is output.

Thus, while any given interval of size s is being traversed, pebble 2a will start at position n and move left to the beginning of the next interval. Note that pebble 2a needs to take fewer than n steps in order to get to its destination. The obvious approach would be for pebble 2a to take at most $n/s$ steps for each output value in the interval. This would result in a worst-case cost of $s+n/s \leq \lceil 2sqrt\{n\} \rceil$ steps per output value. Note, however, that one can do better: because pebble 1 will need to take more steps for values at the left end of the interval than values at the right end of the interval, in order to reduce the worst-case cost, pebble 2a should start out "slowly" and then "speed up." This way, the total number of steps taken by pebbles 1 and 2a will stay constant. Specifically, pebble 2a should take $(n/s)/2$ steps at first, $(n/s)/2+1$ steps the next time, and so on, up to $3(n/s)/2$ steps when the last value of the interval is being output. This will reduce the worst-case cost further to $\lceil 1.5sqrt\{n\} \rceil$.

Note that the total number of steps, and thus the average cost per output value, do not increase with the addition of this extra pebble. This is so because the extra pebble is not doing any extra work, but rather doing work slightly in advance. Thus, with a hash chain of length 1,000,000, the worst-case cost would be 1,500, while the average-case cost would be 1,000 per output value This approach extends to more pebbles. If we take the solution with four-pebbles, and add pebbles 2a and 3a that move in advance into the appropriate positions for pebbles 2 and 3, respectively, we will reduce the worst-case cost to $\lceil 2n^{1/3} \rceil$. Taking again the example of the chain of length 1,000,000, the worst-case cost would be 200, while the average-case cost would 150 per output value.

Therefore, in general, with 2c−2 pebbles, we can traverse the hash chain at the average cost of $((c-1)/2)n^{\{1/(c-1)\}}$ per output value, and worst-case cost of $(c/2)n^{\{1/(c-1)\}}$ for any given output value.

Again, this generalization can be considered not only for a constant number of pebbles, but also, for example, for $c=1+\log_2 n$. In this case, using $2\log_2 n$ pebbles, our algorithms will traverse the hash chain with the average cost per output value of log2 n and worst-case cost of $1+\log_2 n$.

The Optimal Solution

Below we describe a method for obtaining an algorithm with provably optimal total (and thus average per output value) computational cost, given any number c of pebbles. Note, however, that for a small values of c, this provably optimal solution will reduce the number of steps only slightly compared to the solutions above.

Suppose we have c pebbles. We must store $x_n$, which occupies 1 pebble. Then one more pebble will be moved to $x_k$ (for some k to be determined below), by applying H n−k times to $x_n$. Then, recursively, use the optimal solution for c−1 pebbles in order to output $x_0, x_1, \ldots, x_k$, in order. Note this amounts to traversing a shorter chain—one of length k, because the value $x_k$ is stored. Then recursively use the optimal solution for c pebbles to output the values $x_{k+1}, \ldots x_n$, x in order. This again amounts to traversing a shorter chain—one of length n−k, because the first k values are already traversed.

Now define F(c, n) as the number of steps necessary to traverse a hash chain of length n while storing no more than c pebbles at any given time. Clearly, F(c, 0)=0 for any c≧1, and F(0, n)=∞ for any n. Then, in our above method, F(k, n)=mink F(c−1, k)+F(c, n−k−1)+n−k, and k should be chosen to minimize F(c, n).

It is a simple matter of recursion with memoization (a.k.a. dynamic programming) to find the optimal point k for particular c and n. We present the C code that accomplishes this task. Such optimal points can be easily found in advance and then integrated into the hash traversal code.

Our Implementation of the Optimal Solution for Any Amount of Memory

```
#include"stdio.h"
int **table;
int **ktable;
int f(int r, int n)
{
int k, t_min=-2, t, k_min=-2, t1, t2; // -2 Stands for infinity;
                                      // -1 stands for uninitialized
    if( table[r][n]!=-1)
        return table[r][n];
    if (n==0 && r>0) {
        table[r][n] = 0;
        ktable[r][n] = 0;
        return 0;
    }
    if (r==0) {
        table[r][n]=-2;
      ktable[r][n]=-2;
        return -2;
    }
    for (k=0; k<n;k++) {
        t1=f(r-1, k);
        if (t1==-2)
            continue;
        t2=f(r, n-k-1);
        if (t2==-2)
            continue;
        t=t1+t2+n-k;
        if (t<t_min || t_min==-2) {
            t_min=t;
            k_min = k;
        }
    }
    table[r][n]=t_min;
    ktable[r][n]=k_min;
    return table[r][n];
}
void main()
{
    int max_r, max_n, i, j;
    printf("max balls: ");
    scanf("%d", &max_r);
    printf("chain length: ");
    scanf("%d", &max_n);
    table = (int**) malloc((max_r+1)*sizeof(int));
    ktable = (int**) malloc((max_r+1)*sizeof(int));
    if (table==NULL || ktable==NULL) {
        printf("Out of memory!\n");
        return;
    }
    for (i=0; i<=max_r; i++) {
        table[i]=(int*)malloc((max_n+1)*sizeof(int));
        ktable[i]=(int*)malloc((max_n+1)*sizeof(int));
        if (table[i]==NULL || ktable[i]==NULL) {
            printf("Out of memory!\n");
            return;
        }
        for(j=0; j<=max_n; j++)
            ktable[i][j]=table[i][j] = -1;
    }
    for(i=0; i<=max_r; i++)
        for (j=0; j<=max_n; j++)
            f(i,j);
```

```
-continued printf("\nTable for F(r, n) -- the number of steps needed:\n n\\r");
for(i=0; i<=max_r; i++)
    printf("%6d", i);
printf("\n");
for (j=0; j<=max_n; j++) {
    printf("%6d:", j);
    for (i=0; i<=max_r; i++)
        printf("%6d", table[i][j]);
    printf("\n");
}
printf("\nTable for k -- the optimal position to put the first pebble:\n n\\r");
for(i =0; i<=max_r; i++)
    printf("%6d", i);
printf("\n");
for (j=0; j<=max_n; j++) {
    printf("%6d:", j);
        for (i=0; i<=max_r; i++)
            printf("%6d", ktable[i][j]);
        printf("\n");
    }
}
\end{verbatim}
```

Private Key Secure Physical Access (Real Time Credentials in Kerberos-Like Settings)

In general, the scenarios may include multiple doors, and multiple users. Moreover, the access might be controlled by multiple authorities (each authority controlling access through some doors, the sets of doors for different authorities possibly overlapping). On the most general level, the access is controlled by having the users presenting credentials to the doors (verification of such a credential may require interaction between the user and the door, such as PIN entry, as well as an exchange of messages between the door and the user's card). In the case of the doors, it is especially important to support the security of the access with the least cost and even without connectivity of the door to a network or any specific server.

One important observation is that whatever credentials we use, our RTC technology allows to derive important security, infrastructure and cost benefits. RTCs can be utilized in conjunction with either public key cryptography methods (certificates, public key signatures, PKI) as well as the private key cryptographic tools (symmetric or private key signatures and encryption, Kerberos-like systems, etc.)

Access control for disconnected doors using public-key technology has been addressed. Here we describe how to adapt those ideas to private-key technology.

Basic Primitives

Encryption, Signatures Pseudo-Random Functions

In particular, private-key encryption, private-key signatures (aka MACs), private key random functions, are typical private-key primitives that we shall be using. For many of our purposes, these primitives could be used interchangeably. For instance, deterministic private-key signature schemes (between two entities who share a secret signing key SK), and random functions Fs (whose seed s is shared between two entities) can actually be considered equivalent. Both produce outputs that are unpredictable to third parties who might know the corresponding inputs, but not SK or s. For instance, the functions FSK(x) that returns the digital signature of x with secret key SK can, in practice, be considered a good enough pseudo-random function with seed SK. On the other hand, the function Fs(x), that on input x returns the value at x of pseudo-random function F with seed s, could be considered a private-key signature algorithm with secret key s.

One-Way and One-Way Hash Functions

We shall also use another basic primitive: one-way functions F and one-way hash functions H. In essence a function F is one-way if (1) given an input X, one can efficiently compute F(X), while (2) given F(X), where X has preferably been chosen sufficiently at random so as to be sufficiently unpredictable, computing X is practically impossible (e.g., because too many values for X would have to be tried in principle, and no efficient method exists to narrow the number of possible candidates). A function H is a one-way hash function if it is one-way and (though preferably mapping longer inputs to shorter ones or arbitrarily long inputs to—say—160-bit ones) it is hard to find two distinct inputs X and Y such that H(X)=H(Y).

In practice, we can use a one-way hash function H to construct other primitives. For instance, private-key signatures can be constructed in the following simple way. To sign a message M with secret key SK, one computes H(SK,M); that is, one properly combines SK and M—eg, concatenates them—and then hashes the result. Of course, to sign and date M, one can add a date d to this combination and thus compute H(SK,M,d) instead. Similarly, pseudo-random functions can be constructed as follows. On input x, to produce the output of a pseudo-random function F with seed s, one may compute H(s,x); that is, one may properly combine s and x, and then apply a one-way hash function to the result.

Secure Physical Access

We focus on just the novel aspects introduced by the private-key setting, skipping those common aspects that could be adapted to the new scenario naturally (e.g., the daily/regular computation aspects etc.) We start with a simple scenario.

Single Organization

Let D be a door (with the said mechanism), A an organization that whishes to control access to D, and U a user (possibly working for A), again having a card, CU, with proper identifiers, etc. Then A may control access to D by sharing a secret key SK with D. If A wishes to grant U access to D on day d (time interval d), it computes a proof PUDd, that it is hard for anyone other than A (and possibly D) to compute but easy for D to verify. Let us see how this can be done, both using private-key encryption and private-key signatures.

Private-Key Encryption Solution (With Possible Proof of Identity)

For instance, PUDd may be the encryption, EUDd, of a message specifying U, possibly D as well, and d with the private encryption key SK according to some established private-key encryption algorithm such as DES. Upon receiving EUDd from U's card, D decrypts it with key SK, and if the result specifies both U and the current day (time interval) d, then the door opens. The door may use its own clock to determine whether its own time falls within time interval d.

Here, like elsewhere, U is intended to denote both the user as well as a proper identifier for U. If user U has a card (preferably securely) associated with him, then U may be such card or a proper identifier of it. In the latter case, for instance, the door's card reader may get U from the card and also get EUDd, then it decrypts EUDd with key SK and compares the decrypted U with that furnished by the card, to ensure that they are equal.

Notice that EUDd proves to the door D that user U is authorized to enter through it on time interval d, but this does not prove to D that it is indeed dealing with user U. Thus, we may augment the basic scheme with a way for U to prove his own identity to the door. This can be done in a variety of ways. In particular, authority A may provide EUDd only to U's card, and U's card is provided with a key pad, and can transfer EUDd to the door D only if the right PIN is entered on its key pad (and the card may self-destroy, or erase its relevant volatile memory content if the wrong PIN is entered more than a given number of times). This way, whenever the door receives EUDd, it knows that it is receiving from U's card (because A only transfers EUDd to U's card) and it knows that the "user behind the card" must be U (as opposed to a malicious user having stolen U's card) because U's card would not work or transfer EUDd to D unless U's PIN has been entered on its key pad. A second way for U to prove his identity to D consists of having U provide his own PIN directly to D. For instance, door D may have its own key pad, and U uses it to enter his own PIN, PINu. The door may have an internal way (e.g., a table) that maps PINu to U, and thus can realize that it is indeed dealing with U. If there are many doors in the system, however, providing and updating (e.g, because of new users joining the systems) a table for each door may be impractical. It is thus preferable to have U's identifier may directly be PINu. For instance, EUDd might be EPINuDd. When user U approaches door D, he enters PINu into D's key pad and his card transfers EPINuDd to the door. The door then checks whether the PIN entered equals that specified in EPINuDd, and in this case it is dealing with the right user and that this same user is authorized by A to go through door D without using any PIN-user table: indeed, the key pad tells D that a user knowing PINu is in front of it, and EPINuDd tells D that the user knowing PINu is currently authorized to go through D. In a third way, rather than directly appearing into EUDd, the user PIN may be securely coupled with EUDd. For instance, A may give EUDd to U's card encrypted with key PINu or with a key K reconstructable from PINu (e.g., k=H(PINu) or K=H(PINu,d) or K=H(D,PINu,d) etc.). In this case, door D will check that the PIN is securely bound to the user's authorization for time interval d. For instance, it uses PINu to decrypt EUDd and checks that EUDd is a proper authorization using the key SK it shares with authority A.

Using Responders

But: how can A easily and securely transfer EUDd to U's card? We propose using responders. These are devices (such as servers or computer terminals/card readers capable of being linked to a server). Preferably these responders need not be vaulted or protected. Such protection could add so much cost and inconvenience to the system that it is crucial to have the system work securely without securing the responders! Ideally, authority A performs an update at every date d of a series of dates. Each date preferably specifies a time interval (e.g., a day). For instance d may be day d or the beginning of day d. During update d, A decides which user U should be granted access to/through D, and computes a proof verifiable by D of this fact. For instance, in an encryption-based shared-key system, this proof may be the string EUDd discussed above and can be verified because A shares with D the key SK that A used to compute EUDd. All these proofs are then send to the responders. These responders are preferably located in convenient locations. For instance, in an airport system, responders may be located at the airport main entrances. User U then (e.g., when arriving at work) picks up from a responder his own authorization to go through door D. Preferably, U's card may authenticate itself to the responder in order to receive EUDd. This is very convenient, because without wireless or other expensive systems, a user picks up all his daily authorizations for all the doors he is entitled to go through on a given day from the front entrance (through which he may have to go through anyway) and using a traditional mechanism like inserting his own card in a card reader (e.g., to prove that he has shown up at work). After that, he is free to go around the airport and can go easily through all the protected doors D he is entitled to using the authorizations EUDd that he has picked up. But because of this convenience and the fact that the responders are preferably insecure, a malicious user may also pick up a honest user's authorization. It is thus necessary (1) to prevent this from happening without securing the responders and/or (2) ensuring that the authorizations for an honest user cannot be used by anyone else. The latter case can be sufficiently enforced by having users also enter a PIN at the door, as already discussed, preferably securely bound to the authorization released by the card. Thus a malicious user V picking up U's authorization EUDd from a responder cannot impersonate U at the door because it does not know U's PIN. The former protection can be enforced by having authority A send a responder authorization EUDd after encrypting it with a key SKCU inside U's card CU and known to A. This way, A essentially posts in the responder an encrypted authorization EUDd' that can be turned into an authorization EUDd only by U's card, making it useless for a malicious V to download someone else's authorization for the day. Even if V manufactures his own card any way he wants, V still would not know SKCU.

It is further possible to have A share a secret key SKD with door D and secret key SKU with the user U. Then PUDd can be a value EUDdk, consisting of indications of user U, door D and day d, as well as some random secret k, all encrypted (by A) with the secret key SKD. (Note that, in this case, U cannot decrypt EUDdk). In addition, U would receive Ek—namely, k encrypted with SKU. (D and d might be known to U, or could be communicated to U—e.g., by the same responders at the main door.) This way, because U knows SKU, U obtains secret k as well. In order to enter the door D, card U would send EUDdk to D. D would respond with a random value q, and card U would then send Eq, i.e., q encrypted using secret k. The door D would decrypt Eq, verify that the same q was used, and U is the same as that specified in EUDdk, and that the date d is current and if all the checks are confirmed, will let U through. This mechanism could incorporate PIN mechanism as above, making it even more secure. Alternative Challenge-Response methods based on k are possible. (In particular, D can compute and send Eq and ask U to send back the correct decryption q.) Such mechanisms provide security even if the attacker monitors the communication between the card and the door.

However, an enemy who sees the PIN entered by the user at the door, could after stealing U's card impersonate U, at least during time interval d if U's card has EUDd within it. After that, if U reports stolen his card, A will not any longer make EUDd available to U's card.

Private-Key Signature Solution

For instance, PUDd may be the private-key digital signature of a message specifying both U and d (and possibly D as well) with private key SK, known to both A and D, according to some established private-key signature algorithm. In particular, letting H be a one-way hash function, then PUDd=H(SK,U,d). Upon receiving U from the card, the door's reader may sign U and d with its own private key SK and compare whether the result of this computation matches the string PUDd obtained from the card. Notice that the door reader, carrying a clock, may know what is the current day d, and thus needs not to receive it from the card. This works as long as A grants access for full days at a time. Else, the card also sends d (or the chosen time interval) to the reader, and then the reader digitally signs with SK the obtained U and d, checks that the result indeed equals PUDd, and then that the current time (according to the door's clock) is within d. If so it opens.

Again U may be asked to enter a PIN as part of the transaction. In which case the PIN may also be used as part of U. For instance, U may consist of u and PIN, where u is a string identifying the user, and PIN a password known to the user. In which case, the card transfers to the door reader u, and PUDd (and possibly D or d and additional quantities), the user enter PIN to the door control coupled with the reader, or to the reader itself, and then the reader reconstructs U=(u PIN), and then signs Ud with SK to check that PUDd is obtained. Again, if d is card-supplied, it also checks that the current time is within d. This method makes couples a user and his card in a tighter way, so that a enemy that steals the card would have hard time using it without the proper PIN.

Of course, the same SK could be used for a set of doors, in which case by granting access to U for one of them A automatically grants him access to all of them. To allow the greatest granularity of access, each door D may have secret key SKD.

Combining the Two Approaches

As an example of combining the two approaches U may receive from A (e.g., using mechanisms discussed above, in particular, utilizing encryption) a secret key SKUd for the day d. He may then "prove" to the door D his identity and/or authorization using private-key signatures. Namely, the door D would send to the card U a random message m; in response card U would send the signature of m: H(m, SKUd). Note: computation of this signature may require the PINu. The door D then verifies the signature. This may require that the door D knows SKUd (e.g., having received it from A directly, or compute it from some other information: e.g. H(SKD,d,U), etc.) Alternatively, A may encrypt SKUd with a key A shares with D, obtaining ESKUd. Then ESKUd can be given to U (e.g., as described above), and then U can send it to D together with the signature.

Multiple Organizations

As we have seen it suffices for an organization/authority A to share a secret key SKD with a door D in order to control which users U may access D in a given time interval d. This process can be extended so as to enable multiple organizations, A, B, C, . . . , to independently control access through a door D or set of doors, D1, D2, D3, . . Each organization X shares a secret key SKXD with door D, and then use on the solutions described above. For instance, each organization X may choose SKXD and insert it into D's reader. Each organization X may have to send a team of one or more employee/hired workers/contractors/subcontractors from door to door. But to do so in a facility with lots of doors may be impractical or wasteful, since other organizations may have done so already. Also, if there are or there will be many authorities, then the reader may have difficulty in storing all these keys. In addition, proper precautions should be taken. Else, nothing would prevent an enemy from inserting his own secret key into a door's reader, and then, knowing it, it could use any of the above methods to grant access to himself or his accomplices to that door. For these reasons, we put forward the following solutions. Notice, the same methods could be applied to a single solution as well.

First Solution

As we have seen, a user can go through a secure door if he or his card share a secret key for a given time interval. In a way, therefore, the user and the door share a session key. Kerberos and Needham-Schroeder protocols provide a mechanism for ensuring that pairs of entities share secret session keys, and could be applied here within the overall system. However, these protocols are based on a key-distribution center that is on-line and must be contacted whenever a shared session key is needed. Thus, we wish to put forward additional and more convenient methods. To begin with, even for implementing a Kerberos/Needham-Schroeder based system, we need a way for a central authority to distribute keys to doors (which may be harder than distributing keys to other authorities).

We envisage a special authority SA (for instance, at an airport, the Airport Authority) to securely distribute keys to door readers. Preferably, SA may be the only entity that can do so. For instance, the door reader is delivered with no secret keys inside, and is manufactured so that once the first set of secret keys (possibly a set of a single key) is inserted, then the readers stores it for a long time, and accepts no other keys for storage in the future. This way, by being the first one to insert any key into the door reader (before, during, or soon after installation), SA ensures that no one else can install secret keys into the door. Alternatively, a control PIN or key is needed for storing other secret keys into a door reader. The door reader is delivered without any control PINs or keys, and is manufactured so that once the first control PIN or key (or possibly a set of them) is inserted, then the reader stores it for a long time, and accepts no other control PINs or keys in the future. However, provided the right control PIN/key is input, then any new key could be inserted and stored into the reader. This way, by being the first one to insert any control PIN/key into the door reader (before, during, or soon after installation), SA ensures that no one else can insert and store a secret key into a door reader.

At this point the SA knows all secret keys of the reader of a door D: for instance, SKAD, SKBD, SKCD, etc. Rather than implementing Kerberos, it might be simpler that SA now gives SKAD to authority A, SKBD to authority B, etc. At this point, authority AIBI . . . can control users U access to D by either a private-key encryption method or a private-key signature method. Notice that these authorities may operate independently different sets of doors. For instance, assume that 1. door D1 has secret key SKXD1 inside its reader, and SA gives SKXD1 to authority X;
2. door D2 has secret key SKXD2 inside its reader, and SA gives SKYD2 to authority y; while
3. SA gives no key of door D1 to Y and no key of door D2 to X.

Then, authority X may control access to door D1 and authority Y may control door D2 in a totally independent manner.

A Better Solution

But even with the above features available we can improve systems such as above in some important respects. Namely:

Key-storage size. While it is preferable that a door reader stores different keys for each different organization controlling it, this drives up the number of keys that a reader should securely store.

Adding new control. New control issues may come up when a new authority or a new door is introduced in the system. If a door D does not store a key for organization X, and later on it is desired that X gains control over D, then SA must insert a key for X into D's reader. For instance, if a new organization comes up, then the SA must dispatch a team of workers to insert SKXD into every door D that should be control by the new organization. Such physical "tours," however, may be inconvenient. To avoid them, the SA may pre-install additional keys into a door D's reader, and then bind them to new organizations that arise, or to organization that later on must control access through D. This strategy, however, only exacerbates the point described in the first bullet. Furthermore, if a new door is introduced, to be controlled by some already existing authorities, then the SA will have to insert new keys in the door reader, and then deliver the proper secret keys to the already existing authorities that must control it. Though doable, delivering secret keys always is problematic.

Taking back control. Once a secret key SKXD is stored in door D and known to organization X, then X will continue to control access through D, even though at a certain point control over D should be exclusively given to different organizations. To avoid this, SA should again engage into a physical tour and remove SKXD from door D (e.g., by means of a control PIN/key mechanism).

Let us now describe how to bring about these additional improvements.

Basic System Outline

To begin with, we can have the system work with a single key per door. For instance, the SA stores in door D the single key SKD (and of course keeps track of this information). Such key could potentially be computed by SA deterministically from D's identifier and a secret seed s known only to SA: for instance, SKD=H(s,D). The SA then gives control over D to authority X by giving X a key SKXD chosen deterministically from SKD and X, for instance as a pseudo-random function with seed SKD evaluated at X (for simplicity we assume throughout that an entity coincides with a proper identifier of it). In particular, we can have SKXD=H (SKD,X). Authority X then uses SKXD to grant user U access to D for a time interval (e.g., day) d as before. In particular, by using SKXD as the signing key of a private-key signature scheme: for instance, by computing SKXDUd=H(SKXD,U,d) and then causing SKXDUd to be stored into U's card. When U's card communicates with D's reader, then the card provides the reader with (a) X and (b) SKXDUd and possibly other information, such as d (as well as information about the user U). Upon receiving this information, the reader computes H(SKD,X) and then uses the result (allegedly equal to SKXD ) as the signing key of the same private-key signature scheme and signs (U,d)—in the example above by hashing (U,d) after combining it with SKXD. If the result matches the value tended by the card (allegedly, SKXDUd), if the time interval is right relative to the reader clock (and if U entered the right PIN, if PINs are properly used within the above system), then the door opens.

Key Storage Adding Control

Notice that this single-key-per-door system not only minimizes the key-storage requirements, but also vastly simplifies the problem of adding control. Any time that an authority X needs to gain for the first time control over a door D, the SA needs not physically reach D and insert (or facilitate X's inserting) a new D-X key into D's reader. Rather, if D has a key SKD known to the SA, then the SA simply computes the D-X key from SKD (e.g., SKXD=H(SKD,X)) and the delivers such D-X key (e.g., electronically) to X.

Taking Back Control

For each door D and authority X which is entitled to control D for a time interval (e.g., day) d', the SA computes and makes available its signature of this fact. For instance, this signature may be a private-key signature relative to a key SKD that SA shares with door D. In particular, this signature could be the value H(SKD,valid,X,d'). Notice that even if though being a private-key signature, the signature itself can be made public without worries. Indeed, using the H-based implementation of a private-key signature described above, if H is a secure one-way hash function, then computing SKD from H(SKD,valid,X,d') is very hard. Thus, when user U picks up in his card the right door-control permissions of the day, he may pick up for door D not only SKXDUd, but also H(SKD,valid,X,d'). The reader of door D may then verify SKXDUd as before, and additionally ascertain that X has indeed control over D for interval d' by hashing together SKD, valid, X and d' and check that the same value tended by the card is obtained, and check that according to its clock the current time is within d'. In fact, only SA (and D) know the secret signing key SKD: authority X only knows H(SKD,X) and computing SKD from H(SKD,X) and H(SKD,valid,X,d') is very hard. Notice that time intervals d and d' may not be the same. For instance, SA may be satisfied to grant control over D to X on a weekly basis, while X may grant access through D to users on a daily basis. Alternatively, the system may replace use of SKXD as above with a time-dependent version of that key: e.g., SKXDd=H(SKD,X,d). Then SA will have to deliver SKXDd to each authority X before the time period d. To take back control, SA simply stops sending SKXDd for the periods d for which SA decides to deny X control over door D.

Notice too, that the system currently allows for some privacy, in that SA needs not know which users U are given access by X to D, nor their number. The scheme can be, of course remove this privacy (e.g., reporting or by using a Kerberos system).

EXAMPLE 14

Let us now outline our preferred implementation for achieving secure physical access in a systems with a super authority SA, a multiplicity of (preferably disconnected) doors D, a multiplicity of organizations X, a multiplicity of users U. The preferred embodiment minimizes key storage and makes it very easy to add and take back control of a door D to organization X.

In the preferred embodiment, SA grants organization X control over door D for a given time interval. During that time interval, X may itself grant a user U access to D.

We envisage SA (and possibly other players) to take action at each of a sequence of dates d corresponding to a sequence of time intervals. For instance, d could be the beginning of a given day and the corresponding time interval the given day. For simplicity, we may use d to mean both the date and the corresponding time interval. (It should be understood, however, that this is not a limitation: for instance, a date could be a given day, and the time interval corresponding to the date the following day.) For concreteness, but without limitation intended, we may assume that each date/time interval is a day.

We describe the preferred embodiment using a private-key digital signature. This is without any limitation intended. Our preferred embodiment should be considered implemented with any other private key system as described above. To be more concrete, we assume that the private-key signature is implemented using a one-way hash function H. This is without limitation intended: H(SK, DATA) should always be considered the digital signature with key SK of DATA.

We assume that SA shares a secret key SKD with door D. SA may also share a secret key SKX with organization X. (SKD could be generated by A via a master secret key SK. Similarly for SKX. For instance, SKD could equal H(SK,D) and SKX could equal H(SK,X). SA may then privately—or via encryption—provide D with SKD. Similarly for X.)

At each day d, if the SA wishes to grant organization X access to door D, it computes and causes X to receive secret key SKXDd, that is a key securely bound to X,D, and day d that is verifiable by D (e.g., on inputs X and d).

For instance, SKXDd=H(SKD,X,d), that is, SA signs X,d with key SKD. SA then causes X to receive SKXDd. SA may cause X to receive SKXDd by sending SKXDd to X, preferably after encrypting it with a secret key SKX shared with X. Preferably yet, SA sends the so encrypted SKXDd to X by causing it to be stored in a responder, from which X then downloads it.

If X wishes to grant user U access to D in time interval t within day d, X computes and causes U to receive a secret key SKXDdUt, that is a key securely bound to X, D, U and t that is verifiable by D.

For instance, SKXDdUt=H(SKXDd,U,t), that is, X signs U,t with key SKXDd. X then causes U to receive SKXDdUt. X may cause U to receive SKXDdUt by sending SKXDdUt to X, preferably after encrypting it with a secret key SKU shared with U. Preferably yet, X sends the so encrypted SKXDdUt to U by causing it to be stored in a responder, from which U then downloads it.

If U wishes to access D at time interval t, U causes D to receive X, U, t (e.g., U's card transfers the to D's reader).

If D receives X, U, t at day d, it computes SKXDD from its secret key SKD and then computes SKXDdUt from SKXDd. D then verifies that time interval t is indeed within day d, and using its own clock that indeed the current time is within time interval t. Further, D verifies that it is dealing with U/U's card by a challenge-response mechanism using key SKXDdUt. If these verifications are passed, D opens.

For instance, D may compute SKXDd from its secret key SKD by computing H(SKD,X,d), and then compute SKXDdUt from SKXDd by computing H(SKXDd,U,t). For instance, the challenge-response mechanism using key SKXDdUt may consist of having D send a random string q and receive back the encryption of q with key SKXDdUt, or a digital signature of q with key SKXDdUt. Alternatively, D may send Eq, the encryption of q with key SKXDdUt, and must receive back q.

Notice that the preferred scheme should be understood to include using a PIN in conjunction with the above. In particular, any PIN use described in prior sections may be used within the preferred scheme. Notice that the preferred system provides lot of flexibility in that d and t may differ. For instance SA may provide control over D to X for a week d, while X may grant U access to D for a day t within week d. However, we may have d=t, in which case t needs not be specified or separately used within the preferred system.

Kerberos Approach

Using Kerberos approach directly would not work very well in our secure access application. It is most natural to implement all the doors and the SA as one realm (with SA acting as a Ticket Granting Service, TGS, for that realm). Each organization and its employees would then be a separate realm. The authority for each organization would then act as the Authentication Service, AS, for that realm (as well as possibly its own TGS). According to the Kerberos protocols, each user would then authenticate to the respective authority/AS obtaining a ticket-granting ticket, TGT. This ticket TGT would then be sent by the user to the SA/TGS, along with the request for a service granting ticket for each of the doors the user is entitled to. The SA/TGS would then have to verify the user's eligibility and, if the user—if all is correct—provide these service-granting tickets. This protocol is obviously quite laborious, and places much of the burden on the SA. In particular, it will be SA's responsibility to verify which doors the particular user is entitled to and issue the respective tickets. Moreover, it demands that SA be on-line and engage in the protocols in real-time. Having the users a channel to the SA presents an extra security threat as well.

Kerberos Tickets Without Protocols

In principle, we could "abandon" the Kerberos protocols and only use the tickets. Namely, all the tickets would be pre-ordered and pre-computed in advance, and the users would pick them up at the time of the main door entry, without engaging in the appropriate Kerberos protocols.

However, many of the above problems would remain—in particular, it would be natural for SA to delegate the control of certain doors to the particular authorities (but in such a way that this control could be easily taken back, possibly to be re-instated at a later point).

Utilizing RTCs Within Kerberos

One way to help address this problem is to utilize Real Time Credentials, RTCs. For example, we could use the tickets as in the above approach. However, in this approach we may not generate the tickets on a daily basis. Instead, we may use long-range tickets, managing the short-range access controls via RTCs passed in the Authorization-Data field of the ticket.

The RTCs could work in this case exactly the same way as in the case of the public key certificates. However, some optimizations are possible here as well.

Utilizing RTCs as above brings a number of possible benefits. These include (but are not limited to):

1. Ease of Management.
    a. Now, SA must be involved relatively infrequently
    b. Instead of relatively larger tickets, the users will need to pick up much smaller RTCs
    c. Generating the RTCs can be delegated to the corresponding authority
    d. Taking control back is easy: This can be done in at least two ways. First, simpler and cruder—the tickets may not be renewed by the SA when they do run out. A more refined mechanism will utilize two kinds of RTCs: those issued by SA and those issued by the other authorities. Then each day SA would need to issue a single RTC per each authority, which remains (alternatively, it may have to issue an RTC for each Authority-Door pair, where the Authority is entitled to open the Door). Each authority will also issue an RTC per each user (alternatively, per each User-Door pair, where the User is entitled to open the Door). Note: more traditional Kerberos approach would require even more tickets to be generated and passed around in the online protocols.
    e. RTCs allow a clear separation of roles, facilitating many aspects of management and infrastructure.

2. Efficiency.
    a. Space: an RTC is much smaller than a corresponding ticket.
    b. Time: Because they are much shorter (and there are fewer of them and fewer numbers of communication rounds) the communication would be much faster, enabling the users to move through the doors while picking up the RTCs at a reasonable pace.
    c. Load distribution: RTCs can be distributed by non-secured responders. Replication of RTCs would also be neither expensive, nor dangerous.

3. Security.
    a. RTCs are not security-sensitive, once they are generated, and can be managed with greater ease (e.g., by unsecured responders) and without any threat to security.
    b. The separation of tickets and authorizations (via RTC) allows for a greater security in key management (when the keys/tickets are actually generated and communicated)
    c. SA isolation: SA never really needs to have a direct communication line with any of the users.

Beyond Kerberos

It can be observed, that the mechanisms above benefit fairly little from the core Kerberos features (this is largely due to the fact that Kerberos was designed for different applications). So, here we explore how we can utilize RTC-based mechanisms, which are not directly related to Kerberos. These mechanisms could be similar to the private key encryption and private key signature mechanisms above.

In these mechanisms, the special authority SA would share a secret with each organization A (B,C, . . . ) and with each door D. This can be done, for example, using methods as above so that SA needs to store only a single secret s. The secret shared between SA and A would then be SKA=Hash (s, A). Similarly, a secret shared between SA and D is SKD=Hash(s,D). Note, that both A and D also need to store only one secret: SKA or SKD, respectively. In addition, to each organization-door pair (A,D), corresponds an additional secret SKAD=Hash(SKD, A). This secret can be easily computed by both SK and D. Giving SKAD to A can be necessary but possibly not sufficient for A to control access to the door. In addition, A may need to receive from SA (or from another party) an RTC for the current time period d. This RTC, termed RTCAd, need not be secret and may certify that A is still in good standing with SA.

Each user U employed by A and entitled to enter the door D may then receive a key SKAUD=Hash(SKAD,U) from A. Notice that SKAUD can be easily computed by both A and D without any additional secrets. Giving SKAUD to U may be necessary but possibly not sufficient for U to be able to open the door D. In addition, U may need a separate RTC for the current time period d: RTCAUDd.

Notice that this approach has already dramatically simplified the information flows: in the beginning of each time period d, SA sends a single RTCAd for each organization A. And each organization A sends a single RTCAUDd for each user-door pair. All of these RTCs can be picked up by the employees upon entering the main gate. Assuming, that a user U is entitled to entering up to 100 doors within the facility, the RTCAUDd's for all the doors could require less than 2 KB—an amount manageable even by slow connections (typically, it would take a fraction of a second).

To open the door D the user U may need to present the RTCAd and RTCAUDd, as well as perform the authentication based on the secret SKAUD (this authentication may be of the challenge-response type to protect the secret). Notice: since a relatively small number of RTCAd credentials is likely to be present in the system, the validation of these credentials may not need to be done on a per user basis. Instead, each door may validate each RTCAd it receives and cache the result, to be used for other users' validation.

The special authority SA may wish to exercise a finer grain control of the organizations' access to the doors. To achieve such, instead of the per organization credential RTCAd, SA may issue an RTC per each organization door pair (A,D): RTCADd. Then it would be possible for SA to grant and take back control over each door by each organization on a daily basis. Note that this may at most double the amount of RTC data that each user would need to receive (still keeping the required transition time for the above example at a fraction of a second).

Aggregate RTCs

One may observe that often the access control rights do not change dramatically from day to day. So, much of the power of the above mechanisms is not utilized. We propose an RTC aggregation mechanism, which can be utilized in such relatively stable environments to increase efficiency even further.

EXAMPLE 15

Consider as an example, a case of 100 organizations each having access to 1,000 doors. Therefore, there are a 100,000 of organization-door pairs, and thus, RTCADd credentials to be issued and distributed by SA every day. Moreover, if each organization employs around 1,000 people, this would lead to 100,000,000 RTCAUDd credentials to be issued and distributed by all the organizations.

Let us divide all the organization-user-door triplets AUD's into hierarchically arranged groups. It may be easy to visualize these for example as follows. Let all the AUD's correspond to the leaves of a balanced binary tree (ordered in a preferred fashion). Than each node n of the tree corresponds to a set of all the AUD's corresponding to the leaves in the subtree of n. To each such node and a time period d, let there correspond also a credential RTCnd. Then the validity of AUD triplet in the period d can be certified by any of the credentials RTCnd, for any of the AUD ancestors n. Thus, if all the AUD triplets remain valid on day d, then a single credential RTCr, where r is the root of the tree, is sufficient for the whole system.

In general, if there are 100 AUD triplets that become invalid, then at most 1,500 credentials are sufficient to certify the whole system (that is instead of 100,000,000). More generally, at most k(26-lg k) credentials are needed for certification of the whole system if k triplets are invalid.

This method can lead to dramatic improvements even if the aggregate RTC's require more values to be stored in the doors and/or users: in the above example, such an overhead may result in at most a factor of 26 overhead in the storage, while saving orders of magnitude (four or five in the example above) in communication. More generally, if a set of all entities to be authorized (in our examples, these were AUD triplets) contains N elements, and k of these are to be excluded, then at most k(lg N-lg k) credentials are needed to certify the whole system, while the overhead for the aggregation may be at most lg N. Even more efficient representations of the groups exist in the literature (e.g., while the above is known as subset cover method, we may use also the subset-difference cover and some of the recent results on it)

so, validation of such aggregate credentials may be optimized, e.g., by caching the results at least for the larger groups.

RTC Implementations and Optimizations

Many different implementations for the real-time credentials are possible. These implementations of RTC's also allow many different optimizations. For example, a real-time credential can be implemented as follows: Let $x_0$ be a random value, e.g., 20 bytes long. Let $x_i$ be defined as $x_i$=Hash($x_i$). Let $x_n$ be a public value fixed in some way (e.g., communicated securely by from SA to door D. Then, $x_{n-d}$ would be the real-time credential RTCd for the time period d. It can be verified by applying Hash( ) to $x_{n-d}$ times and verify that the result is equal to $x_n$. This is essentially how RTC's are implemented in the case of public key certificates—for example, there $x_n$ can be included as part of the certificate.

It is possible to use essentially the same implementation here as well. Instead of including $x_n$ inside the certificate, here we may include it as a part of the Kerberos ticket. Or, we might communicate it by some other secure way, such as encrypted with the secret key SKD for the door D, etc.

Another possible implementation of RTCd is simply to set it equal to Hash(SKD,RTC,d), where RTC refers to the credential ID. For example, in order to enable organization A to have control over door D on day d, the credential RTCADd would be used, where RTCADd could be set to RTCADd=Hash(SKAD,d). A credential for user U to access door D on day d, as issued by the organization A may be RTCAUDd=Hash(SKAD,U,d). Such a method allows the credentials to be pre-issued for specific dates well in advance, and without granting access on any days outside the desired time periods (even if these are non-contiguous).

The validation of the above credentials is straightforward. Note, that the above credentials are essentially symmetric signatures with the appropriate keys. In all the above, encryption may be used in place of the Hash.

Notice that we have made the system ore and more efficient at each step. Consider an airport with 1,000 doors, 100 authorities, and 10,000 possible workers, and assume for simplicity that control is given on a daily basis. Then a Kerberos/Needham-Schroeder system in which a central authority is involved in computing each door-user key must be involved in 100 Million secret keys per day. A system as outlined above, would require SA to generate and deliver to all the authorities less than 100,000 secret keys per day.

Real Time Credentials Over OCSP

We now describe the use of a preferred embodiment of the present invention for Real Time Credential validation technology within an environment that uses the Open Certificate Status Protocol (OCSP) for digital certificate validation. This shows how the inventive technology maintains compatibility with the OCSP standards while offering qualitatively superior security and scalability than traditional OCSP implementations.

Traditional OCSP Implementation

CRLs may grow big because they provide proofs of revocation (and thus, indirectly, of validity) about many certificates lumped together. By contrast, the OCSP provides proofs of validity of for individual certificate. OCSP services are typically implemented by OCSP Responders. Such a responder is a server that, upon receiving a question from a client (aka Relying Party) about the validity of a given certificate issued by a given CA, provides a digitally signed answer indicating both the status of the certificate and the time of the answer. For doing this, it is necessary for the OCSP responder to know the status of all of the CA's certificates, since it is the CA that can revoke its own certificates. If the OCSP responder were the CA itself, such knowledge is trivially acquired. Else, some other form of keeping the OCSP responder updated about the status of the CA's certificates must be employed. For instance (cfr. U.S. Pat. No. 5,717,758, Witness-Based Certificate Revocation System), the CA may send the responder its most recent CRL, and the responder may consult that signed document to deduce whether the certificate of interest is currently valid or revoked and so say in its signed response, also indicating the time, as well the time of the next update. (Here it is natural for this update time to coincide with the date of the next CRL of the CA, since it is that CRL that may trigger a different response.)

Of course, a malicious responder may provide arbitrary signed answers about the certificates of a given CA, with or without consulting the latter's CRLs. For the relying party to securely rely on the digitally signed answer of a OCSP responder about the certificates of a given CA, the OCSP envisages that the CA providing the responder with a responder certificate, a special digital certificate—signed by the CA—that essentially proves to other parties that the CA trusts the responder to provide accurate proofs about its certificates.

Notice that for this process to work, each OCSP responder (as well as every CA) must have a secret signing key, and this key must be protected (ideally by placing it or the server using it in a vault).

Figure 2:
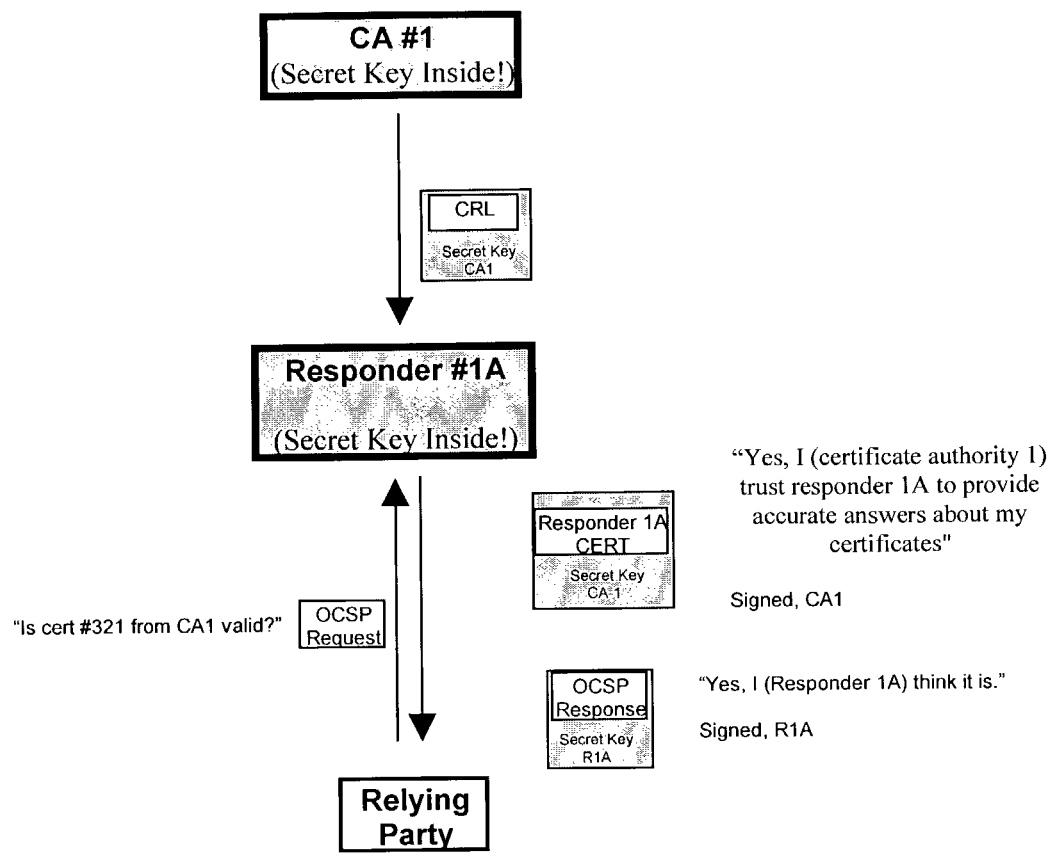
FIG. 2 is a schematic illustration of the sequence of transactions in a trivial OCSP environment.

FIG. 2 shows this sequence of transactions in a trivial OCSP environment. The fact that secret signing keys are protected is graphically emphasized by putting them with some thick "borders." In case of a signed data, the name of the signer is indicated immediately below. This figure shows the various PKI-sensitive elements of this transaction as shaded boxes. The Certificate Authority itself has a private key, SKI, that must be kept secure to prevent the unauthorized issuance and revocation of certificates. This key is used to sign the CRL that is published to the OCSP Responders. The secret key of responder 1A must also be kept secure, and is used for signing the OCSP responses of responder 1A.

Drawback of OCSP

DRAWBACK 1: Computation

Digital signatures are computationally intensive operations. The digital signature created by the Responder on each response is generated at the time of the request, and is by far the most computationally intensive part of the validation operation: it can easily add anywhere from 50 milliseconds to 1 second to the transaction time.

Even if a responder cached its digital signature about a digital certificate C and then sent the same signature when asked about C until the next update, still the answer to the first user asking about C will be significantly delayed.

DRAWBACK 2: Communication (With Centralized Implementations)

Figure 3:
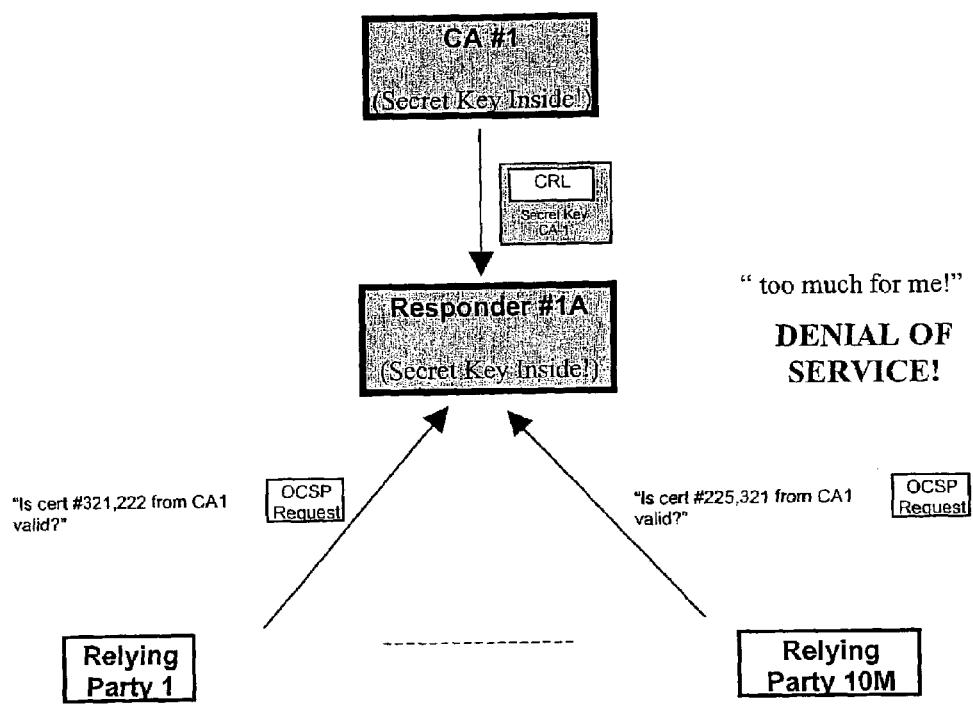
FIG. 3 is a schematic illustration a major "network bottleneck" in a server causing considerable congestion and delays.

Assume a single validation server implements the OCSP in a centralized manner. Then, all certificate-validity queries would have, eventually, to be routed to it, and the server will be a major "network bottleneck" causing considerable congestion and delays, as shown in FIG. 3. If huge numbers of honest users suddenly query the server, a disrupting "denial of service" will probably ensue.

DRAWBACK 3: Security (If Distributed Implementations)

To prevent the bottleneck problems that centralized OCSP implementations may cause, a CA may consider distributing the request load generated by its certificates by distributing it across several OCSP servers (that it properly certifies). In general, distributing the load of a single server across several (e.g., 100) servers, strategically located around the world, alleviates network congestion. In the OCSP case, however, load distribution introduces worse problems than those it solves. In order to sign its responses to the certificate queries it receives, each of the 100 servers should have its own secret signing key. Thus, compromising any of the 100 servers would effectively compromise the entire system.

If a traditional OCSP Responder were compromised, an attacker could do one of three things. First, it could prevent the Responder from issuing any responses. This type of attack is detectable at the Relying Party, and thus not too severe. Second, it could use the discovered secret signing key to sign responses indicating that legitimate certificates are revoked. Third, and most disruptively, it could make the Responder generate signed responses indicating that a revoked certificate is still valid. This type of false-positive response could allow a terminated employee to regain access to systems, etc.

The best way to prevent that a responder could be compromised is to run it from a secure vault, with 24×7 surveillance, etc. Unfortunately, this is a costly option. A truly secure vault, meeting all the requirements needed for a financial CA, may cost over $1M to build and $1M/year to operate. Even if one were willing to pick up such expenses, vaults cannot be built overnight: armored concrete does not scale! If a Ca needed a few more vaults to lessen the load of its current responders, it may have to wait months before a new one could be constructed.

Moreover, even if several expensive vaults were in place, they may still not be secure. This is so because the OCSP mechanism requires that a responder receive requests coming from un-trusted sources (the clients on the field) and then service them using its secret signing key. The possibility thus exists that a malicious agents prefer to exploit any weakness in the underlying operating system and thus expose the secret signing key to drilling holes night time through an armored-concrete wall. In sum, if no vaults or a sufficiently expensive perimeter protected a responder, the probability of a compromise is very high, but even if a truly secure building housed a responder, a responder would still be vulnerable to a software attack: to a sophisticated digital enemy, the OCSP mechanism makes a vault look much like a bunker with a "window."

DRAWBACK 4: Trust Flow

Figure 4:
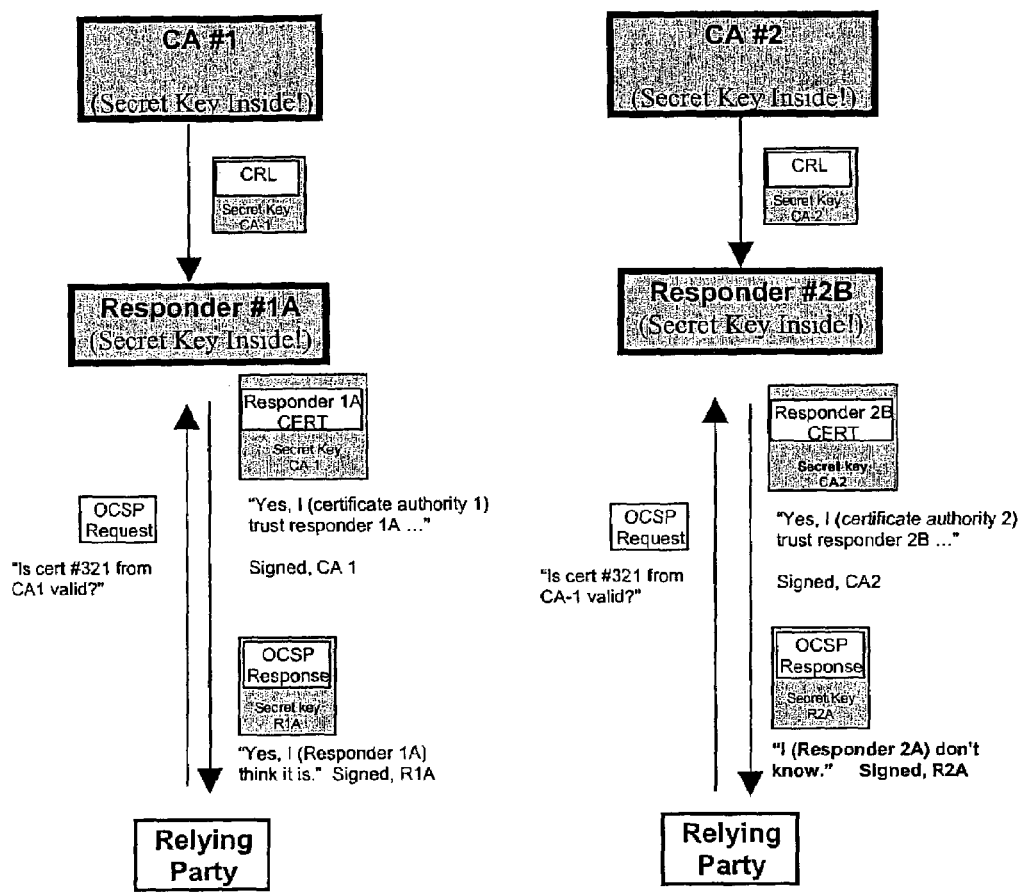
FIG. 4 is a schematic illustration showing how OCSP has difficulties in servicing certificate validity requests originating from different security domains.

OCSP has difficulties in servicing certificate validity requests originating from different security domains. In the scenario shown in FIG. 4, the Responder run by organization #1 is able to provide responses about the status of certificates from CA #1, but Responders run by another organization may not have enough information to provide responses about the "foreign" certificates. For instance Responder 2A, run by certification authority CA 2, does not know how to answer requests about CA 1's certificates.

This problem, deriving from lack of specific knowledge, could be addressed in one of two ways.

First, the Relying Parties from organization #2 could find the Responders from organization #1 to ask them about the status of certificates from CA #1. This limits performance however, since the Responders from organization #1 may be geographically distant from Relying Parties interested in organization #2, so network times may greatly slow overall validation processing.

Figure 5:
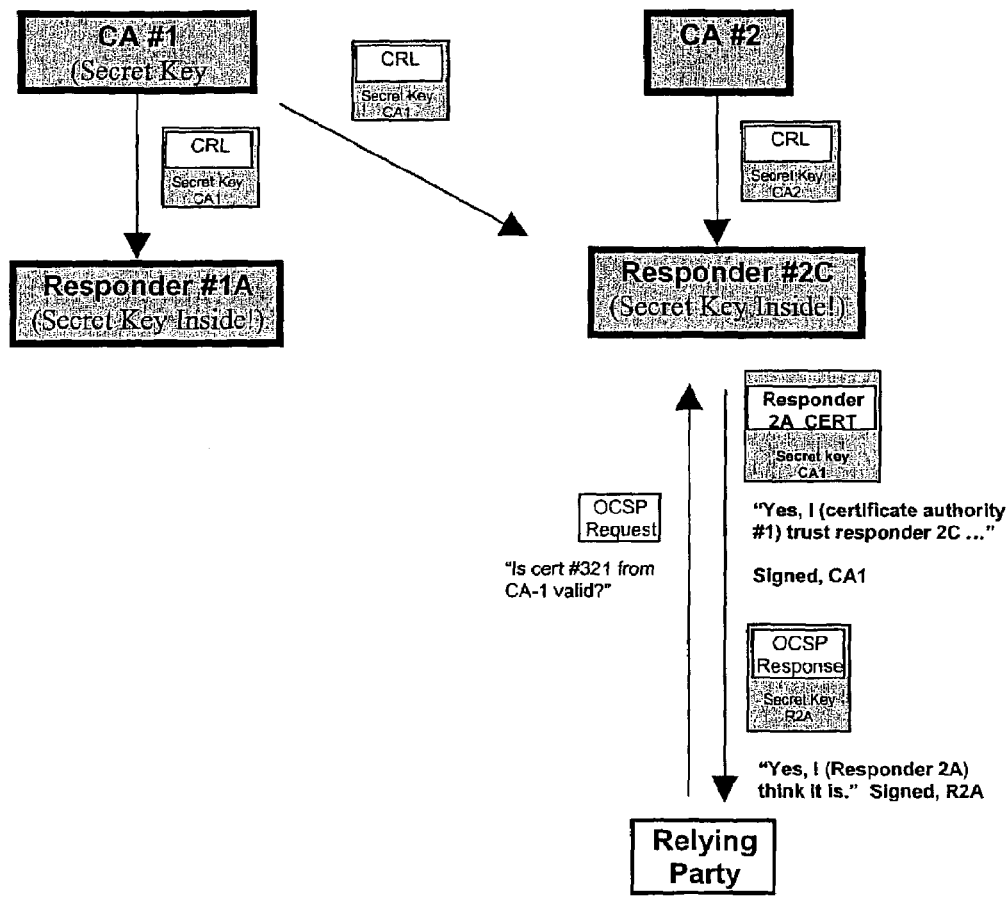
FIG. 5 is a schematic illustration showing the servicing of certificate validity requests originating from different security domains according to one embodiment of the invention.

The second alternative is to allow Responders from organization #2 to make responses about certificates from organization # 1, by having CA #1 forward its CRLs also to "foreign" responders. This indeed poses no security threats, because CRLs are digitally signed, and because a CA wishes to inform the largest possible audience about the validity of its own certificates. This provides sufficient information to a Responder of organization #2 for answering a request from a Relying party about a certificate of CA 1. But for the Relying Party to take Responder 2A's digitally signed answer really seriously, CA I should also certify Responder 2A as trustworthy for answering validity queries about its own certificates. The whole process is illustrated by FIG. 5.

This approach provides better scalability and performance, but it muddies the security and trust flow between the two organizations. In the example above, Responder #2A is making an authoritative response to the Relying Party that the certificate #321 of CA #1 is still good. Making an incorrect response for any reason (misconfiguration, hostile attack, or straightforward dishonesty), Responder 2A may cause adverse consequences for users from organization #1. By allowing Responder #2A to make authoritative claims about its own certificates, organization #1 is relinquishing some of the trust that it previously held.

As an example, consider the case where the organizations are credit card issuers. Bank #1 revokes the card certificate for user #321, and it pays to ensure that its Responders are secure and reliable. The Responders from Bank #2 are misconfigured, so when a merchant Relying Party asks about the validity of user #321, they incorrectly respond that the user is valid. The merchant accepts this answer and allows a transaction to proceed for the revoked user.

This type of delegation-of-trust between organizations may be acceptable in some cases, but it is not a generally useful alternative for any large-scale heterogeneous deployment of traditional OCSP.

Real Time Credentials Over OCSP

In light of the above problems, we wish to put forward an alternative certificate validation system, Real Time Credentials (RTC), that while keeping compatibility with current OCSP standards, solves all the described drawbacks of traditional OCSP. RTC technology differs from traditional OCSP in that:

1. It does not delegate trust to foreign Responders;
2. It centralizes all validation trust into a single authority (the RTC Authority); yet,
3. It distributes the query load from this single authority across an arbitrary number of unprotected responders;
4. It does not decrease security even in distributed implementations relying on thousands of Responders (and even though these responders are unprotected!);
5. It improves dramatically the response time to a query.

This provides a radical improvement over traditional OCSP in terms of security, performance, scalability, and heterogeneity.

The RTC System comprises the following steps:

The CA certifies the RTCA: The new system is centered around the RTC authority (RTCA). This is an entity that may or may not coincide with the CA of a given organization. Preferably, each CA provides its own RTC with a special certificate, the RTCA certificate. The CA preferably digitally signs this certificate, indicating that it trusts and indeed empowers the RTCA to provide certificate validity information about its own certificates. Such a certificate may bind a given verification key PK (for which the RTCA possesses a corresponding secret signing key) to the RTC authority (e.g., identified by a given identifier, OID number) and specify in some fashion that the certificate essentially confers RTC status, and may include other traditional certificate information and formats. In case the two entities coincide, it may still be advantageous for them to have distinct signing keys, so that, in effect, in any case the CA only issues certificates and the RTC authority only manages them (i.e., proves them valid or revoked). This being the case, even if the CA and the RTCA coincide, an RTCA certificate may still be employed. Preferably each CA has only one RTC, though for redundancy purposes, it may be advantageous to have more than one, whether or not using the same signing key.

The RTCA protects its signing key: The RTCA must protect its signing key, for instance by means of a vault or secure facility. (As we shall see, however, there is no need of additional vaults for certificate validation purposes!) The RTCA may host in the same protected facility more than one server embedding its secret signing key, or securely store (e.g., in Banks' safe security boxes) copies of the key, or host more than one server each having a secret signing key properly certified by the CA.

The CA informs the RTCA of the status of its certificates. For instance, it keeps it appraised on any change in certificate validity in an on-line/real-time fashion (such as sending a message informing the RTCA of a change in certificate status as soon as it occurs). Alternatively, it may send the RTCA its CRLs when produced.

The RTCA individually signs the validity status of each certificate for a given interval of time, independent of any request: Preferably periodically (or at any date of a sequence of dates), the RTCA, based on its current validation knowledge (e.g., based on the latest CRL of the CA) and independent of any Relying Party request, processes each outstanding certificate of its CA, and digitally signs a declaration stating the status of that certificate. The result therefore carries a time component indicating the next update for that certificate. If the period of the RTC depends on the CA-issued CRLs, the update time may be that of the next CRL. The time component may also indicate the issuance time of the CRL used in the processing. In essence, therefore, the RTCA pre-computes a digital signature indicating the status of each certificate for a given time interval T (e.g., from the date of the latest CRL—or from a date sufficiently close to it—to the date of the next CRL—or to a date sufficiently close to it, in either case so as to allow time sufficient from processing all the necessary information). Such pre-computation is performed independent of any relying party request about the certificates. Indeed, preferably the RTCA pre-computes all such signed declaration of certificate status before any queries about certificate status in that time interval are made, or before that time interval altogether. In particular, the RTCA may pre-compute all its signed declarations about time interval T one minute before T starts. The fact that by so doing it is not going to be "synchronized" with the CRL (in case it is used) is not too serious. The CRL itself is not real time, and information about certificate revocation and indeed the very reason for which a certificate has been revoked may take considerably more time. For instance, a user may realize that his secret key has been compromised and thus request that his own certificate be revoked one day after the fact. Thus in any case the certificate has been revoked with a one day delay. Preferably, the RTCA signed declarations of certificate validity are in standard OCSP format. That is, in essence, the RTCA preferably pre-computing OCSP-compliant responses to OCSP requests that have not yet been generated. This is important because OCSP software is already in place, and it would be very convenient to take advantage of the RTC system without having to modify any of the existing relying party software.

The RTCA sends his pre-computed signatures of validity status to unprotected responder: After pre-computing such a signature, the RTCA makes it available (e.g., sends it to) to other parties, including relying parties (e.g., in response to requests of theirs), but, in particular, to responders. These responders need not be protected. In fact they handle RTCA-signed messages, and these cannot in essence be fraudulently modified or altered in an undetectable way. Indeed, the RTCA may easily send them to foreign responders (responders belonging to other organizations) with any jeopardizing security. The RTCA may facilitate the responder processing of its signatures by presenting them to the responder in a suitably organized fashion. For instance, it may present its signed certificate validity status ordered accordingly to the certificate serial number, or in an array, or ensuring that each signed piece of data has the same or suitably closed length, etc. To ensure that all the relevant pre-computed responses have been received, the RTCA may sign and date the totality of its responses (e.g., all those relative to the same time interval and CA).

In addition, an RTCA preferably sends to its responders its own RTCA certificate. This transmission needs not occur at every update. In particular can be performed only initially.

The responders store the RTCA-pre-computed signatures: A responder stores the received pre-computed signatures of the RTCA for a sufficient time. Preferably, if these signatures relate to a given time interval T, they store them at least until the end of T. Preferably too, the responders (especially those belonging to the same organization as the RTCA) may be pro-active and check that they received the proper RTCA signatures correctly and on time. For instance, a responder may:
  (1) Verify that the pre-computed responses about a time interval T are received by the beginning of T (or other suitable time related T);
  (2) Verify the received RTCA signatures (and possibly also the proper RTCA certificate);
  (3) Verify whether it has received all signatures (e.g., less than the expected number of signatures, less signatures than at last transmission, etc.)
  (4) Verify whether it has received a RTCA-signed declaration of validity for a certificate that was previously declared revoked; etc.

If any problem is detected, it may inform the RTCA or another proper entity.

Relying parties ask responders for validity status information: Relying parties ask responders for the validity status of certificates. Preferably, they do so using the OCSP format for their requests.

Responders answer queries with pre-computed responses: When asked about the validity of a given certificate, the responder fetches from memory the RTCA pre-computed answer for that certificate and returns it.

A responder may also forward the proper certificate for the RTCA that has signed the pre-computed response Relying parties verify the pre-computed answers (and RTCA certificates). Relying parties process the receive responses to ascertain the validity status of the certificate of interest. Preferably, if the response is in OCSP format, they use OCSP software for such processing. Preferably too they verify the proper RTCA certificates.

Throughout this application, it is understood that certificates may be hierarchical certificates and that proofs of the currently validity of CA certificates and CRTA certificates may be added and verified whenever needed.

Figure 6:
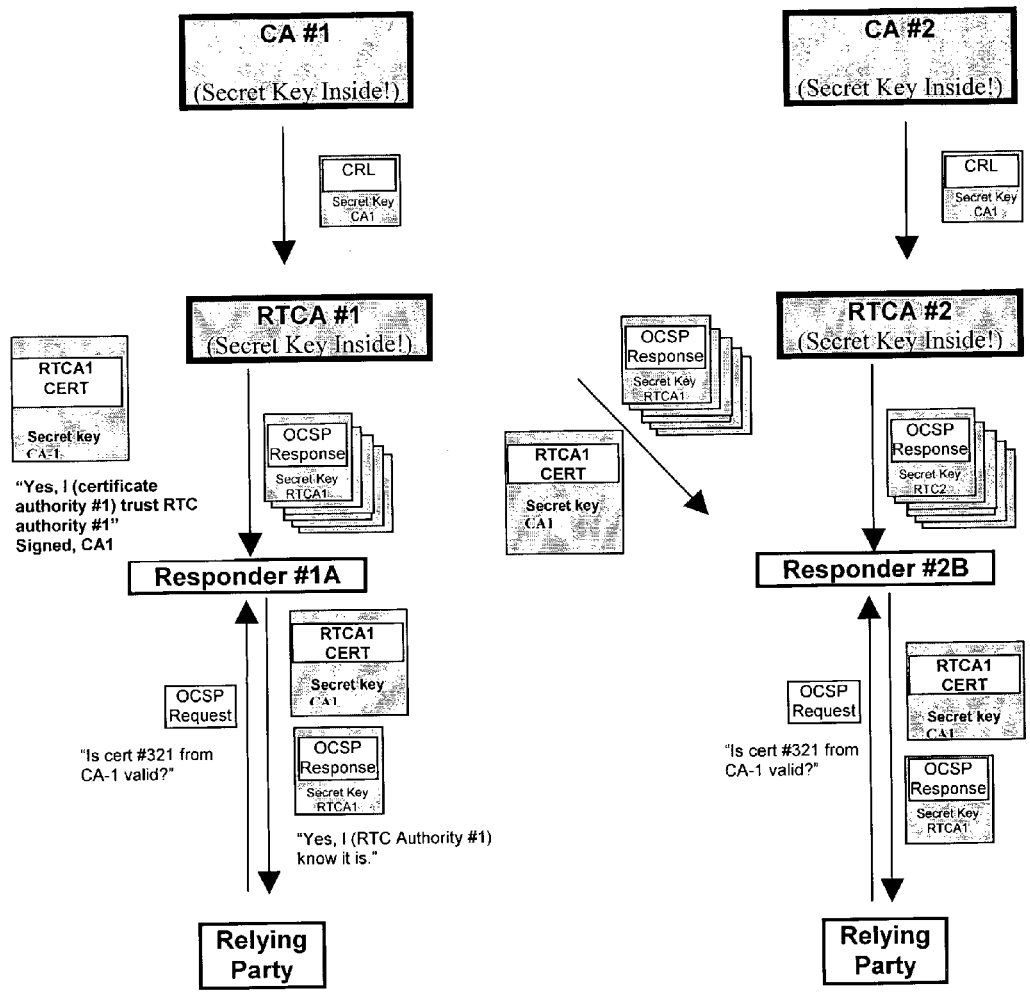
FIG. 6 is a schematic illustration of the RTC System according to one embodiment of the invention.

FIG. 6 illustrates the RTC System.

Advantages of the RTC System

The RTCA periodically generates digitally signed validity declarations (proofs, since such declarations cannot be forged) for all current certificates of the CA, and then distributes them to any interested responders. (Each proof is preferably structured as a syntactically correct OCSP response, signed by the RTCA private key.) When a relying party asks about the status of a certificate, the RTC responder is able to return the corresponding pre-generated response which it has cached. The relying party can verify the signature of the RTCA. (In addition, it can also verify the RTCA's certificate, to ensure tat it is dealing with an authentic RTC authority for the given CA. Of course, this like all other certificates can be hierarchical.)

Advantage 1: Computation

Digital signatures are computationally intensive operations. But the RTC system concentrates this difficulty on a single server (entity): the RTCA. It is therefore very easy and relatively inexpensive to equip with this single entity with a computer sufficiently powerful to handle all required digital signatures. By contrast, the RTC responders perform only trivial computations. They essentially (1) store the RTCA signatures and (2) perform just fetch-and-forward operations in response to relying parties queries. Therefore they can be implemented with very inexpensive hardware. As a result, the total RTC cost may be significantly lower than that of the OCSP! At the same time, response time is much quicker. Indeed, the time for a very inexpensive RTC responder for fetching and sending a pre-computed RTCA response is negligible relative to that taken by an OCSP responder which must perform a digital signature in response to a relying party request.

Advantage 2: Communication

In the RTC system, responders may employ trivial hardware and do not need to be secure. Consequently RTC responders are very cheap indeed, and can be deployed in great numbers. That is, one can always afford distributed implementations of RTC system. Therefore, even if enormously many certificate-validity requests are generated in a short amount of time, this load can always be spread across many RTC responders, eliminating the risk of congestion and benign denial of service without incurring much cost. (Notice that the amount of work of the RTCA solely depends on the number of certificates and is not affected by the number of validity-status requests. Thus a single RCA can be used even if millions and millions of validity requested are expected.)

Advantage 3: Security

In the RTC system only the RTCA (besides the CA, if it is a different/differently located entity) be protected. In fact the responders do not store any secret key: they only store the digital signatures of the RTCA, but for all security purposes may be made totally public after being computed by the RTCA. By contrast, each OCSP responder has a secret signing key, compromising which one may compromise the entire system. Therefore defending a single site is preferable and easier than defending many and equally important sites.

Moreover, unlike in the OCSP, relying parties cannot easily mount software attacks. In fact, the RTC responders service relying parties' requests with non-secret information. In fact they do not have any secret keys themselves and need only store pre-computed digital signatures. Thus, even if a relying party succeeded in embedding in its query some kind of Trojan horse, it would be able to expose nothing. At most it can expose all a RTC responder knows, and that is the full and accurate account of which certificates are valid and which are revoked in a given time interval. And this not only is non-secret information, but it is even information that a certification authority would like to be universally known, so that no one may rely incorrectly on one of its certificates!

Finally, notice that software attacks cannot be easily mounted against the RTCA either. In fact, though possessing a secret signing key, the RTCA does not process requests of untrusted sources. This is so because the RTCA does not answers any untrusted requests: it simply receives inputs from the CA (a very trusted source!) and periodically outputs data (signed validity statements). Therefore the very ability to inject a Trojan horse in missing in the RTC system! In other words, not only a single vault may be sufficient in the RTC system, but this vault has no "windows" whatsoever.

Advantage 4: Trust Flow

In addition to these advantages, the RTC-over-OCSP approach enables significant flexibility within heterogeneous PKI deployments involving multiple organizations. The following diagram shows how RTC-over-OCSP would be deployed in a cross-CA environment.

Figure 7:
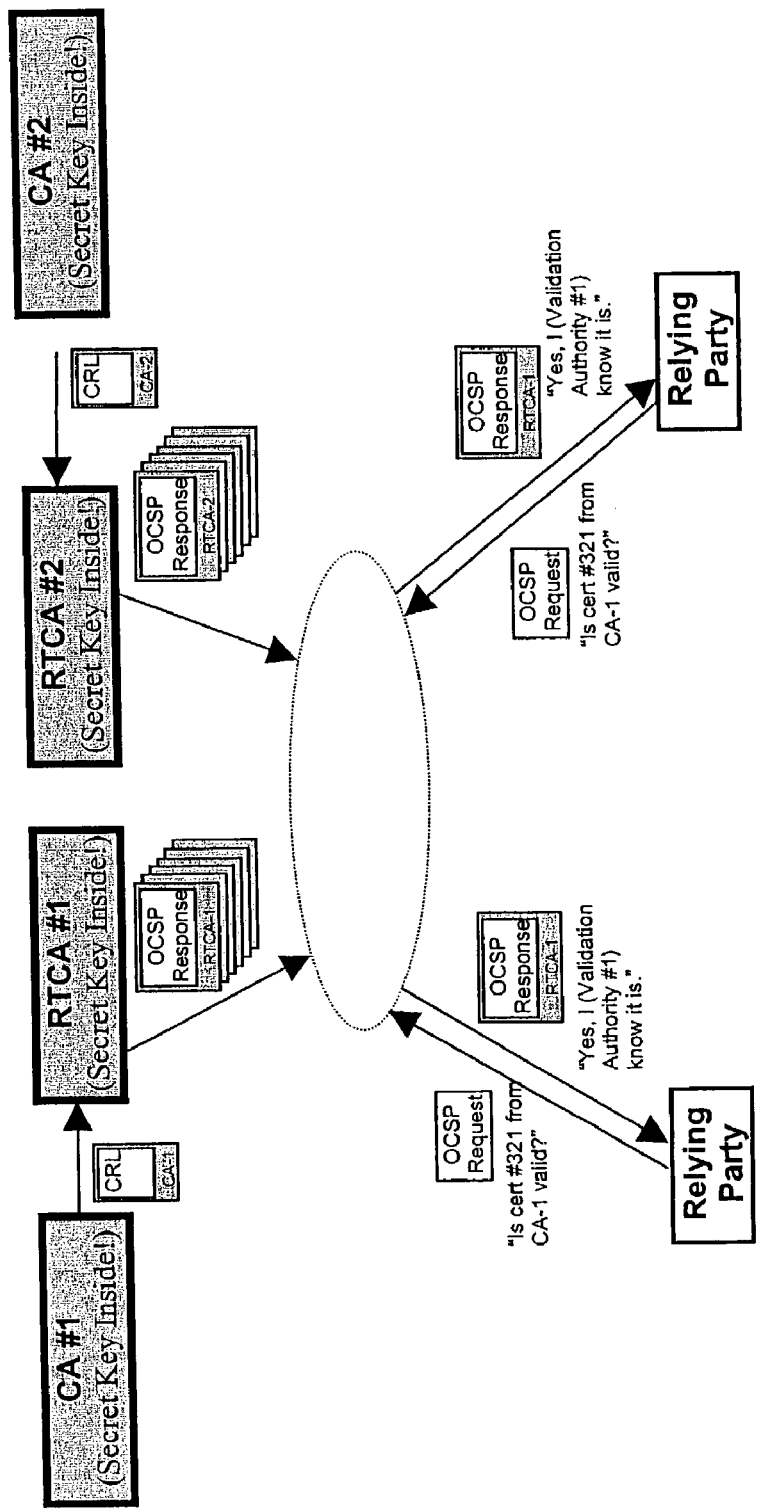
FIG. 7 is a schematic illustration showing how RTC-over-OCSP would be deployed in a cross-CA environment according to one embodiment of the invention.

FIG. 7 shows how a responder from organization #2 can relay (preferably, OCSP compliant) responses from organization #1 without needing to transfer any trust from organization #1 to responders of organization #2. Since RTC responders are simple, non-trusted relays of information, they can be widely distributed and mirrored without reducing overall system security. A relying party queries a responder of organization 2 (Responder 2B) about the validity of a certificate of organization #1. Notice that the (preferably OCSP compliant) response that it gets back it convincing because it is digitally signed by an RTCA of organization #1 (RTCA1). Further, the direct digital signature from the right organization (which is best positioned to know which of its own certificates are still valid, and which has the greatest interest in not making mistakes) is preferably corroborated by the fact that the relying party also gets RTCA1's certificate (preferably signed by CA1) that vouches that RTCA1 is indeed a proper RTC authority of organization 1.

In sum, organization #1 enables the responders of organization #2 to provide convincing proofs of validity for organization #1's certificates without relinquishing any amount of control over the validity status of its own certificates. That is, in the RTC system 1s trust may flow from one organization to another with any associated loss of neither security nor control.

Advantage 5: Secure Heterogeneity

FIG. 7 shows the extreme case, where Responders are treated as transparent network infrastructure rather than hardened trust points. It shows how the extreme case of RTC enabling the secure construction of a heterogeneous cloud of Responders that are capable of servicing requests about the status of certificates from many sources. This is similar to the service cloud offered by the Internet's DNS infrastructure, in that it allows for a heterogeneous collection of name servers that transparently interoperate to discover and cache valid responses for queries.

This heterogeneity is a significant advantage of the RTC system over traditional OCSP. It allows a wide variety of organizations to interoperate so that relying parties from different organizations can cross-validate certificates from other organizations in a secure, reliable, efficient manner.

Real Time Credentials (RTC) is a cost-effective, secure, scalable, and overall efficient certificate validation system. RTC can (1) provide an alternative to the Open Certificate Status Protocol (OCSP), as well as (2) work within and enhance the OCSP. RTC systems, in fact, even when exercising the option of maintaining compatibility with the OCSP standards, provide significant advantages over the OCSP, so as to offer qualitatively superior security and scalability.

RTC Optimizations

2-Party Versus 3-Party Certificate Validation

Let U be a party having a certificate Cu. As part of a transaction with a party V, U may send Cu to V (unless V already has it), and possibly perform additional tasks (such as exhibiting a digital signature relative to a public verification key certified in Cu to belong to U, or being identified by decrypting a random challenge encrypted by V using a public encryption key certified in Cu to belong to U). For the transaction to be secure, V might ascertain the current validity of Cu and make a validity query to a RTC responder. The responder would answer this query by fetching and returning the most current RTCA-signed declaration about Cu. However, querying an RTC responder makes 3-party a transaction that would otherwise be 2-party, increasing the time of the desired U-V transaction.

Thanks to its predictable time intervals, RTC may significantly help. Namely, party U may, at the beginning of each time interval T (or during it anyway), receive an RTCA-signed declaration Du that Cu is valid throughout T. U can receive Du in response to a request to his (e.g., by making a ordinary relying-party request) or may be pushed Du (e.g, by an RTC responder or by an RTCA at every update on an automatic basis). In either case, transacting with V during interval T, U may forward Du to V, in addition to all other steps or tasks the transaction entails. Therefore, the U-V transaction is significantly sped up, since V needs not call any third party in order to ascertain the current validity of U's certificate.

Though, in some sense, the "overall time," which includes U obtaining Du, may not be sped up, the U-V transaction will be. Notice that speeding up only the U-V transaction without saving in overall time, may still be quite valuable. In fact, assume RTCA declarations are computed at midnight and specify an entire day as their time interval. Then, U may obtain Du early in the day (when no real pressure exists) and then forward it to V during a time sensitive U-V transaction conducted during working hours, when saving time could be essential. Further efficiency is gained, if U, after obtaining and caching DU, forwards it throughout the day when transacting with several (e.g., 100) parties. This way, for instance, a single relying-party query (that of U itself, possibly made at a relaxed time) successfully replaces 100 relying-party requests (possibly at times of pressure).

Notice that this optimization can also be achieved by the parties V. Namely, after obtaining a response Du from a RTC responder in return to a query about the validity of a certificate Cu of party U, party V can give to U, or make Du available for others to use.

This optimization too applies to the preferred, OCSP-compliant implementations of RTC. Actually, we suggest applying a similar optimization also to traditional OCSP implementations. Namely, a user requests and obtains an OCSP response about his own certificate, and then forwards this OCSP response as part of his transactions to the other parties of the transactions for the appropriate time interval. Alternatively, when asked for the first time by a relying party about the validity of a certificate Cu of party U, an OCSP responder computes its response Ru, returns it to the querying relying party, but also forwards it to U, so that U can cache it and, at least for a while, can forward it as part of its transactions based on Cu.

Certificate-Helped Validation

Notice that the RTC system may be implemented using data found in the individual certificates, thereby saving additional certificates and/or response length. As we have seen, the CA may issue an RTCA certificate that empowers a given RTCA to provide authoritative answers about the validity of its own certificates. Such an RTCA certificate ideally specifies the public key that must be used for verifying the RTCA-signed responses. The CA may however, embed this RTCA public key within its own certificates. That is, the CA (with proper format, OID, etc.) may include in a certificate Cu also the public key PK that should be used for verifying the digitally signed responses about Cu's validity. This way, a relying party needs not receive a separate RTCA certificate. When asking an RTC responder for the latest proof of validity for Cu, it may just obtain (e.g., because it so asks) only the RTCA-signed response. In fact, Cu specifies within itself the public verification key that a relying party may use for verifying a proof of validity for Cu. This may yield significant savings in transmission (since the RTC responder may not need to send a separate RTCA certificate, which may be much longer than an RTCA response) and in storage (since the relying party may not need to store the RTCA certificate alongside with the RTCA response, as protection against future claims for having relied on Cu).

Similarly, a certificate Cu may specify its own time intervals. In this case, an RTCA response may not need to specify both the beginning and end of an interval T. In fact, the beginning of T alone (or other simpler specification) may pin-down T. For instance, if Cu specifies daily updates, then any time within a given day suffices to specify the entire day to which a response refers. Alternatively, if it is clear (e.g., from the CA's general policies) that the certificates have validity intervals consisting of a full day, then there is no need for this information to be specified within a certificate, and yet the same savings in RTCA responses apply.

Separate Revocation

While an RTC proof of validity or suspension for a given certificate C should specify the time interval to which it refers, a proof of revocation needs not specify any time interval: it suffices for it to specify a single point in time (e.g., the actual time of revocation). Unlike validity and suspension, in fact, revocation traditionally is an irrevocable process. Thus a single revocation time rt may suffice for proving a certificate revoked. And rt needs not be the beginning of any time interval T (e.g., it could be any time in "the middle of T"). In case of permanent revocation, therefore, the RTCA needs not send C's revocation proof at all updates dates (e.g., D1, D2, etc.). In principle, a revocation proof could be sent only once (or a few times for redundancy) and then cached by an RTC responder and then returned whenever a relying-party query about C is made.

Notice also that the RTCA may be informed right away that a certificate C has been revoked; for instance, in the middle of a time interval T for which the RTCA has already produced and forwarded a proof of validity for C to the RTC responders. Of course, by the next update, no such proof of validity will be computed for C. But for the time being (i.e., until the end of T) an incorrect proof of validity is out there. Thus, a good counter-measure consists of having proofs of revocation take precedence over proofs of validity. That is, an honest relying party that sees both a proof of validity for C for some time interval T and a proof of revocation for C (at whatever time t), should regard C as revoked (after time t). However, some relying parties may have never seen such a proof of revocation, and thus C may considered by some still valid until the end of T. As we have seen, such problems are somewhat unavoidable, in the sense that even in the traditional OCSP, the news of the revocation of C may take some time to reach the responder, and it may take even longer to realize that C should be revoked. Nonetheless, these problems can be lessened by having the RTCA compute and send all RTC responders a proof of C's revocation (independent of the scheduled dates D1, D2, etc. or D1', D2', etc.) as soon as it learns that it has been revoked (e.g., directly from the CA without waiting the next CRL update). All properly functioning RTC responders will then erase from memory any proof of C's validity and substitute it with the newly received proof of revocation. This way, from that time on, they will provide relying parties with accurate proofs about C's validity.

System Generality

A CA/RTCA/responder/party/user may be any entity (e.g., person, organization, server, device, computer program, computer file) or a collection of entities.

Certificates should be construed to include all kinds of certificates, and in particular hierarchical certificates and flat certificates (cfr. U.S. Pat. No. 5,420,927 herein incorporated by reference). Validity status and proofs of validity status may include validity status and proofs of validity status for hierarchical certificates (e.g., validity status and proofs of validity status of all certificates in a chain of certificates). Verifying the validity of a certificate C may include verifying the validity of the CA certificate for the CA having issued C, as well as the validity of the CRTA certificate for the RTCA that providing a signed response about the validity status of C.

Though certificates traditionally are digitally signed document binding given keys to given users, following U.S. Pat. No. 5,666,416 (herein incorporated by reference), certificates should include all kinds of digitally signed documents. For instance, a vendor, acting as a CA, may certify a price lists of its by digitally signing it (possibly together with date information). Validity status for such certificates is also very crucial. For instance, a vendor may want to prove the current validity of a price list (and refuse honor a given price in a price lists, unless a proof of its currently validity is shown). Thus a customer may wish to ascertain the current validity of a price list document. In particular, the RTC system is ideal (for its scalability and off-line processing) for proving the current validity of web pages. Indeed, the RTCA generated proofs of current validity may be stored next (or in association with) the pages themselves. (In this case, then, a party can be considered a computer file.)

Sending a piece of data D (to party X) should be construed to include making D available (or causing X to receive D).

Three-Factor Authentication With Real-Time Validation

The following is an efficient three-factor authentication with real-time validation and revocation performed with no connecting infrastructure at the relying party. This can work for physical access applications such as a door or logical applications such as file or application access. A physical access scenario is described below. Other applications are easy to generalize from this model for those skilled in the art.

EXAMPLE 16

1. The user has a credential stored on a wireless device (physical token). This token preferably has the capability of securely storing a digital certificate and private key. Preferably too, the token has a method of long-range (WAN) connectivity (such as GPRS, SMS, pager, CDMA, GSM, etc.) and a method of short-range (PAN) connectivity (such as Bluetooth, IR, RF, etc.) The token may also have one or more additional authentication factors (such as a keypad for a PIN or a biometric reader). This example assumes that the token is a bluetooth cell phone.

2. The door has a control panel with a small CPU capable of performing standard PKI operations and a method of short-range (PAN) connectivity to talk to the physical token. This example assumes a bluetooth-enabled computer similar to our standard demo doors.

3. The user is prompted to enter a PIN number into her cell phone (or enter his own biometric info if a biometric reader is available). This prompt can happen once a day, the first time the user tries to go through a door, every few hours, randomly, upon receipt of a special SMS message, etc. The PIN (or biometric) serves as a second factor of authentication (first being the certificate on the phone) and "unlocks" the phone for use in the physical access application.

4. Once the user comes within range of the door (30 ft for bluetooth), the phone and the door recognize each other and begin the initial authentication and validation sequence:

4.1 (optional) The door validates itself to the phone by sending the door's certificate via bluetooth to the phone. The phone checks the certificate and validates the door using any of our standard methods (min-CRL of all doors periodically sent down to the phone is a good approach.) This solves the problem of "rogue readers" and makes sure that the door is a legitimate reader before the phone discloses any information.

4.2 The phone sends the door the user's certificate which contains the user's biometric minutiae. The phone also sends an RTC proof (preferably, either Validation-token—i.e., a 20-byte proof of validity—or a Distributed-OCSP proof) to prove its current validity. The proof had been previously received via the WAN in the normal CoreStreet manner, such as that described in U.S. Pat. No. 5,666,416, Issued Sep. 9, 1997, entitled "Certificate Revocation System".

4.3 The door authenticates and validates the user's certificate in the normal RTC fashion. The door may do this for multiple (or even all) phones currently within range (multiple employees may be near the door).

5. By the time the user reaches the door, the previous steps have been completed. The user scans her finger (or other biometric) on a reader mounted on or near the door (perhaps in the actual doorknob). The door matches the biometric minutiae against the data stored in all validated certificates within range. If the biometric matches, the door opens. Otherwise, the door remains closed.

This has the following benefits:

1. Strong authentication (3-factor in this example, more are possible)
2. Transparent to the user (just walk up to the door and open it, no cards or PIN numbers to remember)
3. Real time revocation and validation
4. No connecting infrastructure required at any door—do this at 30,000 feet or in the middle of the ocean
5. Can be built with standard hardware and software components Step 4.1 is an independent invention of independent interest, since it solves a known problem (eg. identified by the Department of Defense) for which there is no currently known solution. The scheme may be augmented by having "revocation proofs or access logs travel to and/or from other people's cards/phones to disconnected doors".

Protecting Mobile Computing Resources

A preferred embodiment of the present invention is based on 20 byte, unforgeable, public "proofs". 20-byte proofs are cryptographically protected using a one-way function called hashing. The process is simple, does not need encryption and does not use digital signatures. These properties make this technology ideal for: large scale deployments (scales to 100s millions); bandwidth limited applications (e.g. wireless applications); offline validation (i.e., network connection not required).

Laptop theft is a serious problem that imposes replacement costs, loss of productivity, loss of unrecoverable (un-backed-up) data, loss of control over sensitive/confidential data (e.g. sensitive operational info, proposals to clients, email, calendar, contacts, pending mergers, new product IP, strategies, and launch plans, financial operating results, private compensation info.), and loss of network and infrastructure details (e.g. user names & passwords, dial-in numbers, IP addressing schemes, DNS naming conventions, and primary mail serves).

Figure 8:
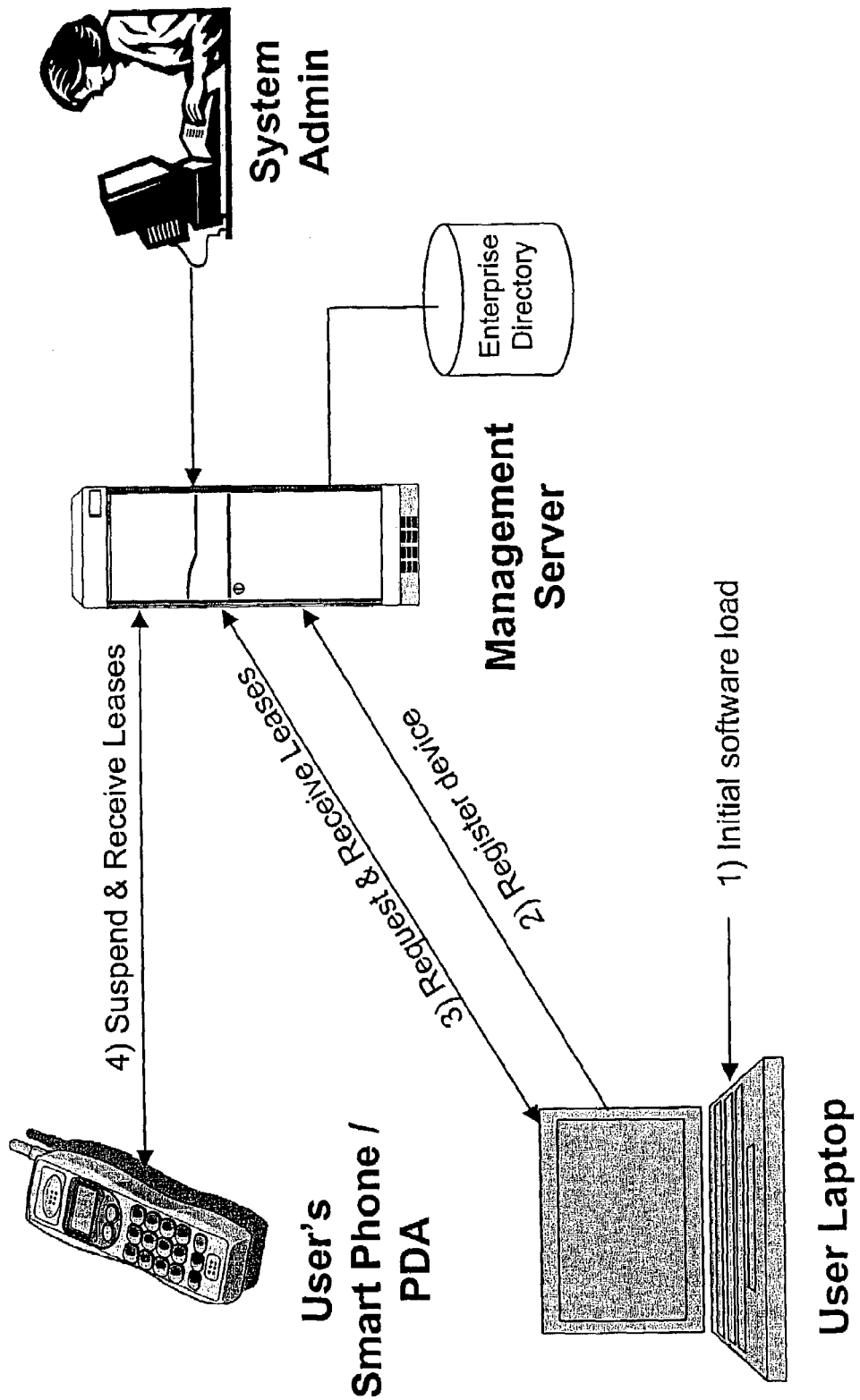
FIG. 8 is a schematic illustration of the system operation according to one embodiment of the invention.

In one embodiment, the present invention provides for leases, that is licenses to use for a specified period of time wherein the duration of the lease is a configurable parameter. The technology of the present invention forces presence of valid "leases". Leases are 20 byte, unforgable, "public tokens": valid token, suspension token, and revocation token. New leases are received automatically. A computer may be temporarily disabled and a system administrator or user can unsuspend a laptop. A computer may be permanent disabled with possible recovery by the System Administrator. FIG. 8 is a schematic illustration of the system operation according to one embodiment of the invention.

As long as the device is still authorized, a valid lease token is produced once a day (hour, week etc.) by the central authority. Getting a valid lease token onto the protected device can be accomplished in many different ways and is completely transparent to the end user. If the device is stolen, two things happen: valid lease tokens cease to be generated (no way to extend use past the current day); revocation token is propagated to the network (any connection renders device immediately unusable). Stolen devices are turned off within: seconds (best case, if push capability is present); hours (average cast, as soon as any network connection is made); one day (worst case, no connection possible).

The system protects against random theft as well as theft by insiders. Stealing a device makes no sense, since: the hardware is unusable; the software is unusable; and the data is unreadable. Similar to some card radio brands, unusable if stolen and therefore deters theft.

Figure 9:
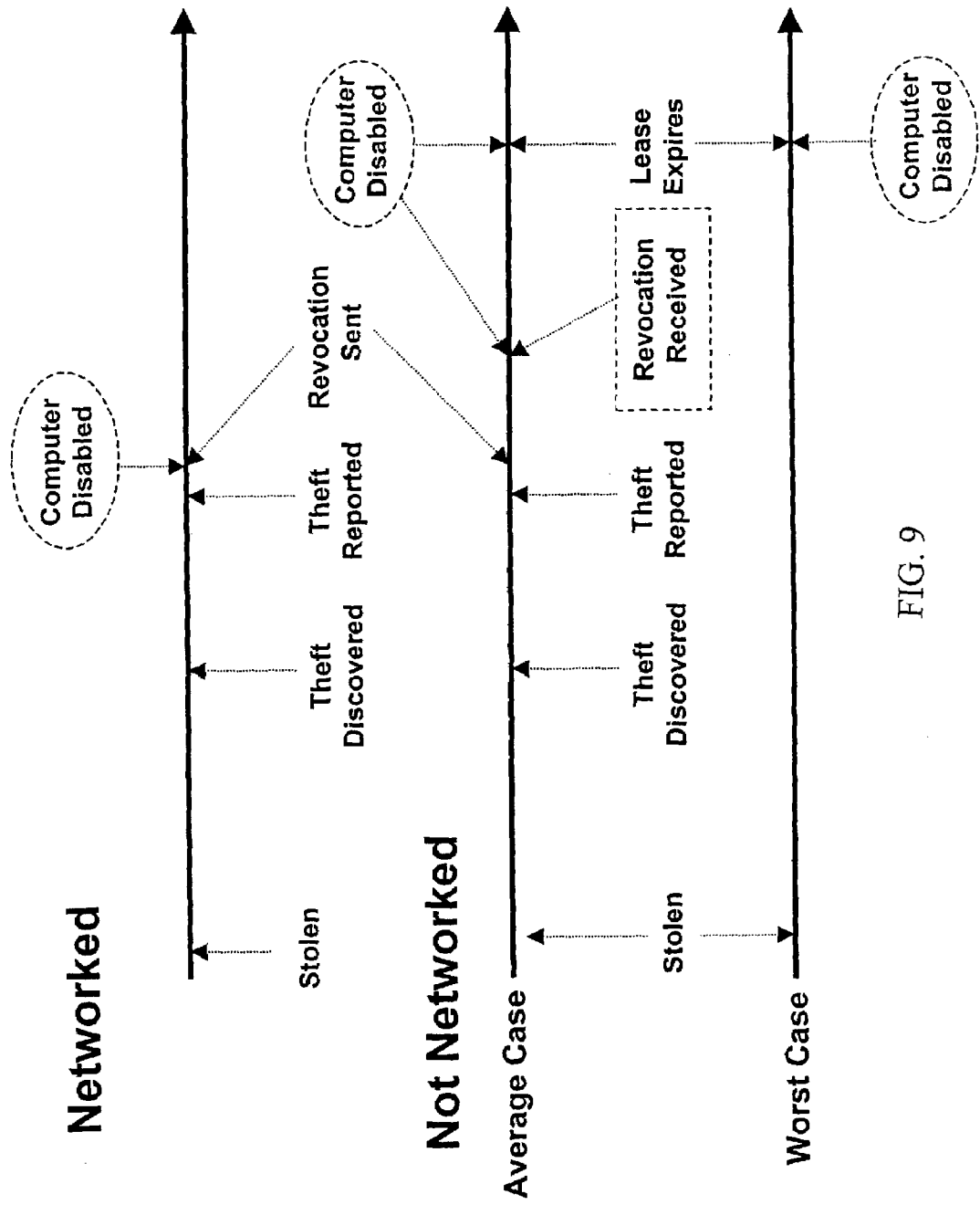
FIG. 9 is a schematic illustration of a stolen computer timeline.

Validity tokens are delivered by the following methods: wired network; wireless network; SMS wireless "push"; pager system; handheld telephone/PDA via infrared port; Bluetooth device; Manually typed in as received via alternate channel (e.g. "7G9L TC77 U8QL S2PS QK2Q EN9V PXXH XPUL"), such as via fax, e-mail, telephone call. FIG. 9 is a schematic illustration of a stolen computer timeline.

Alternative protection methods may be used including: physical anchor for prevention; asset tracking service for recover and as a deterrent; motion sensor and alarm as deterrent; access keys as a deterrent and access control; tracking software for recover and as a deterrent; and data encryption which protects data only. Potential attacks and results include:

Removing/circumventing software: Possible if have "administrative privileges" but extremely difficult after revocation. Optional BIOS/hardware countermeasures offer nearly 100% protection.

Replacement/reformat hard drive: All secure data lost and optional BIPS/hardware hooks to prevent drive replacement.

Move hard drive to another machine to read data: Data can be encrypted.

Prevent Receipt of revocation token: Prolongs laptop operation until lease expires only (worst case).

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for an entity A to control the access of at least one user U to at least one disconnected door D having means to determine the current time, comprising the steps of:

for each time interval d of a sequence of dates, having A produce a digital signature SIGUDd, indicating that user U can access door D during time interval d;

causing a card of the user U to receive SIGUDd during time interval d for presentation to door D in order to pass through D;

having U present the card with SIGUDd to door D; and having D open after verifying that (i) SIGUDd indeed is a digital signature of A indicating that U can access door D at time interval d, and (ii) that the current time is indeed within time interval d, wherein the door D stores, on the card of the user, information corresponding to an access attempt of a different user.

2. The method of claim 1, wherein D has a card reader coupled with an electromechanical lock, and wherein U presents SIGUDd to D by having his card read by D's card reader.

3. The method of claim 1, wherein A causes SIGUDd to be received by U during time interval d by posting SIGUDd into a database accessible by U.

4. The method of claim 1, wherein SIGUDd is a public-key signature, and wherein D stores the public-key of A.

5. The method of claim 1, further comprising:

receiving the information stored on the card at a database disconnected from the door D.

6. The method of claim 1, wherein D also verifies identity information about U.

7. The method of claim 5, wherein the identity information about U includes at least one of: a PIN and the answer to a challenge of D.

8. A method for controlling the access to at least one disconnected door, comprising:

for each time interval of a sequence of dates, causing an entity to produce a digital signature, wherein the digital signature indicates that at least one user can access the disconnected door during the time interval;

causing a card of a first user to receive the digital signature during the time interval for presentation to the disconnected door in order to pass through the disconnected door; and after the first user presents the card with the digital signature to the disconnected door, causing the disconnected door to open after verifying that: (i) the digital signature is a digital signature of the entity indicating that the first user can access the disconnected door at the time interval, and (ii) that a current time is within the time interval, wherein the disconnected door stores, on the card of the first user, information that corresponds to a second user different from the first user.

9. The method of claim 8, wherein the disconnected door has a card reader coupled with an electromechanical lock, and wherein the first user presents the digital signature to the disconnected door by having the card of the first user read by the card reader.

10. The method of claim 8, wherein the entity causes the digital signature to be received by the first user during the time interval by posting the digital signature into a database accessible by the first user.

11. The method of claim 8, wherein the digital signature is a public-key signature, and wherein the disconnected door stores the public-key of the entity.

12. The method of claim 8, further comprising:

receiving the information stored on the card at a database disconnected from the door.

13. The method of claim 8, wherein the disconnected door also verifies identity information about the first user.

14. The method of claim 13, wherein the identity information about the first user includes at least one of: a PIN and the answer to a challenge of the disconnected door.

* * * * *